US010740549B2

(12) United States Patent
Campbell et al.

(10) Patent No.: US 10,740,549 B2
(45) Date of Patent: Aug. 11, 2020

(54) SOUND ON CHARTS

(71) Applicant: Microsoft Technology Licensing, LLC, Redmond, WA (US)

(72) Inventors: John Campbell, Woodinville, WA (US); Jim Sun, Redmond, WA (US); Samuel C. Radakovitz, Bellevue, WA (US); Matthew Hart Fichtner, Playa Vista, CA (US); Christian Canton, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/339,170

(22) Filed: Oct. 31, 2016

(65) Prior Publication Data

US 2017/0123756 A1     May 4, 2017

Related U.S. Application Data

(60) Provisional application No. 62/249,884, filed on Nov. 2, 2015, provisional application No. 62/249,869, filed
(Continued)

(51) Int. Cl.
*G06F 40/18*     (2020.01)
*G06F 40/106*    (2020.01)
(Continued)

(52) U.S. Cl.
CPC ............ *G06F 40/18* (2020.01); *G06F 3/0482* (2013.01); *G06F 3/04817* (2013.01);
(Continued)

(58) Field of Classification Search
CPC .. G06F 17/246; G06F 3/04817; G06F 3/0482; G06F 3/0485; G06F 3/04883
(Continued)

(56) References Cited

U.S. PATENT DOCUMENTS

| 4,815,029 A | 3/1989 | Barker et al. |
| 5,093,907 A | 3/1992 | Hwong et al. |

(Continued)

FOREIGN PATENT DOCUMENTS

| CN | 101796829 A | 8/2010 |
| CN | 102842323 A | 12/2012 |

(Continued)

OTHER PUBLICATIONS

PCT Second Written Opinion in PCT/US2016/059135, dated Nov. 7, 2017, 6 pages.
(Continued)

*Primary Examiner* — Stephen S Hong
*Assistant Examiner* — Hope C Sheffield
(74) *Attorney, Agent, or Firm* — Shook, Hardy & Bacon LLP

(57) ABSTRACT

Systems and methods for charting audio files and/or attributes of audio files associated with a spreadsheet are provided. For instance, when an audio file is associated with a spreadsheet, the audio file may be treated as a new type of data within the spreadsheet. In some aspects, a plurality of audio files may be associated with a spreadsheet, e.g., within a single cell or within a range of cells. In some aspects, the audio files themselves, as well as audio data (e.g., modulated data representing soundwaves, etc.), audio attributes (e.g., frequency, amplitude, sampling rate, codec, bitrate, volume, pitch, speed, channel, audio effects, author/artist, creation date and/or time, file name, file size, duration, etc.), and/or spreadsheet data (e.g., values in cells, user comments, etc.) may be incorporated into a report (e.g., a chart) using a spreadsheet charting function, either automatically or by user selection.

27 Claims, 49 Drawing Sheets

Related U.S. Application Data on Nov. 2, 2015, provisional application No. 62/357,292, filed on Jun. 30, 2016, provisional application No. 62/357,284, filed on Jun. 30, 2016.

(51) Int. Cl.

| | | |
|---|---|---|
| *G06F 40/177* | (2020.01) | |
| *G06F 40/197* | (2020.01) | |
| *G06F 3/0484* | (2013.01) | |
| *G06T 11/60* | (2006.01) | |
| *G06F 3/0482* | (2013.01) | |
| *G06F 3/0488* | (2013.01) | |
| *G06F 3/16* | (2006.01) | |
| *G06F 3/0481* | (2013.01) | |
| *G06T 11/20* | (2006.01) | |
| *G10L 15/26* | (2006.01) | |
| *G06K 9/00* | (2006.01) | |
| *G10L 13/033* | (2013.01) | |
| *G11B 27/00* | (2006.01) | |
| *G06T 1/00* | (2006.01) | |

(52) U.S. Cl.
CPC ...... *G06F 3/04842* (2013.01); *G06F 3/04845* (2013.01); *G06F 3/04847* (2013.01); *G06F 3/04883* (2013.01); *G06F 3/162* (2013.01); *G06F 3/165* (2013.01); *G06F 40/106* (2020.01); *G06F 40/177* (2020.01); *G06F 40/197* (2020.01); *G06K 9/00* (2013.01); *G06K 9/00442* (2013.01); *G06K 9/00449* (2013.01); *G06K 9/00463* (2013.01); *G06T 11/206* (2013.01); *G06T 11/60* (2013.01); *G10L 13/033* (2013.01); *G10L 15/26* (2013.01); *G11B 27/00* (2013.01); *G06T 1/0007* (2013.01); *G06T 2200/24* (2013.01)

(58) Field of Classification Search
USPC .......................................................... 715/727
See application file for complete search history.

(56) References Cited

U.S. PATENT DOCUMENTS

| | | | |
|---|---|---|---|
| 5,226,118 | A | 7/1993 | Baker et al. |
| 5,418,898 | A | 5/1995 | Zand et al. |
| 5,717,939 | A | 2/1998 | Bricklin et al. |
| 5,850,629 | A | 12/1998 | Holm et al. |
| 5,860,064 | A | 1/1999 | Henton |
| 6,055,549 | A | 4/2000 | Takano |
| 6,065,013 | A | 5/2000 | Fuh et al. |
| 6,088,708 | A | 7/2000 | Burch et al. |
| 6,138,130 | A | 10/2000 | Adler et al. |
| 6,262,736 | B1 | 7/2001 | Nelson |
| 6,282,551 | B1 | 8/2001 | Anderson et al. |
| 6,289,312 | B1 | 9/2001 | Raman |
| 6,289,513 | B1 | 9/2001 | Bentwich |
| 6,377,965 | B1 | 4/2002 | Hachamovitch et al. |
| 6,415,305 | B1 | 7/2002 | Agrawal et al. |
| 6,496,832 | B2 | 12/2002 | Chi et al. |
| 6,640,234 | B1 | 10/2003 | Coffen |
| 6,701,485 | B1 | 3/2004 | Igra et al. |
| 6,779,151 | B2 | 8/2004 | Cahill et al. |
| 6,785,660 | B1 | 8/2004 | Fedor et al. |
| 6,988,241 | B1 | 1/2006 | Guttman et al. |
| 6,988,248 | B1 | 1/2006 | Tang |
| 7,047,484 | B1 | 5/2006 | Becker et al. |
| 7,350,141 | B2 | 3/2008 | Kotler et al. |
| 7,350,142 | B2 | 3/2008 | Kraft et al. |
| 7,424,668 | B2 | 9/2008 | DeSpain |
| 7,430,709 | B2 | 9/2008 | Cho |
| 7,594,172 | B2 | 9/2009 | Fish |
| 7,639,873 | B2 | 12/2009 | Qian |
| 7,647,551 | B2 | 1/2010 | Vigesaa et al. |
| 7,761,782 | B1 | 7/2010 | Warren et al. |
| 7,779,000 | B2 | 8/2010 | Vigesaa et al. |
| 7,783,966 | B2 | 8/2010 | Mitsui |
| 7,849,395 | B2 | 12/2010 | Ellis et al. |
| 7,853,867 | B2 | 12/2010 | Egilsson |
| 7,885,811 | B2 | 2/2011 | Zimmerman et al. |
| 7,962,436 | B2 | 6/2011 | Brelage et al. |
| 8,018,518 | B2 | 9/2011 | Nobels |
| 8,091,024 | B2 | 1/2012 | Graeber |
| 8,121,842 | B2 | 2/2012 | Shih et al. |
| 8,145,999 | B1 | 3/2012 | Barrus et al. |
| 8,161,372 | B2 | 4/2012 | Ellis et al. |
| 8,166,385 | B2 | 4/2012 | Garcia-Molina et al. |
| 8,185,445 | B1 | 5/2012 | Perlmuter |
| 8,375,019 | B2 | 2/2013 | Salinas |
| 8,416,984 | B2 | 4/2013 | Liang et al. |
| 8,418,075 | B2 | 4/2013 | Gallo et al. |
| 8,510,266 | B1 | 8/2013 | Ho et al. |
| 8,515,241 | B2 | 8/2013 | Forsyth et al. |
| 8,516,389 | B2 | 8/2013 | Fujimoto et al. |
| 8,527,866 | B2 | 9/2013 | Suite et al. |
| 8,640,022 | B2 | 1/2014 | Waldman et al. |
| 8,645,832 | B2 | 2/2014 | Pea et al. |
| 8,786,667 | B2* | 7/2014 | Shanmukhadas ...... H04N 7/147 345/502 |
| 8,788,928 | B2 | 7/2014 | McColl et al. |
| 8,862,646 | B1* | 10/2014 | Murayama ........ G06F 17/30126 707/831 |
| 9,020,999 | B2 | 4/2015 | Rai |
| 9,042,653 | B2 | 5/2015 | Lin et al. |
| 9,066,145 | B2 | 6/2015 | Kilar et al. |
| 9,098,484 | B2 | 8/2015 | Viry |
| 9,124,856 | B2 | 9/2015 | Deshpande et al. |
| 9,129,234 | B2 | 9/2015 | Campbell et al. |
| 9,141,938 | B2 | 9/2015 | Goldberg |
| 9,256,589 | B2 | 2/2016 | Chitilian et al. |
| 9,270,728 | B2 | 2/2016 | Duncker et al. |
| 9,280,533 | B2 | 3/2016 | Rochelle et al. |
| 9,317,963 | B2 | 4/2016 | Ruble et al. |
| 9,449,031 | B2 | 9/2016 | Barrus et al. |
| 10,366,157 | B2 | 7/2019 | Campbell et al. |
| 2001/0007455 | A1* | 7/2001 | Yoo ..................... G11B 27/105 715/856 |
| 2002/0091871 | A1 | 7/2002 | Cahill et al. |
| 2002/0099552 | A1 | 7/2002 | Rubin |
| 2003/0233616 | A1 | 12/2003 | Gilinsky |
| 2004/0246376 | A1 | 12/2004 | Sekiguchi et al. |
| 2005/0125401 | A1 | 6/2005 | Carr et al. |
| 2005/0246642 | A1 | 11/2005 | Valderas et al. |
| 2006/0012568 | A1 | 1/2006 | Halcrow et al. |
| 2006/0071942 | A1 | 4/2006 | Ubillos et al. |
| 2006/0072848 | A1 | 4/2006 | Razzano |
| 2006/0106618 | A1 | 5/2006 | Racovolis et al. |
| 2006/0179012 | A1 | 8/2006 | Jacobs |
| 2006/0212469 | A1 | 9/2006 | Babanov et al. |
| 2006/0214776 | A1 | 9/2006 | O'Flaherty et al. |
| 2006/0270395 | A1 | 11/2006 | Dhawan et al. |
| 2007/0047780 | A1 | 3/2007 | Hull et al. |
| 2007/0124319 | A1 | 5/2007 | Platt et al. |
| 2007/0136652 | A1 | 6/2007 | Ellis et al. |
| 2007/0244702 | A1 | 10/2007 | Kahn |
| 2008/0016436 | A1 | 1/2008 | Liu et al. |
| 2008/0052083 | A1* | 2/2008 | Shalev .............. G06F 17/30855 704/500 |
| 2008/0147501 | A1 | 6/2008 | Gilliam |
| 2008/0156171 | A1 | 7/2008 | Guldi |
| 2008/0195928 | A1 | 8/2008 | Matsa et al. |
| 2008/0200774 | A1 | 8/2008 | Luo |
| 2008/0215959 | A1 | 9/2008 | Lection |
| 2008/0235625 | A1 | 9/2008 | Holm et al. |
| 2008/0276159 | A1 | 11/2008 | Narayanaswami et al. |
| 2008/0294903 | A1 | 11/2008 | Miyazaki et al. |
| 2009/0006466 | A1 | 1/2009 | Ellis et al. |
| 2009/0006939 | A1 | 1/2009 | Despain et al. |
| 2009/0037309 | A1 | 2/2009 | Altberg |
| 2009/0044090 | A1 | 2/2009 | Gur et al. |
| 2009/0158139 | A1 | 6/2009 | Morris et al. |

(56) References Cited

U.S. PATENT DOCUMENTS

| | | | |
|---|---|---|---|
| 2009/0164880 A1* | 6/2009 | Lection | G06F 3/0481 715/212 |
| 2009/0228837 A1 | 9/2009 | Suzuki et al. | |
| 2009/0254206 A1 | 10/2009 | Snowdon | |
| 2009/0319542 A1 | 12/2009 | Le brazidec et al. | |
| 2010/0005411 A1 | 1/2010 | Duncker et al. | |
| 2010/0058163 A1 | 3/2010 | Garcia-Molina et al. | |
| 2010/0083079 A1 | 4/2010 | Rapp et al. | |
| 2010/0095198 A1 | 4/2010 | Bultrowicz et al. | |
| 2010/0128855 A1 | 5/2010 | Demo et al. | |
| 2010/0131570 A1 | 5/2010 | Weinberg | |
| 2010/0205530 A1 | 8/2010 | Butin | |
| 2010/0211575 A1 | 8/2010 | Collins et al. | |
| 2010/0214299 A1 | 8/2010 | Robertson et al. | |
| 2011/0029561 A1 | 2/2011 | Slaney et al. | |
| 2011/0035652 A1 | 2/2011 | Mcgarry | |
| 2011/0040720 A1 | 2/2011 | Zangwill | |
| 2011/0066933 A1 | 3/2011 | Ludwig | |
| 2011/0072067 A1 | 3/2011 | Gartner | |
| 2011/0078560 A1 | 3/2011 | Weeldreyer et al. | |
| 2011/0181617 A1 | 7/2011 | Tsuda et al. | |
| 2011/0209048 A1 | 8/2011 | Scott et al. | |
| 2011/0252299 A1 | 10/2011 | Lloyd et al. | |
| 2012/0013539 A1 | 1/2012 | Hogan et al. | |
| 2012/0013540 A1 | 1/2012 | Hogan | |
| 2012/0039546 A1 | 2/2012 | Berger et al. | |
| 2012/0066574 A1 | 3/2012 | Lee et al. | |
| 2012/0069028 A1 | 3/2012 | Bouguerra | |
| 2012/0088477 A1* | 4/2012 | Cassidy | G11B 27/102 455/414.1 |
| 2012/0159298 A1* | 6/2012 | Fisher | G06F 17/246 715/215 |
| 2012/0189203 A1 | 7/2012 | Lin et al. | |
| 2012/0236201 A1 | 9/2012 | Larsen | |
| 2012/0313957 A1 | 12/2012 | Fisher et al. | |
| 2012/0324421 A1 | 12/2012 | Boeckenhauer et al. | |
| 2013/0016193 A1 | 1/2013 | Nepveu | |
| 2013/0035075 A1 | 2/2013 | Seetharaman et al. | |
| 2013/0036346 A1 | 2/2013 | Cicerone | |
| 2013/0055058 A1 | 2/2013 | Leong et al. | |
| 2013/0067305 A1 | 3/2013 | Golan | |
| 2013/0110884 A1 | 5/2013 | Eakins | |
| 2013/0117651 A1 | 5/2013 | Waldman et al. | |
| 2013/0124478 A1 | 5/2013 | Ginzburg et al. | |
| 2013/0124965 A1* | 5/2013 | Elias | G06F 16/9024 715/230 |
| 2013/0151599 A1 | 6/2013 | Santoro et al. | |
| 2013/0198666 A1 | 8/2013 | Matas et al. | |
| 2013/0298016 A1 | 11/2013 | Chigier | |
| 2013/0346622 A1 | 12/2013 | Wu | |
| 2014/0047312 A1 | 2/2014 | Ruble et al. | |
| 2014/0073486 A1 | 3/2014 | Ahmed et al. | |
| 2014/0081634 A1* | 3/2014 | Forutanpour | G06F 17/289 704/235 |
| 2014/0104279 A1 | 4/2014 | Albrecht | |
| 2014/0119673 A1 | 5/2014 | Rathnavelu et al. | |
| 2014/0122516 A1 | 5/2014 | Brewer et al. | |
| 2014/0164890 A1 | 6/2014 | Fox et al. | |
| 2014/0201126 A1 | 7/2014 | Zadeh | |
| 2014/0244668 A1 | 8/2014 | Barrus et al. | |
| 2014/0297652 A1 | 10/2014 | Stevens et al. | |
| 2014/0310746 A1 | 10/2014 | Larsen | |
| 2014/0337733 A1 | 11/2014 | Rodriguez et al. | |
| 2014/0337753 A1 | 11/2014 | Mckellar et al. | |
| 2014/0359417 A1 | 12/2014 | Bar-On | |
| 2014/0372850 A1 | 12/2014 | Campbell et al. | |
| 2014/0372857 A1 | 12/2014 | Otero et al. | |
| 2014/0372858 A1 | 12/2014 | Campbell et al. | |
| 2014/0372952 A1 | 12/2014 | Otero et al. | |
| 2015/0033131 A1 | 1/2015 | Peev et al. | |
| 2015/0050010 A1 | 2/2015 | Lakhani et al. | |
| 2015/0100880 A1 | 4/2015 | Matas et al. | |
| 2015/0142418 A1 | 5/2015 | Byron | |
| 2015/0161250 A1 | 6/2015 | Elbaz | |
| 2015/0350287 A1 | 12/2015 | Novo diaz et al. | |
| 2015/0378979 A1 | 12/2015 | Hirzel et al. | |
| 2016/0026376 A1 | 1/2016 | Schultink | |
| 2016/0026613 A1 | 1/2016 | Vogel | |
| 2016/0070733 A1 | 3/2016 | Gould | |
| 2016/0093079 A1 | 3/2016 | Grams | |
| 2016/0224536 A1 | 8/2016 | Thomas | |
| 2016/0240187 A1 | 8/2016 | Fleizach | |
| 2016/0270740 A1 | 9/2016 | Raisoni et al. | |
| 2016/0336003 A1* | 11/2016 | Agiomyrgiannakis | G10L 13/033 |
| 2016/0337059 A1 | 11/2016 | Nehls | |
| 2017/0124040 A1 | 5/2017 | Campbell et al. | |
| 2017/0124041 A1 | 5/2017 | Campbell et al. | |
| 2017/0124042 A1 | 5/2017 | Campbell et al. | |
| 2017/0124043 A1 | 5/2017 | Canton et al. | |
| 2017/0124044 A1 | 5/2017 | Canton et al. | |
| 2017/0124045 A1 | 5/2017 | Canton et al. | |
| 2017/0124046 A1 | 5/2017 | Campbell et al. | |
| 2017/0124047 A1 | 5/2017 | Campbell et al. | |
| 2017/0124048 A1 | 5/2017 | Campbell et al. | |
| 2017/0124049 A1 | 5/2017 | Campbell et al. | |
| 2017/0124050 A1 | 5/2017 | Campbell et al. | |
| 2017/0124056 A1 | 5/2017 | Radakovitz et al. | |
| 2017/0124057 A1 | 5/2017 | Canton et al. | |
| 2017/0124741 A1 | 5/2017 | Campbell et al. | |
| 2017/0126772 A1 | 5/2017 | Campbell et al. | |
| 2017/0337040 A1 | 11/2017 | Salvi et al. | |
| 2019/0258709 A1 | 8/2019 | Campbell et al. | |

FOREIGN PATENT DOCUMENTS

| | | |
|---|---|---|
| EP | 1645972 A2 | 4/2006 |
| KR | 20140146350 | 12/2014 |
| WO | 0157744 A2 | 8/2001 |
| WO | 2005050973 A2 | 6/2005 |
| WO | 2007118228 A2 | 10/2007 |
| WO | 2017079056 A1 | 5/2017 |

OTHER PUBLICATIONS

U.S. Appl. No. 15/199,968, Amendment and Response filed Oct. 12, 2017, 9 pages.
PCT Second Written Opinion in PCT/US2016/059303, dated Oct. 26, 2017, 8 pages.
U.S. Appl. No. 15/199,968, Notice of Allowance dated Nov. 13, 2017, 10 pages.
PCT Second Written Opinion in PCT/US2016/060194, dated Oct. 26, 2017, 7 pages.
Javaid, Usman, "Excel 2010: Pictograph (Graph With Pictures)", Published on: Mar. 15, 2010, Available at: http://www.addictivetips.com/microsoft-office/excel-2010-pictograph-graph-with-pictures/, 7 pages.
"How to add image as background into chart in Excel?", Published on: Jul. 2, 2014, Available at: https://www.extendoffice.com/documents/excel/1435-excel-add-image-background-to-chart.html, 10 pages.
"Customizing Points", Published on: Apr. 25, 2014, Available at: https://developers.google.com/chart/interactive/docs/points, 9 pages.
Levoy, Marc, "Spreadsheets for Images", in Proceedings of 21st International ACM Conference on Computer Graphics and Interactive Techniques, Jul. 24, 1994, 8 pages.
Reynolds, Janine, "New in Smartsheet: See Images in Your Sheets", Published on: Jan. 15, 2016 Available at: https://www.smartsheet.com/blog/new-in-smartsheet-embed-images, 20 pages.
"Use a picture in a chart", Retrieved on: Apr. 22, 2016, Available at: https://support.office.com/en-ie/article/Use-a-picture-in-a-chart-c53cf530-160b-4a3e-9b38-efe6cb858d10, 3 pages.
Lee, Li-Wei, "Tips and Tricks: Images in cells", Published on: Nov. 30, 2010, Available at: https://drive.googleblog.com/2010/11/tips-and-tricks-images-in-cells.html, 6 pages.
U.S. Appl. No. 15/199,938, Office Action dated Dec. 6, 2017, 24 pages.
Launch Excel, Series: Resize & autofit column widths, copyright 2011, published by www.launchexcel.com, http://web.archive.org/web/20110924045718/https://www.launchexcel.com/column-width-resize, 2 pages.

(56) References Cited

OTHER PUBLICATIONS

PCT International Preliminary Report on Patentability in PCT/US2016/059303, dated Jan. 18, 2018, 9 pages.
PCT International Preliminary Report on Patentability in PCT/US2016/060194, dated Jan. 18, 2018, 8 pages.
PCT International Preliminary Report on Patentability in PCT/US2016/059135, dated Jan. 30, 2018, 16 pages.
Bakke et al., "A spreadsheet-based user interface for managing plural relationships in structured data", Human Factors in Computing Systems, May 7, 2011, 10 pages.
PCT Invitation to Pay Additional Fees in PCT/US2016/060180, dated Feb. 9, 2017, 8 pages.
U.S. Appl. No. 15/199,968, Office Action dated Jul. 12, 2017, 20 pages.
Brian C. Whitmer, "Brigham Young University Improving Spreadsheets for Complex Problems", All These and Dissertations, Paper 1713, Apr. 8, 2008, http://scholarsarchive.byu.edu/cgi/viewcontent.cgl?artcile=2712&context=etd, pp. 1-7, 15-26.
PCT International Search Report and Written Opinion in PCT/US2016/060180, dated Jul. 12, 2017, 22 pages.
Han et al., "Situational data integration with data services and nested table", Service Oriented Computing and Applications, vol. 7, No. 2, Apr. 27, 2012, pp. 129-150.
Converting test to speech in Excel, Sep. 29, 2015, 2 pages, http://web.archive.org/web/20150929113340/https://support.office.com/en-us/article/converting-text-to-speech-in-excel-3f2ca8c0-90e2-4391-8e69-573832ea7300#_toc307831251.
"PhotoSpread Quick User's Manual", WebArchive online PDF, Jul. 8, 2011, 7 pages, http://web.archive.org/web/20110708161116/http://infolab.stanford.edu/~paepcke/shared-documents/photospread/photospreadmanual010309.pdf.
An Introduction to Data Validation in Excel, Published on: Mar. 15, 2014, http://trumpexcel.com/2014/03/learn-all-about-data-validation-in-excel/, 4 pages.
Azzarello, Pat, "Group Report: Improving Computer Audio and Music Production Systems User Interfaces", in Proceedings of Tenth Annual Interactive Music Conference, Oct. 13, 2005, 12 pages.
Canton et al., "Compound Data Types", Oct. 2, 2015, 16 pages.
Canton et al., "Condensed Core Design", Jul. 30, 2015, 312 pages.
Canton et al., "Rich Data Types", Jul. 30, 2015, 217 pages.
Chang, et al., "A Spreadsheet Model for Handling Streaming Data", in Proceedings of the 33rd Annual ACM Conference on Human Factors in Computing Systems, Apr. 18, 2015, 4 pages.
Chang, et al., "A spreadsheet model for using web service data", in Proceedings of IEEE Symposium on Visual Languages and Human-Centric Computing, Jul. 28, 2014, 8 pages.
Hang, et al., "Creating interactive web data applications with spreadsheets", in Proceedings of the 27th annual ACM symposium on User interface software and technology, Oct. 5, 2014, pp. 87-96.
Create an Excel Drop Down list with Search Suggestions, Published on: Oct. 19, 2013, http://trumpexcel.com/2013/10/excel-drop-down-list-with-search-suggestions/, 11 pages.
Dalgleish, Debra, "Excel List of All MP3 Files in a Directory", Published on: May 5, 2009, http://blog.contextures.com/archives/2009/05/05/excel-list-of-all-mp3-tiles-in-a-directory/, 3 pages.
Embedded Metadata in Wave Files, Retrieved on: Apr. 25, 2016, http://www.avpreserve.com/wp-content/uploads/2014/04/EmbeddedMetadata.pdf, 10 pages.
French, Ted, "Convert Measurements in Excel", Published on: Mar. 18, 2011, http://spreadsheets.about.com/od/excel2010functions/ss/2011-03-18-Convert-Measurements-In-Excel-2010.htm, 4 pages.
How to: Use Text-to-Speech in Excel 2002, Retrieved on: Jul. 7, 2016, https://support.microsoft.com/en-us/kb/288986, 4 pages.
Hoydahl, Jan, "Cominvent AS—Enterprise Search Consultants", Published on: Jan. 25, 2012, http://www.cominvent.com/2012/01/25/super-flexible-autocomplete-with-solr/, 4 pages.
In-Cell Dropdown and Validation in Spreadsheets, Published on: Aug. 26, 2010, http://googledrive.blogspot.in/2010/08/in-cell-dropdown-and-validation-in.html, 27 pages.

Inglis, "DoReMIRE ScoreCloud", SOS Sound on Sound, Jan. 1, 2015, http://www.soundonsound.com/reviews/doremir-scorecloud, 4 pages.
Kandel et al., "PhotoSpread: A Spreadsheet for Managing Photos", The 26th Annual CHI Conference on Human Factors in Computing Systems, Conference Proceedings, Apr. 5, 2005, in Florence, Italy, 10 pages.
Kandel et al., "The PhotoSpread Query Language", Sep. 6, 2007, http://ilpubs.stanford.edu:8090/812/1/2007-27.pdf, abstract only ,1 page.
Lim, Jon, "Google Spreadsheets: Count with Multiple Values in Cells", Published on: Apr. 7, 2014, http://jonlim.ca/2014/04/google-spreadsheets-count-multiple-values-cells/, 5 pages.
PCT International Search Report in PCT/US2016/059135, dated Feb. 16, 2017, 15 pages.
PCT International Search Report in PCT/US2016/059143, dated Apr. 3, 2017, 21 pages.
PCT International Search Report in PCT/US2016/059303, dated Feb. 16, 2017, 17 pages.
PCT International Search Report in PCT/US2016/060025, dated Apr. 7, 2017, 23 pages.
PCT International Search Report in PCT/US2016/060194, dated Feb. 16, 2017, 14 pages.
PCT Invitation to Pay Additional Fees in PCT/US2016/059143, dated Feb. 9, 2017, 9 pages.
Powerful transcription that's ready for work, Published on: Dec. 17, 2015, http://australia.nuance.com/dragon/transcription-solutions/index.htm, 5 pages.
Rivendell—Scenario: breakaway from normal progaming to playout audiobook chapters, for a length of time and rejoing normal programming. And how to load and playout the audiobook discs/tracks in order, published on: Apr. 3, 2016, https://thebrettblog.wordpress.com/, 31 pages.
Sartain, JD., "How to create relational databases in Excel 2013", Published on: Aug. 7, 2014, http://www.pcworld.com/article/2462281/how-to-create-relational-databases-in-excel-2013.html, 11 pages.
Singh, et al., "Transforming Spreadsheet Data Types using Examples", in Proceedings of Annual Symposium on Principles of Programming Languages, Oct. 26, 2015, 13 pages.
Trevi, Javier, "Showing all available MySQL data types when creating a new table with MySQL for Excel", Published on: Jul. 23, 2014, https://blogs.oracle.com/MySqlOnWindows/entry/showing_all_available_mysql_data, 8 pages.
Trying to open audio files from spreadsheet using windows API, Retrieved on: Apr. 25, 2016, http://stackoverflow.com/questions/34459965/trying-to-open-audio-files-from-spreadsheet-using-windows-api, 3 pages.
Use Formula AutoComplete, Retrieved on: Oct. 26, 2015, https://support.office.com/en-us/article/Use-Formula-AutoComplete-6d13daa5-e003-4431-abab-9edef51fae6b, 4 pages.
Virostek, Paul, "The Power User's Guide to Soundminer Metadata", Published on: Jun. 24, 2014, http://www.creativefieldrecording.com/2014/06/24/the-power-users-guide-to-soundminer-metadata/, 12 pages.
Wang et al., "Development of an image processing based sheet music recognition system for iOS device", 2014 IEEE International Conference on Consumer Electronics, May 26, 2014, 2 pages.
Wyatt, Allen, "Conditionally Playing an Audio File", Published on: Oct. 10, 2011 http://excel.tips.net/T006559_Conditionally_Playing_an_Audio_File.html, 2 pages.
Wyatt, Allen, "Generating Automatic Links to Audio Files (Microsoft Excel)" Jun. 7, 2014, http://excelribbon.tips.net/T013127_Generating_Automtic_Links_to_audio_files.html, 4 pages.
Wyatt, Allen, "Inserting a Sound File in Your Worksheet", Published on: Apr. 10, 2011, http://excel.tips.net/T002864_Inserting_a_Sound_File_in_Your_Worksheet.html, 2 pages.
Wyatt, Allen, "Inserting a Voice Annotation in Your Worksheet", Published on: Oct. 19, 2011, http://excel.tips.net/T002870_Inserting_a_Voice_Annotation_in_Your_Worksheet.html, 2 pages.
U.S. Appl. No. 15/199,938, Office Action dated May 31, 2018, 36 pages.
"Non Final Office Action Issued in U.S. Appl. No. 15/340,874", dated Sep. 28, 2018, 28 Pages.

(56) References Cited

OTHER PUBLICATIONS

"Non Final Office Action Issued in U.S. Appl. No. 15/199,938", dated Oct. 5, 2018, 34 Pages.

"Sort and Filter: The basics of spreadsheets," School of Data, copyright 2012, schoolofdata.org, Retrieved From: https://web.archive.org/web/20121217023142/https://schoolofdata.org/handbook/courses/sort-and-filter, 2012., 8 Pages.

"Non Final Office Action Issued in U.S. Appl. No. 15/199,953", dated Sep. 17, 2018, 33 Pages.

"Advisory Action Issued in U.S. Appl. No. 15/340,187", dated Mar. 26, 2019, 5 Pages.

"Non-Final Office Action Issued in U.S. Appl. No. 15/340,187", dated May 1, 2019, 60 Pages.

"Final Office Action Issued in U.S. Appl. No. 15/199,938", dated Feb. 26, 2019, 37 Pages.

"Final Office Action Issued in U.S. Appl. No. 15/199,953", dated Apr. 18, 2019, 40 Pages.

"Final Office Action Issued in U.S. Appl. No. 15/340,874", dated Feb. 5, 2019, 22 Pages.

"Final Office Action Issued in U.S. Appl. No. 15/340,187", dated Jan. 2, 2019, 52 pages.

"Non-Final Office Action Issued in U.S. Appl. No. 15/340,201", dated Jan. 2, 2019, 14 pages.

Hacid, et al., "A Database Approach for Modeling and Querying Video Data", in Proceedings of the 15th International Conference on Data Engineering, vol. 12, No. 5, Sep. 2000, 22 Pages.

Keng, Kuek Ser Kuang, "Edit video using spreadsheet—GS Video", Retrieved from: https://www.youtube.com/watch?v=-bwFdhJg1MA, Dec. 24, 2015, 3 Pages.

Machlis, Sharon, "How to create an automatically updating Google spreadsheet", Retrieved from: https://www.computerworld.com/article/2469616/business-intelligence/business-intelligence-79661-how-to-create-an-automatically-updating-spreadsheet.html, Apr. 21, 2017, 9 Pages.

"International Search Report and Written Opinion Issued in PCT Application No. PCT/US2016/059389", dated Feb. 16, 2017, 16 Pages.

"Second Written Opinion Issued in PCT Application No. PCT/US2016/059389", dated Sep. 13, 2017, 11 Pages.

"International Search Report and Written Opinion Issued in PCT Application No. PCT/US2016/059947", dated Feb. 16, 2017, 17 Pages.

"International Search Report and Written opinion Issued in PCT Application No. PCT/U52017/039609", dated Oct. 13, 2017, 13 Pages.

"International Search Report and Written Opinion Issued in PCT Application No. PCT/US2017/053854", dated Dec. 14, 2017, 14 Pages.

Wyatt, Allen, "Sorting with Graphics", https://excel.tips.net/T002954_Sorting_with_Graphics.html, Oct. 28, 2011, 2 Pages.

"Final Office Action Issued in U.S. Appl. No. 15/339,245", dated Mar. 7, 2019, 06 Pages.

"Non Final Office Action Issued in U.S. Appl. No. 15/339,245", dated Aug. 10, 2018, 6 Pages.

"Non Final Office Action Issued in U.S. Appl. No. 15/199,938", dated Jun. 27, 2019, 24 Pages.

"Final Office Action Issued in U.S. Appl. No. 15/340,201", dated Jul. 11, 2019, 15 Pages.

"Advisory Action Issued in U.S. Appl. No. 15/340,874", dated Jun. 10, 2019, 4 Pages.

"Non Final Office Action Issued in U.S. Appl. No. 15/340,874", dated Jun. 27, 2019, 22 Pages.

Hasler, et al., "A High Performance Interactive Image Spreadsheet (IISS)", in American Institute of Computers in Physics, vol. 8, Issue 3, May 1994, 20 Pages.

"Anchor image to a cell", Retrieved From: http://apache-poi.1045710.n5.nabble.com/Anchor-image-to-a-cell-td4302682.html :, Apr. 14, 2011, 9 Pages.

"Combine the contents of multiple cells", Retrieved from: https://support.office.com/en-us/article/Combine-the-contents-of-multiple-cells-3A86C317-61391-4F1D-8781-203320AEFDCE, Jan. 25, 2016, 03 Pages.

"How to Concatenate Cells in Excel", Retrieved From: https://wagda.lib.washington.edu/gishelp/tutorial/concatenate.pdf, Jul. 9, 2007, 6 Pages.

"How to insert multiple pictures and resize them at once in Excel?", Retrieved From: https://www.extendoffice.com/documents/excel/1156-excel-insert-multiple-pictures.html, Oct. 9, 2014, 7 Pages.

"How to insert picture into excel cell", Retrieved from: https://web.archive.org/web/20151018172741/http://trumpexcel.com/2013/05/insert-picture-into-excel-cell/, May 30, 2013, 09 Pages.

"How to resize pictures to fit cells in Excel?", Retrieved From: http://www.extendoffice.com/documents/excel/1060-excel-resize-picture-to-fit-cell.html, Retrieved on: Jan. 22, 2016, 11 Pages.

"Indexed Color", Retrieved From: https://en.wikipedia.org/wiki/Indexed_color, Retrieved on: Nov. 1, 2017, pp. 1-6.

"Insert Images into Google Spreadsheet Cells", Retrieved From: https://www.bettercloud.com/monitor/the-academy/insert-images-into-google-spreadsheet-cells/, Apr. 15, 2016, 5 Pages.

"Sort Data in a Range or Table", Retrieved From: web.archive.org/web/20150924210037/https://support.office.com/en-us/article/Sort-data-in-a-range-or-table-ce451a63-478d-42ba-adba-b6ebd1b4fa24, Sep. 24, 2015, 8 Pages.

"Spreadsheet plugin for Lightroom", Retrieved from: http://diswantsho.com/spreadsheet-plugin-for-lightroom/, Retrieved on: Apr. 28, 2016, 6 Pages.

"Spreadsheets (Change Book Settings in Bulk)", Retrieved From: https://support.google.com/books/partner/answer/3058975?hl=en, Sep. 23, 2014, 11 Pages.

"Final Office Action Issued in U.S. Appl. No. 15/199,820", dated Apr. 26, 2018, 16 Pages.

"Non Final Office Action Issued in U.S. Appl. No. 15/199,820", dated Sep. 20, 2017, 16 Pages.

"Final Office Action Issued in U.S. Appl. No. 15/199,836", dated Apr. 9, 2018, 15 Pages.

"Non Final Office Action Issued in U.S. Appl. No. 15/199,836", dated Sep. 20, 2017, 14 Pages.

"Final Office Action Issued in U.S. Appl. No. 15/199,846", dated Oct. 26, 2017, 22 Pages.

"Non Final Office Action Issued in U.S. Appl. No. 15/199,846", dated Jun. 26, 2017, 20 Pages.

"Final Office Action Issued in U.S. Appl. No. 15/340,886", dated May 3, 2019, 21 Pages.

"Non Final Office Action Issued in U.S. Appl. No. 15/340,886", dated Oct. 2, 2018, 17 Pages.

Agarwal, Amit, "How to Insert Images in your Google Spreadsheet Cells", Retrieved From: https://www.labnol.org/internet/images-in-google-spreadsheet/18167/, Mar. 9, 2016, 2 Pages.

French, Ted, "Concatenate Text Data in Google Spreadsheets", Retrieved from: https://web.archive.org/web/20140619031649/http://spreadsheets.about.com/od/exceltexffunctions/ss/2014-06-15-google-spreadsheets-concatenate-text-stirings.htm, Jun. 19, 2014, 3 Pages.

Harvey, Greg, "How to Edit and Format Inserted Pictures in Excel 2013", Retrieved From: https://www.dummies.com/software/microsoft-office/excel/how-to-edit-and-format-inserted-pictures-in-excel-2013/, Jan. 2013, 4 Pages.

Klement, Scott, "Load Images into Your HSSF Spreadsheets", Retrieved From: http://www.easy400.net/hssfcgi/documentation/20081211.html, Dec. 11, 2008, 5 Pages.

Lafond, "EAtlas Image Metadata Editor Application—Tag photos with metadata", Retrieved From: https://eatlas.org.au/tools/image-metadata-editor, Retrieved on: Apr. 28, 2016, 15 Pages.

"International Search Report and Written Opinion Issued in PCT Application No. PCT/US2016/059852", dated Jan. 25, 2017, 15 Pages.

"International Search Report and Written Opinion Issued in PCT Application No. PCT/US2016/059876", dated Jan. 25, 2017, 15 Pages.

"International Search Report and Written Opinion Received for PCT Application No. PCT/US2016/060177", dated Jan. 25, 2017, 16 Pages.

(56) References Cited

OTHER PUBLICATIONS

"Second Written Opinion Issued in PCT Application No. PCT/US2016/060177", dated Sep. 14, 2017, 9 Pages.
"International Search Report and Written Opinion Issued in PCT Application No. PCT/US2016/060192", dated Jan. 25, 2017, 15 Pages.
"Second Written Opinion Issued in PCT Application No. PCT/US2016/060192", dated Sep. 11, 2017, 8 Pages.
Piersol, Kurt W., "Object-oriented spreadsheets: The Analytic Spreadsheet Package", in the Conference on Object-Oriented Programming Systems, Languages, and Applications (OOPSLA '86)., Sep. 29, 1986, pp. 385-390.
Puls, Ken, "Using Vlookup to return a picture", Retrieved From: https://web.archive.org/web/20140207193135/http://www.cga-pdnet.org/pdf/vlookupforpictures.pdf :, Feb. 7, 2014, 7 Pages.
Sundaresan, et al., "Management and Analysis of Camera Trap Data: Alternative Approaches (Response to Harris et al. 2010)", in Bulletin of the Ecological Society of America, vol. No. 92, Issue No. 2, Apr. 2011, pp. 188-195.
Waldock, Jeff, "Applying Mathematics to Digital Image Processing Using a Spreadsheet", in Journal of MSOR Connections, vol. No. 10, Issue No. 3, Nov. 2010, 11-16 Page.
Wood, Mark, "Learn how to use Apple's spreadsheet program, Numbers", Retrieved From: https://www.macworld.co.uk/how-to/mac-software/how-to-use-apple-numbers-speadsheet-3609483/ :, May 4, 2015, 9 Pages.
Wyatt, Allen, "Displaying Images based on a Result", Retrieved from: https://web.archive.org/web/20140611095452/https://excel.tips.net/T003128_Displaying_Images_based_on_a_Result.html, Jun. 3, 2014, 10 Pages.
Wyatt, Allen, "Hiding Graphics when Filtering", Retrieved from: https://web.archive.org/web/20161216030053/http://excel.tips.net/T003866_Hiding_Graphics_when_Filtering.html, Dec. 8, 2015, 2 Pages.
"Non Final Office Action Issued in U.S. Appl. No. 15/339,101", dated Sep. 10, 2018, 26 Pages.
"5 Ways to Extract Video Frames and Save to Images", Retrieved From: https://www.raymond.cc/blog/extract-video-frames-to-images-using-vlc-media-player/, Oct. 10, 2016, 12 Pages.
"Deliver content using spreadsheet templates", Retrieved from: https://support.google.com/youtube/answer/6066171?hl=en, Sep. 21, 2015, 4 Pages.
"Google Spreadsheets—Google Charts—Google Developers", Retrieved from: http://web.archive.org/web/20151008210800/https://google-developers.appspot.com/chart/interactive/docs/spreadsheets, Oct. 8, 2015, 6 Pages.
Vaziri, et al., "Stream Processing with a Spreadsheet", in Proceedings of European Conference on Object-Oriented Programming, Jul. 28, 2014, 25 Pages.
"Non Final Office Action Issued in U.S. Appl. No. 15/281,885", dated Sep. 19, 2017, 16 Pages.
"Final Office Action Issued in U.S. Appl. No. 15/282,114", dated Jun. 6, 2018, 17 Pages.
"Non Final Office Action Issued in U.S. Appl. No. 15/282,114", dated Oct. 19, 2017, 19 Pages.
"Non Final Office Action Issued in U.S. Appl. No. 15/282,269", dated Sep. 19, 2017, 17 Pages.
"Non Final Office Action Issued in U.S. Appl. No. 15/339,330", dated Apr. 17, 2019, 21 Pages.
Chang, et al., "A Spreadsheet Tool for Creating Web Applications Using Online Data", in Proceedings of CHI Workshop on End User Development in the Internet of Things Era, vol. 12, Issue 2, Apr. 18, 2015, 6 Pages.
Eastonz, Trevor, "Embed a Video in Microsoft Excel—It's a breeze", Retrieved from: https://www.onlinepclearning.com/embed-a-video-in-microsoft-excel/, Published on: Jul. 18, 2013, 7 Pages.
"Non Final Office Action Issued in U.S. Appl. No. 15/199,953", dated Dec. 3, 2019, 23 Pages.
"Final Office Action Issued in U.S. Appl. No. 15/339,330", dated Nov. 22, 2019, 18 Pages.
"Final Office Action Issued in U.S. Appl. No. 15/340,874", dated Nov. 20, 2019, 24 Pages.
"Advisory Action Issued in U.S. Appl. No. 15/339,330", dated Feb. 20, 2020, 7 Pages.
"Notice of Allowance Issued in U.S. Appl. No. 15/340,187", dated Sep. 18, 2019, 9 Pages.
U.S. Appl. No. 15/340,187, Office Action dated May 18, 2018, 32 pages.
PCT International Preliminary Report on Patentability in PCT/US2016/060025, dated May 8, 2018, 16 pages.
PCT International Preliminary Report on Patentability in PCT/US2016/060180, dated May 8, 2018, 15 pages.
U.S. Appl. No. 15/199,938, Amendment and Response filed Apr. 6, 2018, 21 pages.
PCT International Preliminary Report on Patentability in PCT/US2016/059143, dated May 8, 2018, 13 pages.
"Final Office Action Issued in U.S. Appl. No. 15/199,953", dated Apr. 30, 2020, 18 Pages.
"Non Final Office Action Issued in U.S. Appl. No. 15/340,201", dated Apr. 24, 2020, 16 Pages.
"Non Final Office Action Issued in U.S. Appl. No. 15/340,874", dated Mar. 12, 2020, 25 Pages.

\* cited by examiner

SOUND ON CHARTS

RELATED APPLICATIONS

This application claims priority to U.S. Provisional Application No. 62/249,884, entitled "Compound Data Types," filed on Nov. 2, 2015; U.S. Provisional Application No. 62/249,869, entitled "Rich Data Types," filed Nov. 2, 2015; U.S. Provisional Application No. 62/357,292, entitled "Compound Data Objects," filed on Jun. 30, 2016; and U.S. Provisional Application No. 62/357,284, entitled "Rich Data Types," filed on Jun. 30, 2016; the entire disclosures of which are hereby incorporated in their entireties herein by reference.

BACKGROUND

Today, while spreadsheet data can be charted, objects within a spreadsheet, such as images, sound files, videos, etc., are not currently handled as first class data and cannot be charted. Although modern reports often have infographics or other objects for facilitating the presentation of data, current spreadsheets are unable to generate such robust reports through charting. Accordingly, current spreadsheets are ill-suited for providing such new features in a visual, sensory-driven world.

It is with respect to these and other general considerations that embodiments have been described. Also, although relatively specific problems have been discussed, it should be understood that the embodiments should not be limited to solving the specific problems identified in the background.

SUMMARY

The disclosure generally relates to a system and methods for charting audio files and/or attributes of audio files in a spreadsheet. In aspects, when an audio file is associated with a spreadsheet, the audio file may be treated as a new type of data within the spreadsheet. In some aspects, a plurality of audio files may be associated with a spreadsheet, e.g., within a single cell or within a range of cells. In further aspects, both an audio file and additional data may be associated with a single cell. According to the present methods, the audio files themselves, as well as parameters of the audio files including audio data (e.g., modulated data representing soundwaves, etc.) and audio attributes (e.g., frequency, amplitude, sampling rate, codec, bitrate, volume, pitch, speed, channel, audio effects, author/artist, creation date and/or time, file name, file size, duration, etc.), may be retrieved (e.g., from metadata) and incorporated into a report (e.g., a chart) using a spreadsheet charting function. In further aspects, audio files may be passed to third party services for processing, which may analyze and return additional audio parameters for charting, such as the number and types of chords in an audio file, a transcription of an audio file to a musical score, artist of an audio file, and the like.

In aspects, a system is provided that includes a processing unit and a memory storing computer executable instructions that, when executed by the processing unit, cause the system to perform a method. The method includes receiving a selection of one or more cells within a spreadsheet and identifying an audio file associated with the selected one or more cells, where the audio file is associated with one or more parameters. The method further includes receiving a selection of a charting function and creating a chart based on incorporating the audio file into the chart or charting the one or more parameters of the audio file.

In further aspects, a method for creating a chart is provided. The method includes receiving a selection of one or more cells within a spreadsheet and identifying data with the selected one or more cells. The method further includes receiving a selection of a charting function and creating a chart based on the identified data. Additionally, the method includes transcribing the chart into speech to create at least one audio file and incorporating the at least one audio file into the chart.

In further aspects, a system is provided that includes a processing unit and a memory storing computer executable instructions that, when executed by the processing unit, cause the system to receive a selection of one or more cells within a spreadsheet and identify an audio file associated with the selected one or more cells. The computer executable instructions further causing the system to receive a selection of a charting function, create a chart, and incorporate the at least one audio file into the chart.

In further aspects, a computer-readable storage medium is provided, the computer-readable storage medium storing computer executable instructions that, when executed by a processing unit, cause a computing device to receive a selection of one or more cells within a spreadsheet and identify an audio file associated with the selected one or more cells. The computer executable instructions further causing the computing device to receive a selection of a charting function, retrieve one or more parameters associated with the audio file, and create a chart based on the one or more parameters.

In still further aspects, a method for creating a chart is provided. The method includes receiving a selection of one or more cells within a spreadsheet and identifying data associated with the selected one or more cells. The method further includes receiving a selection of a charting function and creating a chart based at least in part on the data. Additionally, the method includes determining that the data satisfies a condition and, in response to determining that the data satisfies the condition, incorporating an audio file into the chart.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As described above, the disclosure generally relates to a system and methods for charting audio files and/or attributes of audio files in a spreadsheet. In aspects, when an audio file is associated with a spreadsheet, the audio file may be treated as a new type of data within the spreadsheet. In some aspects, a plurality of audio files may be associated with a spreadsheet, e.g., within a single cell or within a range of cells. In further aspects, both an audio file and additional data may be associated with a single cell (e.g., within a compound data type, as described herein). According to the present methods, the audio files themselves, as well as audio data (e.g., modulated data representing sound waves, etc.), audio attributes (e.g., frequency, amplitude, sampling rate, codec, bitrate, volume, pitch, speed, channel, audio effects, author/artist, creation date and/or time, file name, file size, duration, etc.), and/or spreadsheet data (e.g., values in cells, user comments, etc.) may be incorporated into a report (e.g., a chart) using a spreadsheet charting function. It is with respect to these and other general considerations that embodiments have been made.

Figure 1:
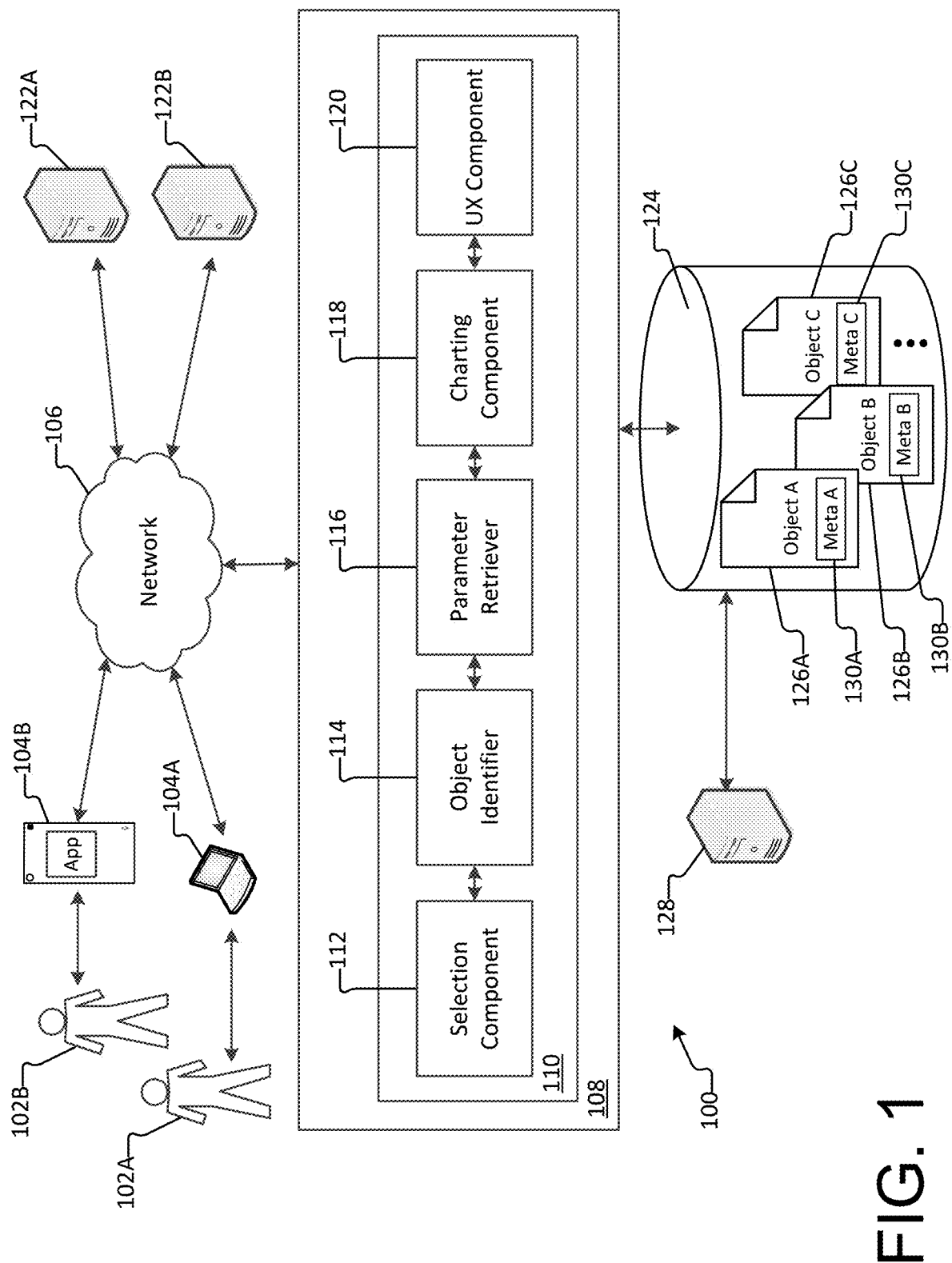
FIG. 1 illustrates a system for creating a chart in a spreadsheet application based at least in part on an object within the spreadsheet, according to an example embodiment.

FIG. 1 illustrates a system for creating a chart in a spreadsheet application based at least in part on an object within the spreadsheet, according to an example embodiment.

System 100 may include one or more client computing devices 104 (e.g., client computing devices 104A and 104B) that may execute a client version of a spreadsheet application capable of charting objects associated with a spreadsheet. For example, charting objects may include incorporating an object into a chart and/or charting attributes associated with the object. A chart may include any type of chart, graph, table, or report, such as a bar chart, map chart, scatter plot, line graph, tree chart, pie chart, radar chart, and the like, in any suitable number of dimensions. Objects associated with a spreadsheet may include, for example, images, audio files, videos, streamed data, and the like. Streaming data may refer to any type of data provided via a communications connection (e.g., via Bluetooth®, cellular, WAN, LAN, wired or wireless media, etc.) over some period of time. For instance, streaming data may refer to streaming audio (e.g., podcast, music, audio book), streaming video (e.g., live sports broadcast, YouTube® video, third-party hosted video, multiple frames transmitted from a camera, recorded video transmitted from a mobile device or video recorder, etc.), data feeds (e.g., twitter feed, stock ticker, fitness data from a wearable device, medical data from a medical device, diagnostic data from a mechanical device, etc.), and the like. An object may be "associated" with the spreadsheet by being embedded in a cell of the spreadsheet, anchored to a cell of the spreadsheet, referenced by a formula, name, hyperlink or pointer within the spreadsheet, positioned within the same row or column as a selected cell of the spreadsheet, and the like.

In some examples, the client spreadsheet application may execute locally on a client computing device 104. In other examples, a client spreadsheet application (e.g., a mobile app on a thin client computing device 104) may operate in communication (e.g., via network 106) with a corresponding server version of spreadsheet application 110 executing on one or more server computing devices, e.g., server computing device 108. In still other aspects, rather than executing a client version of a spreadsheet application, the one or more client computing devices 104 may remotely access, e.g., via a browser over network 106, the spreadsheet application 110 implemented on the server computing device 108 or multiple server computing devices (e.g., server computing devices 122A and 122B in a distributed computing environment such as a cloud computing environment).

As illustrated by FIG. 1, a server version of spreadsheet application 110 is implemented by server computing device 108. As should be appreciated, the server version of spreadsheet application 110 may also be implemented in a distributed environment (e.g., cloud computing environment) across a plurality of server computing devices (e.g., server computing devices 122A and 122B). Moreover, as should be appreciated, either a client or a server version of the spreadsheet application 110 may be capable of charting objects associated with a spreadsheet. While a server version of the spreadsheet application 110 and associated components 112-120 are shown and described, this should not be understood as limiting. Rather, a client version of spreadsheet application 110 may similarly implement components 112-120 on a client computing device 104.

In a basic configuration, the one or more client computing devices 104 are personal or handheld computers having both input elements and output elements operated by one or more users 102 (e.g., user 102A and user 102B). For example, the one or more client computing devices 104 may include one or more of: a mobile telephone; a smart phone; a tablet; a phablet; a smart watch; a wearable computer; a personal computer; a desktop computer; a laptop computer; a gaming device/computer (e.g., Xbox®); a television; a household appliance; and the like. This list is exemplary only and should not be considered as limiting. Any suitable client computing device for executing a client spreadsheet application and/or remotely accessing spreadsheet application 110 may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing device 108 may communicate with some components of the system via a local network (e.g., an enterprise intranet), whereas server computing device 108 may communicate with other components of the system via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

As described above, the spreadsheet application 110 may be implemented on a server computing device 108. In a basic configuration, server computing device 108 may include at least a processing unit and a system memory for executing computer-readable instructions. In some aspects, server computing device 108 may comprise one or more server computing devices 108 in a distributed environment (e.g., cloud computing environment). Server computing device 108 may provide data, including spreadsheet data, objects (e.g., images, audio files, videos, streaming data, and the like), object data and/or object attributes associated with the spreadsheet to and from the one or more client computing devices 104 and/or one or more other server computing devices (e.g., server computing devices 122A and/or 122B) via network 106.

As noted above, an object associated with a spreadsheet may include, for instance, an image, an audio file, a video, a link to streamed data, and the like. In other examples, an object may refer to any discrete data structure. For instance, objects may include shapes (e.g., a circle, triangle, square, etc.), diagrams (e.g., flow diagram, chart, tree, etc.)—essentially anything. With respect to images, each image may be stored as an image file in a file format identified by a file extension, such as .jpeg, .png, .gif, .tiff, etc., and may be retrieved based on a file locator, which may be a uniform resource locator (URL) identifying a file path to a local storage location or a remote storage location. In aspects, an image may be defined by image data (e.g., raw pixel data, an array of pixel values, or other data for rendering the image) and image attributes (e.g., opacity, color palette, resolution, aspect ratio, image dimensions, author, creation date and/or time, file name, tags, file size, GPS location information, etc.). In some aspects, each image attribute may be defined by an attribute-value pair. That is, an image attribute (e.g., image height) may be paired with a value for that attribute (e.g., 1.04 inches) for a particular image. In other aspects, image attributes may be organized in any suitable structured format, e.g., an array of values, a record with an array of fields, a table, an array of vectors, etc.

With respect to audio files, sound waves may be digitally encoded (e.g., by pulse-code modulation), in some cases processed (e.g., filtered, edited, etc.) and/or compressed (e.g., based on a codec to reduce file size), and stored as an audio file in a file format identified by a file extension, such as .wav, .wma, .aiff, .m4a, .snd, .mp3, .omf, etc. For example, a microphone of a mobile device may record (or capture) sound waves (e.g., of a conversation) and may convert the sound waves into an analog electric signal. An analog-to-digital converter (ADC) may then convert the analog signal into a digital signal, e.g., generally using pulse-code modulation. In some cases, the ADC may be available on the mobile device, while in other cases the analog signal may be downloaded from the mobile device and converted to a digital signal on another device (e.g., personal or server computing device). The digital signal may be processed and/or compressed and stored in a file format (e.g., audio data), as detailed above. Later, when an audio file is played, the digital signal may be converted back to an analog electrical signal using a digital-to-audio converter (DAC) for transmission to a speaker. An audio file may be defined by audio data (e.g., digital data encoding soundwaves) and audio attributes (e.g., frequency, amplitude, sampling rate, codec, bitrate, volume, pitch, speed, channel, audio effects, author/artist, creation date and/or time, file name, file size, duration, etc.).

A video may refer to moving images, with or without an audio track, and a video file may encode data for rendering the moving images and playing the audio track, if included. The term "moving images" generally refers to an array of images (e.g., individual frames) that are shot in sequence over a time period (e.g., capture rate) and are then spliced together and "played" (or displayed) consecutively at a certain rate (e.g., frame rate). However, in aspects, any array of images (whether related or not) may be spliced together and played at a frame rate to create a video (or a slideshow). An audio track refers to any type of audio, e.g., speech, music, sounds, or any combination thereof, that is associated with a video, whether synchronized with individual frames or not. In some cases, an audio track may be recorded with a video (e.g., on a mobile device, video recorder, movie camera, etc.). In other aspects, an audio track may be added to a video at a later time and may be synchronized with individual frames of the video, or not. In aspects, a video file may include video data (e.g., an array of pixel values for rendering each individual frame of a video and/or modulated data for reproducing soundwaves of an audio track). A video file may further include video attributes (e.g., frame rate, aspect ratio, duration, resolution, bits per frame, video size, synchronization data, etc.), individual frame attributes (e.g., aspect ratio, color space, bitrate, etc.) and/or audio attributes (e.g., pitch, volume, speed, etc.).

As detailed above, streamed data may include any type of data received over some type of communications connection for some period of time. Streamed data may include, for instance, streaming video, streaming audio or a data feed that is associated with the spreadsheet based on a hyperlink to a streaming device (e.g., camera, mobile device, medical device, fitness device, etc.), a URL referencing a third party service (e.g., YouTube®, Netflix®, Twitter®, Pandora®, Spotify®, etc.), or the like. For instance, references to URLs within the spreadsheet may include: =GETFEED("https://twitter.com/hashtag/Fastcars?src=hash&lang=en") or = GETSTREAM("https://www.amazon.com/East/dp/B0152ZY7KQ/ref=sr_1_1?s=instant-video&ie=UTF8&qid=1466705933&sr=1-1&keywords=fast+cars"), etc. In some cases, the URL may specify a parameter to be 'on' or 'play' by default. In a first example, the function would return a handle to the data stream that may just show a blank screen or a first frame of data. In the case where the optional parameter is 'true' (it may be false by default to avoid performance issues), then the function would return the data stream and the data stream would start refreshing and playing its data. Syntax may include: "=GETVIDEO("http://foo.com/bar/feed", TRUE)". Alternatively, in the case where the data stream is not played immediately, the data stream may only play on demand (via UI control, or via some other calling function or feature that points at that stream object and asks it to play). In a case where video is streamed directly from a camera, there may be additional parameters passed to control the device itself, e.g., OFF, STANDBY, RESET, etc. In other examples, streaming data may be associated with a cell without using a globally unique name or URL by selecting an "Insert" operation in the toolbar and using a dialog filtered to video types or streaming data types (e.g., streaming video, streaming audio, live data feeds, etc.) to find and insert the streaming data.

In further aspects, the dynamic data (e.g., video file, live data feed, streaming audio or streaming video) and attributes (e.g., image attributes, audio attributes and/or video attributes), may be associated with additional data (e.g., data describing the content of the dynamic data, a text transcription of an audio track, or any other data, etc.) in a single compound data type. Additionally, compound data types can hold multiple data streams and/or multiple videos, etc. Moreover, an application program interface (API) may be provided that can talk back to the data stream. This type of functionality allows two things: first, the data stream may be triggered and/or controlled (in the case of attached devices); and second, simple playback of the data stream, e.g., start, stop, lock, refresh, as well as user interface controls. Additionally, for data streams that allow it (e.g., delayed live TV feeds), a 'look ahead' buffer may be enabled such that the next steps in calculations may be modeled theoretically. In a more advanced case of an active 'look ahead,' one function may handle calculations based on real time data (e.g., current data) and a predictive function may run on an offset that anticipates data five seconds ahead of the current data. The results of these functions may be compared (e.g., delta) in a moving calculation. By combining this theoretical model with talking back to the data stream, a device (e.g., having a steering wheel) may be controlled in real-time via calculations in a spreadsheet. For instance, the device may be steered through a number of obstacles using a combination of cameras streaming locations of nearby obstacles as the device moves through a course. This implementation enables a steering model in the spreadsheet to calculate the results of steering the device through the obstacle course using a feedback loop, as described above.

Data attributes may describe the streaming data. For instance, streaming data may be transmitted based on a protocol in a format at a packet rate, and may include a packet size. In some cases, data attributes may be described by attribute-value pairs and/or attribute-type pairs. For instance, for attribute "protocol" a type may be "TCP/IP"; for attribute "packet size" a value may be "64K"; and the like. In other cases, data associated with streaming data may not be represented as name/value pairs but may simply represent "data," e.g., an array of pixel data, an array of values, etc. In still other cases, these types of properties may be considered distinct 'rich types' of data, which means you may be permitted to convert the value to some other value. For example, in the case of "data rate" the user may be offered an interaction to down-convert to a lower rate, e.g., 1 Mb/s to 0.5 Mb/s. This conversion may require a reduction in resolution, framerate, or some other property of the video. In the case of video resolution, a user may start with 4 k and the act of changing to 1024×768 may trigger a resample of the video. The logic to do this type of conversion may be bundled up via a user defined function (UDF), which is a customized function that may be created by a user directly within a spreadsheet. In some aspects, the value changes to resolution, size, etc., may be written back to the source, or may be a property of a 'display format' that is applied when the video is played back on the client side. As should be appreciated, the above examples of data attributes and other data are offered as examples only.

As should be further appreciated, attributes associated with objects may be organized and stored in any suitable data structure. In further examples, object attributes may be appended as metadata to the object (e.g., image file, audio file, video file, data stream, etc.). For instance, as illustrated, metadata 130A may be appended to object 126A, metadata 130B may be appended to object 126B, and metadata 130C may be appended to object 126C and stored in storage location 124. Alternatively, the object attributes may be stored in a separate location or database from the objects and may be referenced by or otherwise indexed to the objects (not shown). In at least some examples, objects may be stored in different storage locations within a distributed environment (e.g., cloud computing environment) accessible to spreadsheet application 110 over a network, e.g., network 106. As described herein, the location of an object (e.g., image file, audio file, video, streaming data, etc.) in storage may be represented by a file locator or link, which may be a URL to local storage (e.g., C:\Pictures\elephant1.jpeg), a URL to remote storage accessible over a network (e.g., http://www.pics.com/tree.png), a live link to a streaming device, etc. Additionally, an object may be referenced by name (e.g., "elephant1 jpeg") to locate it within the local workbook file. In other aspects, the object may be referenced within a function of the spreadsheet by a globally unique name. A globally unique name can be any string, e.g., "elephant," or "elephant1" or "elephant.jpg," that uniquely identifies the object within the spreadsheet workbook. For instance, to call the object from another cell in the spreadsheet, the function "=elephant" may be used in the cell. However, if the same name is used on different sheets of a spreadsheet to return different values, the name may be qualified by the sheet on which it appears in order to create a globally unique name, e.g., "Sheet1!OctoberEarnings" and "Sheet2!OctoberEarnings." In still other aspects, an object may be referenced by a cell address. In this case, for an object added to a spreadsheet in cell A1, the formula "=A1" will simply grab the object. If the object has a bitrate property, for example, another formula such as "=A1.bitrate" (e.g., written into cell B1) would access the object in cell A1 and retrieve the bitrate field (e.g., from metadata associated with the object). If no such bitrate field exists, the formula in B1 may error out. In this way, whether or not an object has been given a globally unique name, cell address dereferencing enables formulas to be written that operate on objects within cells.

As illustrated in FIG. 1, the spreadsheet application 110 may include various components for charting objects and/or object attributes associated with a spreadsheet, including a selection component 112, an object identifier 114, a parameter retriever 116, a charting component 118, a UX component 120, and the like. In aspects, each component may communicate and pass data between the other components. The various components may be implemented using hardware, software, or a combination of hardware and software. Moreover, the various components may be executed on a single server computing device (e.g., server computing device 108), on multiple server computing devices (e.g., server computing devices 122A, 122B and/or 128), or locally on a client computing device (e.g., client computing device 104A or 104B).

In aspects, selection component 112 may receive a selection of one or more cells of a spreadsheet. A cell or a range of cells may be selected, either automatically (e.g., based on a function) or by user selection. That is, in some aspects, operations may call (or select) a cell without requiring user input, e.g., operations such as 'data refresh,' 'import from such and such data source,' 'copy paste,' etc. In other aspects, a spreadsheet application (e.g., spreadsheet application 110) may provide the spreadsheet to a user, the spreadsheet including one or more sheets, each sheet having a plurality of rows and columns of cells. Cells may be selected by highlighting or otherwise identifying the cell or range of cells using a gesture, touch, mouse click, keyboard input, and the like. When a single cell is selected, the cell may be identified in a toolbar of the user interface by a cell identifier that specifies a location of the cell within the spreadsheet. For example, a cell identifier of "A1" specifies that the cell is located in column A, row 1 of the spreadsheet, while a cell identifier of "B5" specifies that the cell located in column B, row 5 of the spreadsheet. The cell identifier may further be displayed adjacent to a formula bar (or "fx bar") identifying the contents of the cell in the toolbar of the user interface. When a range of cells is selected, the cell at the top left corner of the range may be displayed by a cell identifier next to the formula bar, with the range of cells being represented by a range identifier including cell identifiers for the cell at the top left corner and the cell at the bottom right corner (e.g., A1:C5).

In other aspects, selection component 112 may receive a selection of an object (e.g., an image, audio file, video, streaming data, etc.) associated with the spreadsheet, either automatically or by user selection. That is, in some aspects, operations may call (or select) an object without requiring user input, e.g., operations such as 'data refresh,' 'import from such and such data source,' 'copy paste,' etc. In other aspects, a spreadsheet application (e.g., spreadsheet application 110) may provide the spreadsheet to a user, the spreadsheet including one or more sheets, each sheet having a plurality of rows and columns of cells. Objects within the spreadsheet (e.g., associated with one or more cells) may be selected by highlighting, by inputting a formula referencing the object or an object name and/or by otherwise identifying the object and/or the cell(s) with which the object is associated using a gesture, touch, mouse click, keyboard input, and the like.

In examples where an object is not directly selected, an object identifier 114 may identify one or more objects associated with the selected one or more cells. As described above, an object may be associated with one or more cells by being directly embedded into the one or more cells. For instance, in the case of an image, image data and image attributes may be embedded in the one or more cells as a value and the image may be drawn in the same pixelated space within the spreadsheet as the one or more cells. In other cases, an object may be anchored within the one or more cells based on a function that references the object (e.g., =IMAGE("http://www.mattspics.com/weather/rainy-day.png")). In still other cases, an object may be associated with the spreadsheet without a formula, for instance, a name for the object may simply be listed without the "=IMAGE" operator, e.g., "4two.png, red.png" or "<Image> 4two.png, red.png". In still other cases, an object may be associated with the selected one or more cells based on being associated with a cell that is related to the selected one or more cells. A cell may be related to the selected one or more cells based on being in the same row and/or column as at least one cell within the selected one or more cells.

In aspects, parameter retriever 116 may retrieve object data and/or object attributes for each object identified by the selection component 112 or the object identifier 114. Object data may include, for instance, image data (e.g., raw pixel data, an array of pixel values, or other data for rendering the image), audio data (e.g., digital data encoding soundwaves), video data (e.g., an array of pixel values for rendering each individual frame of a video and/or modulated data for reproducing soundwaves of an audio track), data values (e.g., individual stock prices for a particular stock over a period of time, heartrates over a period of time, insulin levels over a period of time, etc.), and the like. Object attributes may be descriptors, such as image attributes (e.g., opacity, color palette, resolution, aspect ratio, image dimensions, author, creation date and/or time, file name, tags, file size, GPS location information, etc.), audio attributes (e.g., frequency, amplitude, sampling rate, codec, bitrate, volume, pitch, speed, channel, audio effects, author/artist, creation date and/or time, file name, file size, duration, etc.), video attributes (e.g., frame rate, aspect ratio, duration, resolution, bits per frame, video size, synchronization data, aspect ratio, color space, bitrate, pitch, volume, speed, etc.), data attributes (e.g., packet rate, packet size, protocol, bandwidth, etc.), and the like. In some aspects, parameter retriever may retrieve object data and/or object attributes from an object file or a stream of data. In further aspects, object attributes may be retrieved from metadata associated with an object file or a stream of data. In still further aspects, object data and/or object attributes may be retrieved from a compound data type associated with the object. In still further aspects, objects may be passed to a third party service for processing, which may return additional object parameters for charting, such as the number of people in a photo, the number of smiling people in a photo, the names of people in a photo, the type of animal in a photo, actors identified in a video, emotions detected from face recognition while a test group (or other group) is watching a video or listening to an audio recording based on a streaming video recording of the test group, emotions identified among persons within a video, and the like. As should be appreciated, object parameters may be retrieved for each object via any suitable means.

A compound data type may include data types such as: image data, image attributes, alphanumeric data, audio data, audio attributes, video data, video attributes, streamed data, data attributes, and the like. In aspects, a compound data type may reference a file (e.g., an image file, audio file, video file, etc.) or a data stream (e.g., stock ticker, Twitter® feed, camera feed, wearable device feed, etc.) that includes object data (e.g., image data, audio data, video data, data feed, etc.) and/or object attributes (e.g., image attributes, audio attributes, video attributes, data attributes, etc.) in a structured format. In some cases, where an object is associated with a compound data type, the structure of a compound data type may be leveraged in complex calculations, thereby providing a model for referencing and using different aspects of the data. For example, each component of a compound data type may be represented by a formula or a function. Such individual representation of components facilitates the creation of structures in a single cell where calculations can reference back to other components of the compound data type. For instance, any of the fields of the compound data type can be dereferenced and acted on. That is, a formula may be constructed to get the value of a special field ("=GetAttribute(<field name>)"), an operator may be used to get the value (e.g., the dot "." operator, "=A1.aspectratio"), or a unique name may be used to get the value (e.g., if cell A1 has a unique name, "OctoberEarningsRecording.aspectratio"). In this way, each field is available to the charting component 118 described below.

Charting component 118 may create a chart. As described above, a chart may include any type of chart, graph, table, or report, such as a bar chart, map chart, scatter plot, line graph, tree chart, pie chart, radar chart, and the like, in any suitable number of dimensions. In some aspects, charting component 118 may receive a selection of a charting function that specifies the data and/or attributes to be charted and the type of chart to be created. For instance, a chart may be created based on data associated with the selected one or more cells and/or based on object data and/or object attributes. In some cases, the object or a representation of the object may be incorporated into the chart. That is, an image, an audio file, a video, streaming data, etc., may be incorporated into the chart. In some cases, a separate window or overlay may be incorporated into the chart, e.g., for displaying streaming data including streaming audio, streaming video, a data feed (such as a stock ticker, Twitter® feed, etc.).

By way of example, for three images associated with the selected one or more cells, the GPS location where each image was created may be retrieved from metadata associated with each image and may be charted on a map chart. In this case, the GPS locations may not be generally viewable within the selected one or more cells. Moreover, each of the three images may be incorporated into the map chart at the GPS location where the image was created. In another example, data associated with the selected one or more cells (e.g., sticker price data for three makes and models of used cars) may be charted in a bar chart and an image for each make and model of used car may be incorporated into the bar representing the corresponding data for that make and model. In yet another example, a duration for each of a plurality of audio files associated with the selected one or more cells may be retrieved. The duration information may be charted on a pie chart and a visual representation for each audio file may be incorporated into an appropriate segment of the pie chart corresponding to the duration of each audio file. In yet another example, a cell within a spreadsheet may reference a link to a glucometer for receiving glucose levels for a user over a period of time. For each day of glucose monitoring, a different cell may reference the link to the glucometer. In this case, an average glucose level for each day may be calculated and presented in a bar chart. Alternatively, each glucose reading may be charted as a data point in a line graph over some period of time.

Although specific examples for objects such as images, audio files, videos and streaming data have been described above, objects may include any discrete data structure. In this case, objects may include shapes (e.g., circle, triangle, square, etc.), diagrams (e.g., flow diagram, chart, tree, etc.)—essentially anything. For instance, a compound data type may be defined with a shape as a field. When fields of the compound data type are charted, the object (e.g., shape) could be provided within the chart as a data point. Other examples are possible and any arbitrary object may be part of the compound data type framework. As should be appreciated, the above examples are provided for purposes of explanation and should not be considered limiting.

UX component 120 may communicate with charting component 118 to provide one or more user interfaces for selecting charting functions and for presenting charts of objects associated with a spreadsheet. Selections and/or inputs of charting functions may be received by gesture, touch, mouse input, keyboard input, etc. For example, UX component 120 may provide a tool bar, popup menu, drop-down menu, ribbon, etc., that includes UI controls for selecting a charting function. For example, UI controls may be provided for specifying the data or parameters to be charted and the type of chart to be created. As should be appreciated, UX component 120 may further present the chart within the spreadsheet. For example, the chart may be displayed in a separate window, as an overlay, etc., within an interface of the spreadsheet application. In some aspects, the chart may be interactive and may be configured to launch additional interfaces upon selection (e.g., launch a separate window to play a video, view an image, access a plurality of audio tracks, etc.). UX component 120 may provide any suitable interface for viewing charted data and/or objects, as described herein.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
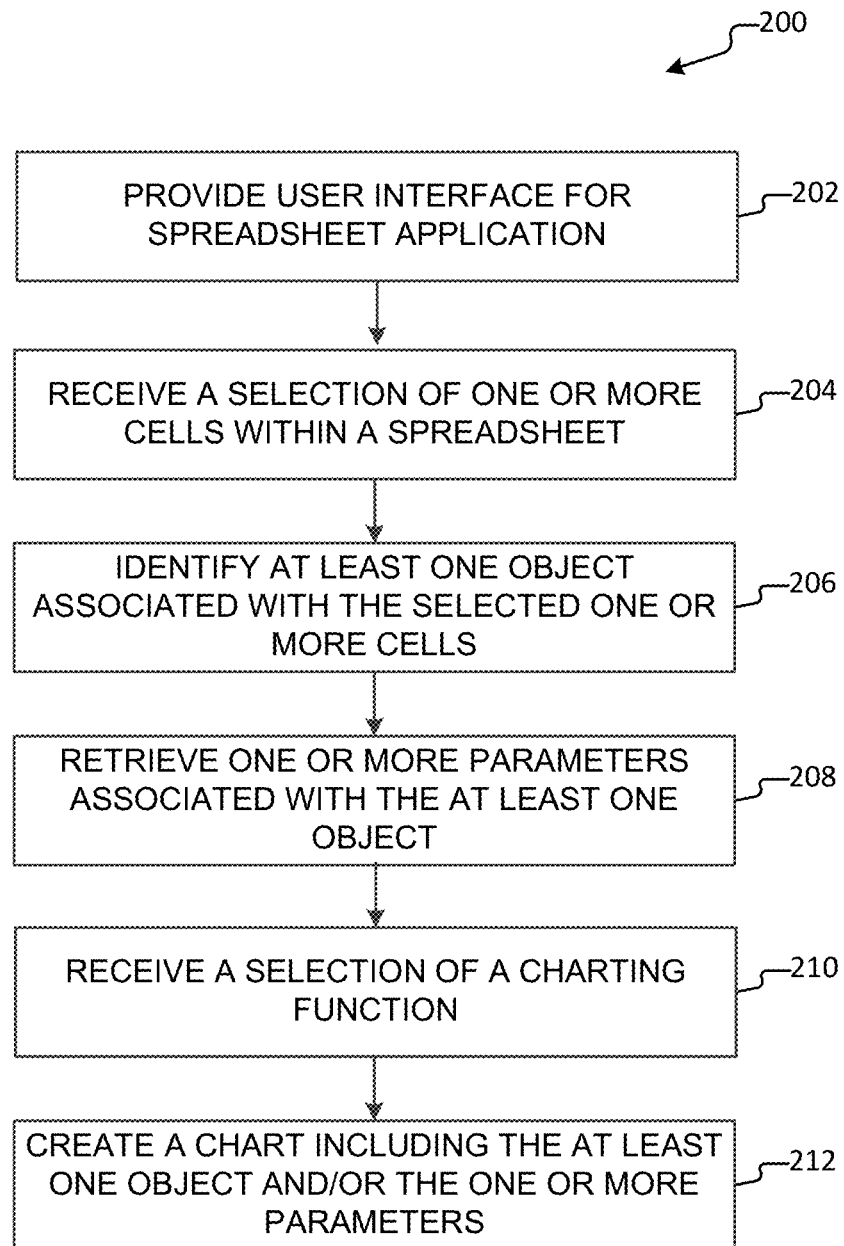
FIG. 2 illustrates a method for charting an object associated with a spreadsheet, according to an example embodiment.

FIG. 2 illustrates a method for charting an object associated with a spreadsheet, according to an example embodiment.

Method 200 begins with provide interface operation 202, where a spreadsheet application may provide (or cause to be provided) a user interface to a user. For example, a UX component (e.g., UX component 120) may facilitate a user experience (UX) by providing the user interface of a spreadsheet application (e.g., spreadsheet application 110) via a display. Selections and/or inputs may be received by the user interface based on gestures, touch, mouse movements, and the like. The user interface may operate in conjunction or communication with one or more other components of the spreadsheet application (e.g., selection component 112, object identifier 114, parameter retriever 116, and charting component 118) to chart objects, object data and/or object attributes associated with a spreadsheet.

At receive selection operation 204, one or more cells of a spreadsheet may be selected, either automatically (e.g., based on a function) or by user selection. For example, a selection component (e.g., selection component 112) may receive a selection of one or more cells, either automatically or by user indication. That is, in some aspects, operations may call (or select) the one or more cells without requiring user input, e.g., operations such as 'data refresh,' 'import from such and such data source,' 'copy paste,' etc. In other aspects, a spreadsheet application (e.g., spreadsheet application 110) may provide the spreadsheet to a user, the spreadsheet including one or more sheets, each sheet having a plurality of rows and columns of cells. The one or more cells may be selected by highlighting or otherwise identifying the cell or range of cells using a gesture, touch, mouse click, keyboard input, and the like. When a single cell is selected, the cell may be identified in a toolbar of the user interface by a cell identifier that specifies a location of the cell within the spreadsheet. For example, a cell identifier of "A1" specifies that the cell is located in column A, row 1 of the spreadsheet, while a cell identifier of "B5" specifies that the cell located in column B, row 5 of the spreadsheet. The cell identifier may further be displayed adjacent to a formula bar (or "fx bar") identifying the contents of the cell in the toolbar of the user interface. When a range of cells is selected, the cell at the top left corner of the range may be displayed by a cell identifier next to the formula bar, with the range of cells being represented by a range identifier including cell identifiers for the cell at the top left corner and the cell at the bottom right corner (e.g., A1:C5).

At identify object operation 206, at least one object that is associated with the selected one or more cells may be identified. For example, an object identifier (e.g., object identifier 114) may identify at least one object associated with the selected one or more cells. An object may refer to an image, an audio file, a video, streaming data, and the like. In aspects, an object may be "associated" with one or more cells by being embedded in the one or more cells, anchored to the one or more cells, referenced by a formula, name or pointer within the one or more cells, positioned within the same row or column as a selected cell of the one or more cells, and the like. As should be appreciated, at least one object associated with the selected one or more cells may be identified by any suitable means.

At retrieve parameters operation 208, one or more parameters associated with the identified object(s) may be retrieved. Retrieve parameters operation 208 may be performed by a parameter retriever (e.g., parameter retriever 116) of a spreadsheet application (e.g., spreadsheet application 110). As described above, parameters of objects may include, for instance, object data and/or object attributes. Object data may include, for instance, image data (e.g., raw pixel data, an array of pixel values, or other data for rendering the image), audio data (e.g., digital data encoding soundwaves), video data (e.g., an array of pixel values for rendering each individual frame of a video and/or modulated data for reproducing soundwaves of an audio track), data values (e.g., individual stock prices for a particular stock over a period of time, heartrates over a period of time, insulin levels over a period of time, etc.), and the like. Object attributes may be descriptors, such as image attributes (e.g., opacity, color palette, resolution, aspect ratio, image dimensions, author, creation date and/or time, file name, tags, file size, GPS location information, etc.), audio attributes (e.g., frequency, amplitude, sampling rate, codec, bitrate, volume, pitch, speed, channel, audio effects, author/artist, creation date and/or time, file name, file size, duration, etc.), video attributes (e.g., frame rate, aspect ratio, duration, resolution, bits per frame, video size, synchronization data, aspect ratio, color space, bitrate, pitch, volume, speed, etc.), data attributes (e.g., packet rate, packet size, protocol, bandwidth, etc.), and the like. In some aspects, parameters including object data and/or object attributes may be retrieved from an object file or a stream of data. In further aspects, object attributes may be retrieved from metadata associated with an object file or a stream of data. In still further aspects, object data and/or object attributes may be retrieved from a compound data type associated with the object. As should be appreciated, one or more parameters may be retrieved for each identified object via any suitable means.

At receive charting function operation 210, a selection of a charting function may be received, either automatically or by user indication. For example, a selection of a charting function may be received by a charting component (e.g., charting component 118) of a spreadsheet application. In some aspects, an interface such as a toolbar, ribbon, drop-down menu, etc., may be provided for receiving a selection of the charting function. For instance, the interface may display various types of reports or charts for selection, e.g., bar charts, map charts, scatter plots, line graphs, tree charts, pie charts, radar charts, and the like. Moreover, the interface may provide for selection of multiple-dimensioned charts, e.g., two-dimensional (e.g., line graph, bar chart, pie chart, map chart) and three-dimensional (surface chart, topical relief map, xyz line graph, etc.) charts may be available for selection. In other aspects, a chart may be automatically selected. For instance, in response to identifying an object that is a live data feed of heartrate data for an athlete, a line graph may automatically be selected and rendered to present the heartrate data to the athlete's trainer during a race. In further aspects, the interface for selecting the charting function may further provide for selection of one or more parameters to be charted. In some cases, the selected one or more cells may be associated with rows and/or columns of data for charting. In other cases, e.g., where the selected one or more cells are associated with a plurality of images, a selection may be received to chart parameters such as the creation date and author for each image in a scatter plot. In some aspects, where parameters are not displayed within the spreadsheet, an additional interface (e.g., dropdown menu) may be provided for selecting these parameters for charting. That is, some parameters may be associated with an object as metadata or as a compound data type and may not be visible as values within cells of the spreadsheet. As should be appreciated, a selection of a charting function including a chart type and/or parameters for charting may be received via any suitable means.

At create chart operation 212, a chart may be created including the at least one object and/or object parameters. For instance, a charting component (charting component 118) may create a chart and a UX component (UX component 120) may provide the chart in an interface of the spreadsheet application. A chart may be created based on data associated with the selected one or more cells and/or based on object data and/or object attributes. For instance, as described above, object parameters that are not visible within the spreadsheet may be charted. That is, object data (such as raw pixel data, an array of pixel values, digitally-modulated sound waves, etc.) and/or object parameters (such as a bitrate, resolution, creation date and/or time, GPS location data, etc.) may be retrieved from metadata or a compound data type associated with the object and charted. In additional or alternative cases, the object or a representation of the object may be incorporated into the chart. That is, an image, an audio file, a video, streaming data, etc., may be incorporated directly into the chart, as described with respect to charting component 118 above. As should be appreciated, the above examples are provided for purposes of explanation and should not be considered limiting.

As should be further appreciated, operations 202-212 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 3:
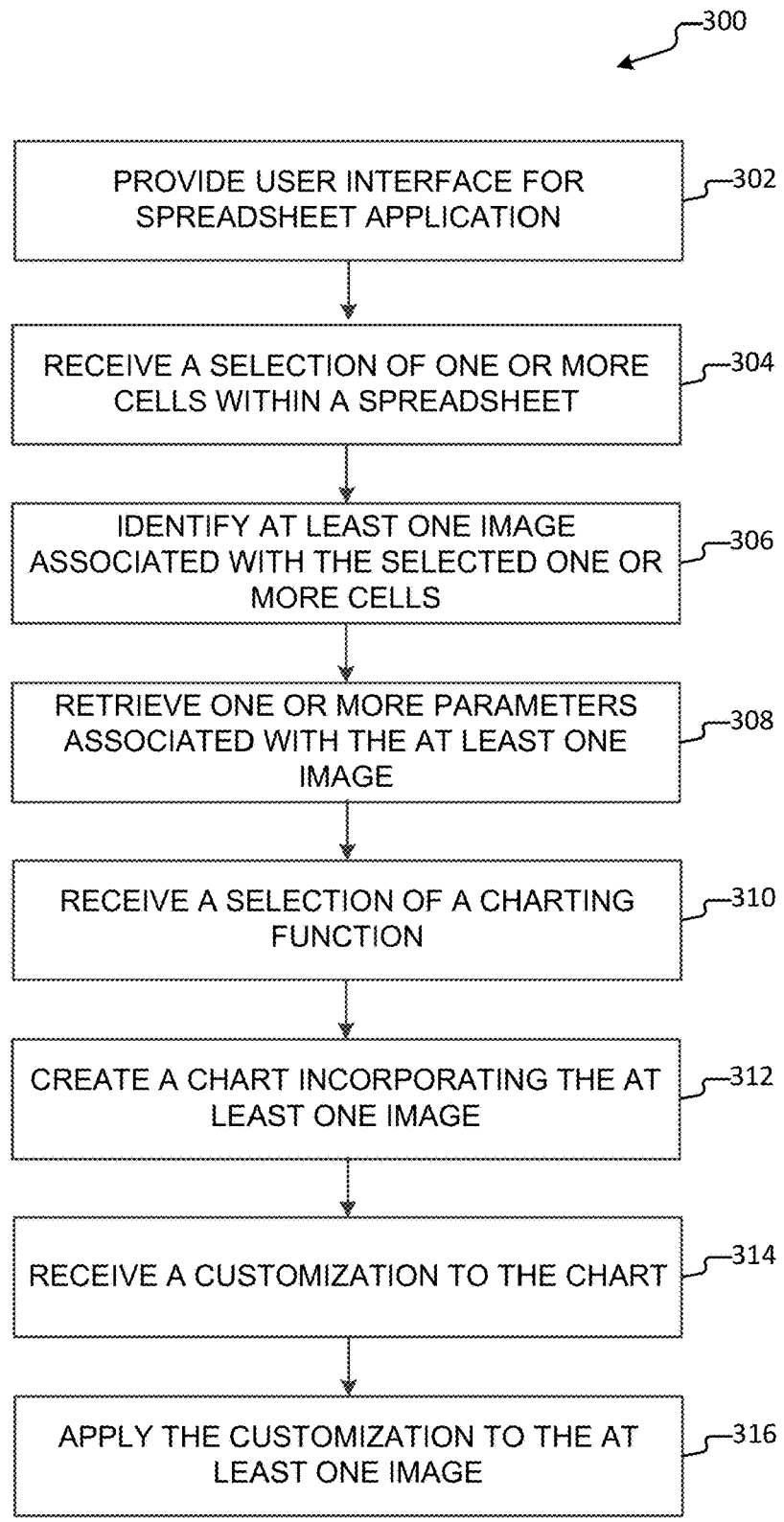
FIG. 3 illustrates a method for customizing an image incorporated into a chart, according to an example embodiment.

FIG. 3 illustrates a method for customizing an image incorporated into a chart, according to an example embodiment.

Method 300 begins with provide interface operation 302, where a spreadsheet application may provide (or cause to be provided) a user interface to a user. For example, as described above with reference to provide interface operation 202, a UX component (e.g., UX component 120) may facilitate a user experience (UX) by providing the user interface of a spreadsheet application (e.g., spreadsheet application 110) via a display. Selections and/or inputs may be received by the user interface based on gestures, touch, mouse movements, and the like.

At receive selection operation 304, one or more cells of a spreadsheet may be selected, either automatically (e.g., based on a function) or by user selection. For example, as described above with respect to receive selection operation 204, a selection component (e.g., selection component 112) may receive a selection of one or more cells, either automatically or by user indication.

At identify image operation 306, at least one image associated with the selected one or more cells may be identified. For example, an object identifier (e.g., object identifier 114) may identify at least one image associated with the selected one or more cells. In aspects, an image may be "associated" with one or more cells by being embedded in the one or more cells, anchored to the one or more cells, referenced by a formula, name or pointer within the one or more cells, positioned within the same row or column as a selected cell of the one or more cells, and the like. As should be appreciated, at least one image associated with the selected one or more cells may be identified by any suitable means.

At retrieve parameters operation 308, one or more parameters associated with the identified image(s) may be retrieved. Retrieve parameters operation 308 may be performed by a parameter retriever (e.g., parameter retriever 116) of a spreadsheet application (e.g., spreadsheet application 110). As described above, parameters of images may include, for instance, image data and/or image attributes. Image data may include, e.g., raw pixel data, an array of pixel values, or any other data for rendering the image. Image attributes may include, e.g., opacity, color palette, resolution, aspect ratio, image dimensions, author, creation date and/or time, file name, tags, file size, GPS location information, etc. In some cases, image attributes may be retrieved from metadata associated with an image file. In other cases, image data and/or image attributes may be retrieved from a compound data type associated with the image. As should be appreciated, one or more parameters may be retrieved for each identified image via any suitable means.

At receive charting function operation 310, a selection of a charting function may be received, either automatically or by user indication. For example, as described above with respect to receive charting function operation 210, a selection of a charting function may be received by a charting component (e.g., charting component 118) of a spreadsheet application. In some aspects, an interface such as a toolbar, ribbon, dropdown menu, etc., may be provided for receiving a selection of the charting function. The interface may display various types of charts for selection, e.g., bar charts, map charts, scatter plots, line graphs, tree charts, pie charts, radar charts, and the like. In other aspects, a chart may be automatically selected. Further, the interface may provide for selecting one or more parameters to be charted. In some cases, e.g., where the selected one or more cells are associated with a plurality of images, a selection may be received to chart parameters such as the creation date and author for each image in a scatter plot. In some aspects, where parameters are not displayed within the spreadsheet, an additional interface (e.g., dropdown menu) may be provided for selecting such parameters for charting. That is, some parameters may be associated with an image as metadata or as a compound data type and may not be visible as values within cells of the spreadsheet. As should be appreciated, a selection of a charting function including a chart type and/or parameters for charting may be received via any suitable means.

At create chart operation 312, a chart may be created incorporating the at least one image. For instance, a charting component (charting component 118) may create a chart and a UX component (UX component 120) may provide the chart in an interface of the spreadsheet application. In particular, the image or a representation of the image (e.g., icon) may be incorporated into the chart. For example, three images may be associated with the selected one or more cells. A GPS location corresponding to where each image was created may be retrieved from metadata associated with each image and each GPS location may be presented on a map chart. In some examples, although provided as metadata, the GPS locations may not be visible as values within the selected one or more cells. In further examples, each of the three images (or representations of the images) may be incorporated into the map chart at the GPS location where the image was created. In still further aspects, the map chart may automatically be resized so as to present each image in an appropriate size for viewing by a user. In some cases, resizing the map chart may be based at least in part on an aspect ratio for each image, which aspect ratio may fixed or adjustable. When the map chart is displayed on a mobile device or other reduced-size display, although each image may be incorporated into the map chart, each image may be represented by a placeholder such as an icon. In this case, in response to selection of the icon, the image may be launched in a separate window, overlay, or any other suitable interface, for presentation to a user. As should be appreciated, the above examples are provided for purposes of explanation and should not be considered limiting.

At receive customization operation 314, a customization to the chart may be received. For instance, a user may apply various effects to the chart, such as shading effects, fill effects (e.g., based on different color hues), texture fill effects, gradient fill effects, transparency effects, glow and/or soft edge effects, three-dimensional effects, or some combination thereof. As should be appreciated, any customization that is made available by the spreadsheet application may be received and applied to the chart.

At apply customization operation 316, the customization may be applied to the at least one image incorporated into the chart. For instance, when a gradient, red fill effect was received and applied to a bar chart, the at least one image may also be customized with a gradient, red fill effect. Similarly, when shading effects are applied to a map chart, such shading effects may also be applied to the at least one image incorporated into the chart. However, in at least some aspects, such customizations may not be rewritten to the image file associated with the spreadsheet. As should be appreciated, in addition to an image associated with a spreadsheet, the above-described operations may be applied to other objects associated with a spreadsheet, e.g., an audio file, a video, streaming data, and the like.

As should be further appreciated, operations 302-316 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 4:
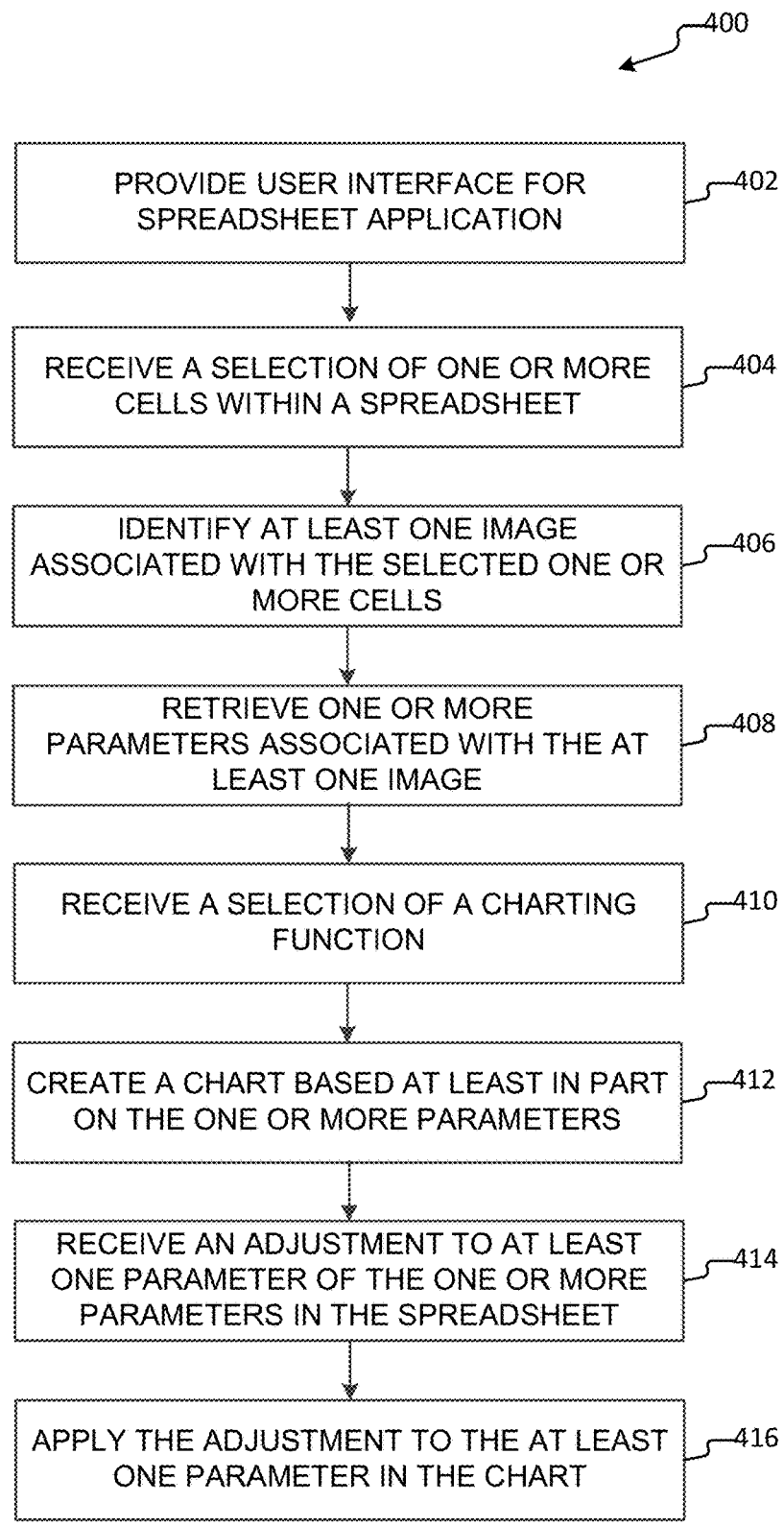
FIG. 4 illustrates a method for manipulating an image associated with a spreadsheet that is incorporated into a chart, according to an example embodiment.

FIG. 4 illustrates a method for manipulating an image associated with a spreadsheet that is incorporated into a chart, according to an example embodiment.

Method 400 begins with provide interface operation 402, where a spreadsheet application may provide (or cause to be provided) a user interface to a user. For example, as described above with reference to provide interface operation 202, a UX component (e.g., UX component 120) may facilitate a user experience (UX) by providing the user interface of a spreadsheet application (e.g., spreadsheet application 110) via a display. Selections and/or inputs may be received by the user interface based on gestures, touch, mouse movements, and the like.

At receive selection operation 404, one or more cells of a spreadsheet may be selected, either automatically (e.g., based on a function) or by user selection. For example, as described above with respect to receive selection operation 204, a selection component (e.g., selection component 112) may receive a selection of one or more cells, either automatically or by user indication.

At identify image operation 406, at least one image associated with the selected one or more cells may be identified. For example, an object identifier (e.g., object identifier 114) may identify at least one image associated with the selected one or more cells, as described above with respect to identify image operation 306.

At retrieve parameters operation 408, one or more parameters associated with the identified image(s) may be retrieved. Retrieve parameters operation 408 may be performed by a parameter retriever (e.g., parameter retriever 116) of a spreadsheet application (e.g., spreadsheet application 110), as described above with respect to retrieve parameters operation 308.

At receive charting function operation 410, a selection of a charting function may be received, either automatically or by user indication. For example, as described above with respect to receive charting function operation 310, a selection of a charting function including a chart type and/or one or more parameters for charting may be received by a charting component (e.g., charting component 118) of a spreadsheet application. As described above, the one or more parameters associated with an image may include image data (e.g., raw pixel data, an array of pixel values, or any other data for rendering the image) and/or image attributes (e.g., opacity, color palette, resolution, aspect ratio, image dimensions, author, creation date and/or time, file name, tags, file size, GPS location information, etc.). As further described above, where the one or more parameters are not displayed within the spreadsheet, an additional interface (e.g., dropdown menu) may be provided for selecting such parameters for charting. For example, an aspect ratio of each of three images associated with the selected one or more cells may be selected for charting in a scatter plot. As should be appreciated, any of the one or more parameters associated with the three images may be selected for charting and any appropriate type of chart for presenting the one or more parameters may be selected.

At create chart operation 412, a chart may be created based at least in part on the one or more parameters. For instance, a charting component (charting component 118) may create a chart and a UX component (UX component 120) may provide the chart in an interface of the spreadsheet application. Continuing with the example above, an aspect ratio for each of the three images associated with the selected one or more cells may be charted in a scatter plot. In further examples, each image or a representation of each image may be incorporated as a data point representing the aspect ratio for the image in the scatter plot. As should be appreciated, a chart may be created based on any parameter(s) associated with an image.

Figure 14A:
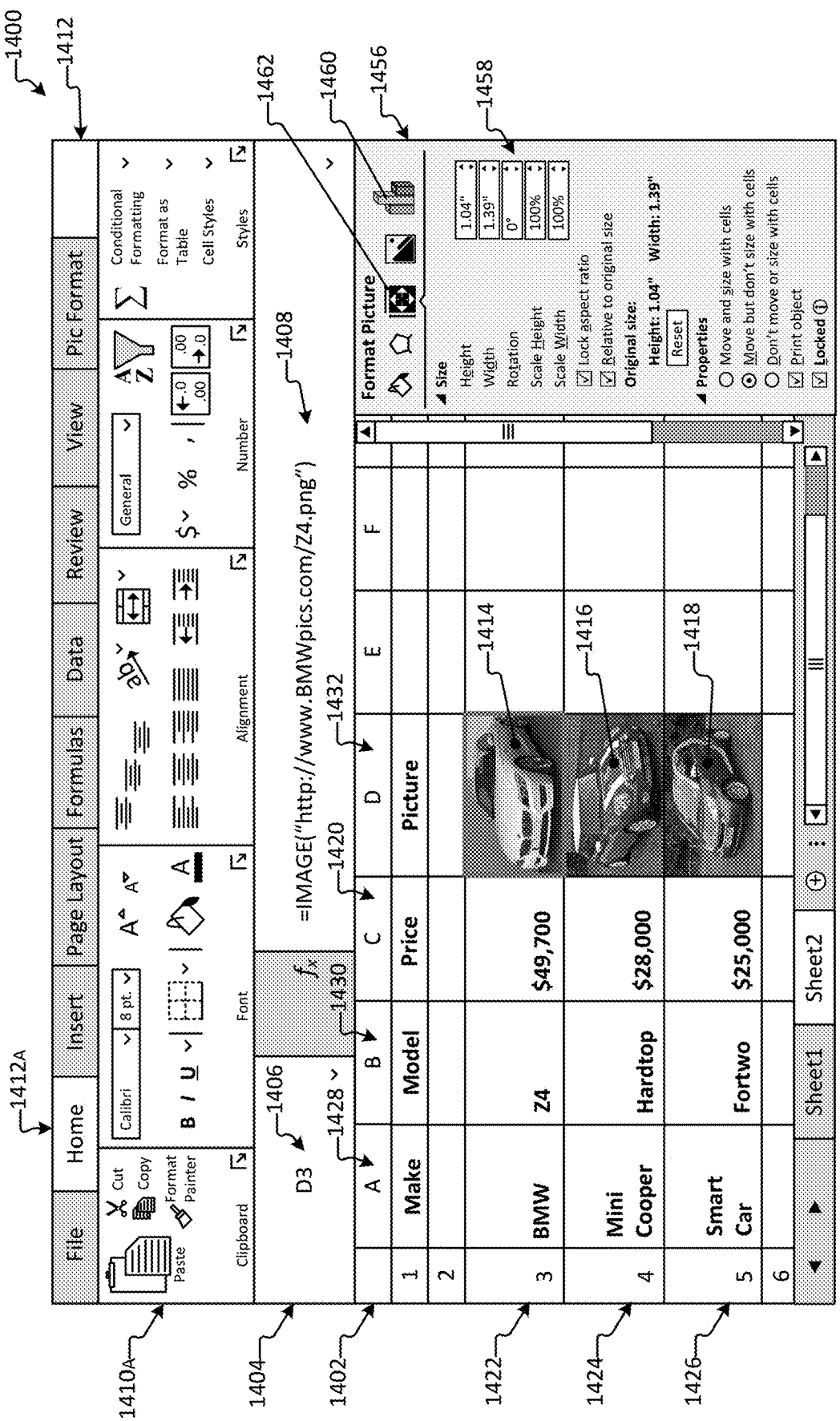
FIG. 14A illustrates an interface showing at least one image associated with one or more cells of a spreadsheet, according to an example embodiment.

At receive adjustment operation 414, an adjustment to at least one parameter of the one or more parameters may be received in the spreadsheet application. For instance, as illustrated by FIG. 14A, a formatting menu 1456 may be provided by the spreadsheet application with various selections and input fields 1458 for adjusting parameters of an image in order to manipulate the image. For instance, an interface may be provided for adjusting image attributes such as opacity, color palette, resolution, aspect ratio, image dimensions, and the like. In aspects, such adjustments may be written to the image file. Continuing with the example above, an aspect ratio for a first image of the three images associated with the selected one or more cells may be adjusted.

At apply adjustment operation 416, the adjustment may be applied to the at least one image incorporated into the chart. For instance, when an adjustment is made to an opacity of an image within the spreadsheet application, the adjustment to the opacity may be rewritten to the image file for the image. Furthermore, if the image is incorporated into a chart, the opacity of the image as rendered within the chart may be adjusted accordingly. Continuing with the example above in which the aspect ratio for the first image has been adjusted, a position of the data point associated with the aspect ratio for the first image in the scatter plot may be adjusted accordingly. Moreover, as the adjustment to the aspect ratio received in the spreadsheet may be rewritten to the image file for the first image, the aspect ratio for the first image as rendered and incorporated into the chart may also be adjusted. In some examples, both the adjustment to the charted parameter and to the image incorporated in the chart may be automatically applied within the chart. As should be appreciated, in addition to an image associated with a spreadsheet, the above-described operations may be applied to other objects associated with a spreadsheet, e.g., an audio file, a video, streaming data, and the like.

As should be further appreciated, operations 402-416 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 5:
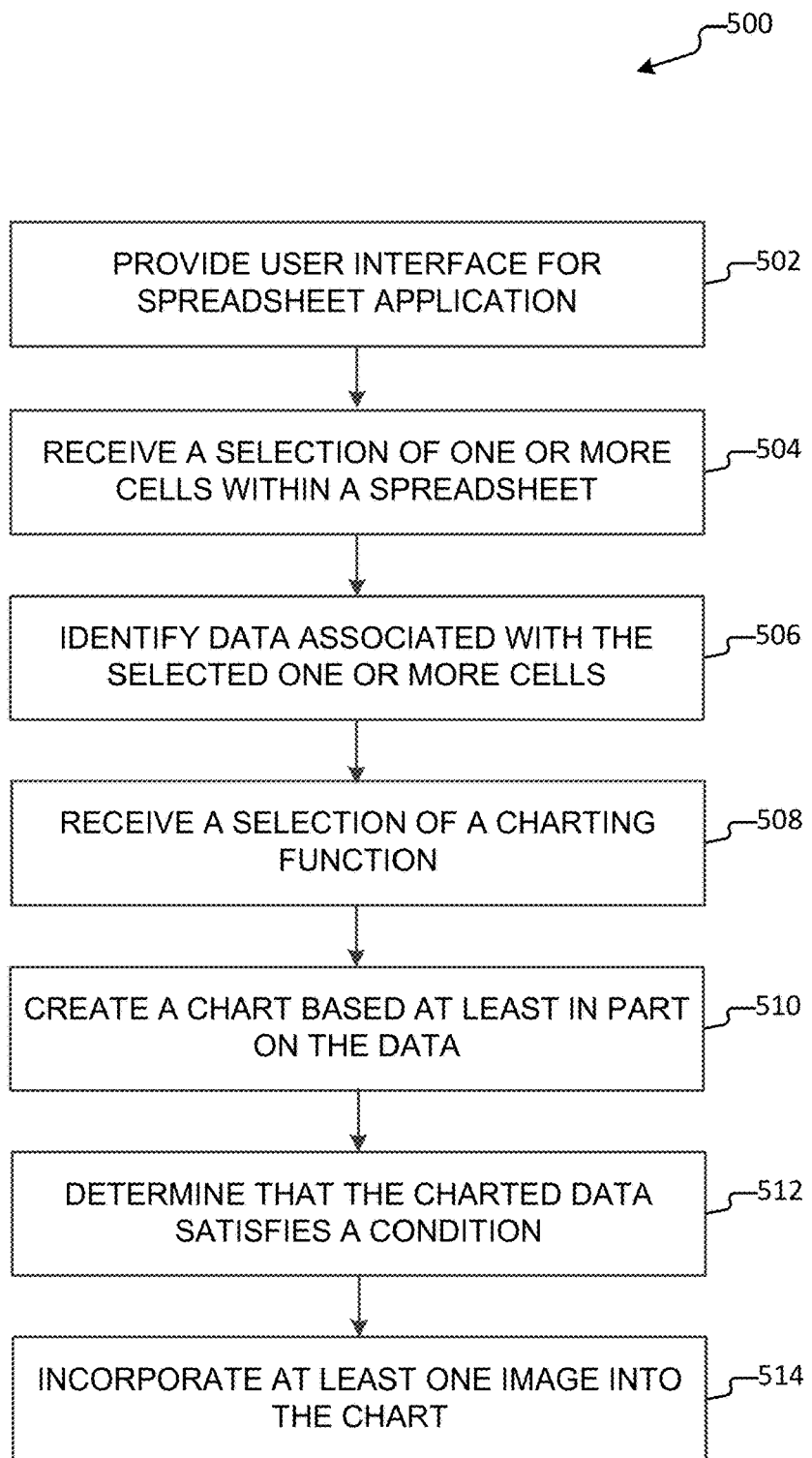
FIG. 5 illustrates a method for incorporating an image into a chart in response to satisfaction of a condition, according to an example embodiment.

FIG. 5 illustrates a method for incorporating an image into a chart in response to satisfaction of a condition, according to an example embodiment.

Method 500 begins with provide interface operation 502, where a spreadsheet application may provide (or cause to be provided) a user interface to a user. For example, as described above with reference to provide interface operation 202, a UX component (e.g., UX component 120) may facilitate a user experience (UX) by providing the user interface of a spreadsheet application (e.g., spreadsheet application 110) via a display. Selections and/or inputs may be received by the user interface based on gestures, touch, mouse movements, and the like.

At receive selection operation 504, one or more cells of a spreadsheet may be selected, either automatically (e.g., based on a function) or by user selection. For example, as described above with respect to receive selection operation 204, a selection component (e.g., selection component 112) may receive a selection of one or more cells, either automatically or by user indication.

At identify data operation 506, data associated with the selected one or more cells may be identified. For example, data may be represented as values within the selected one or more cells. In an example, the identified data may include a company's revenue values for successive months of a particular year. As should be appreciated, the identified data may include any values associated with the selected one or more cells.

At receive charting function operation 508, a selection of a charting function may be received, either automatically or by user indication. For example, a selection of a charting function may be received by a charting component (e.g., charting component 118) of a spreadsheet application. In some aspects, an interface such as a toolbar, ribbon, dropdown menu, etc., may be provided for receiving a selection of the charting function. For instance, the interface may display various types of reports or charts for selection, e.g., bar charts, map charts, scatter plots, line graphs, tree charts, pie charts, radar charts, and the like, in any suitable number of dimensions. As should be appreciated, any appropriate type of chart may be selected for presenting data associated with the selected one or more cells.

At create chart operation 510, a chart may be created based at least in part on the identified data. For instance, a charting component (charting component 118) may create a chart and a UX component (UX component 120) may provide the chart in an interface of the spreadsheet application. Continuing with the example above, a bar chart may be created that presents a company's revenue values for each month of a particular year. As should be appreciated, any suitable chart may be created based on the selected charting function and the identified data.

At determination operation 512, it may be determined whether the charted data satisfies a condition. In aspects, the condition may be specified by a user or may be automatically generated by the spreadsheet application. For instance, continuing with the example above, a user may specify a condition such that when revenue values exceed a particular threshold, e.g., $30,000, an image should be incorporated into the chart. In this case, the revenue values for each month may be evaluated against the threshold to determine whether the condition is satisfied. In another example, a standardized condition may include a condition specifying that an image alert should be incorporated into a chart each time medical data exceeds a particular standardized threshold.

At incorporate operation 514, at least one image may be incorporated into the chart. For instance, a charting component (charting component 118) may create a chart and a UX component (UX component 120) may provide the chart in an interface of the spreadsheet application. In particular, in response to determining that the charted data satisfies the condition, at least one image may be incorporated into the chart. As with the condition, the image may also be specified by a user or automatically generated by the spreadsheet application. For instance, a condition function may include a reference to the image or other identifier. Continuing with the example above, an image of fireworks may be incorporated into a bar representing revenue values that exceed a threshold of $30,000 for a particular month. In another example, an image of a syringe may be generated on a chart when glucose levels exceed a threshold of 300 mg/dl for more than two hours or an image of a pill may be generated on a chart when blood pressure levels exceed a threshold of 190/120 for more than an hour, and the like. As should be appreciated, any suitable image may be incorporated into a chart upon a determination that a condition is satisfied by the charted data. Moreover, in addition to incorporating an image into a chart upon satisfaction of a condition, the above-described operations may be applied to incorporate other objects into a chart, e.g., an audio file, a video, streaming data, and the like.

As should be appreciated, operations 502-514 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 6:
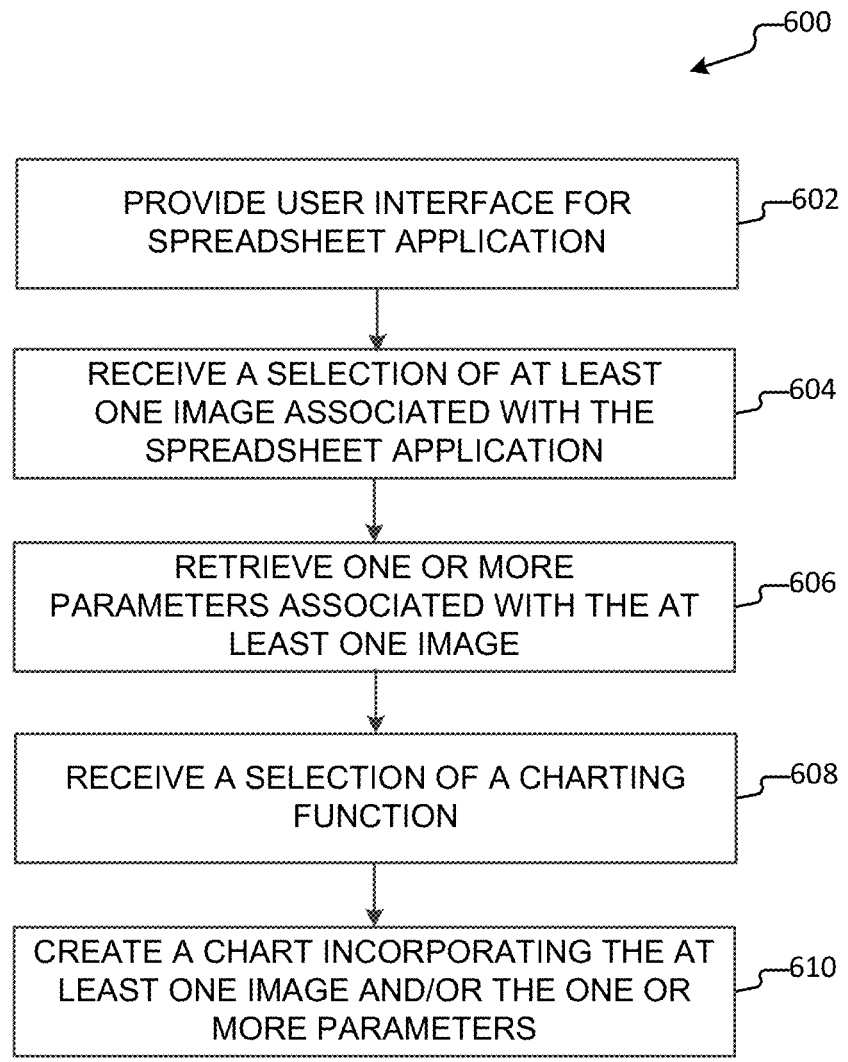
FIG. 6 illustrates a method for selecting and incorporating an image into a chart, according to an example embodiment.

FIG. 6 illustrates a method for selecting and incorporating an image into a chart, according to an example embodiment.

Method 600 begins with provide interface operation 602, where a spreadsheet application may provide (or cause to be provided) a user interface to a user. For example, as described above with reference to provide interface operation 202, a UX component (e.g., UX component 120) may facilitate a user experience (UX) by providing the user interface of a spreadsheet application (e.g., spreadsheet application 110) via a display. Selections and/or inputs may be received by the user interface based on gestures, touch, mouse movements, and the like.

At receive selection operation 604, at least one image associated with a spreadsheet may be selected, either automatically (e.g., based on a function) or by user indication. In some aspects, operations may call (or select) an image without requiring user input, e.g., operations such as 'data refresh,' 'import from such and such data source,' 'copy paste,' etc. In other aspects, a spreadsheet application (e.g., spreadsheet application 110) may provide the spreadsheet to a user within an interface and the user may select at least one image associated with the spreadsheet. Images associated with the spreadsheet may be selected by highlighting, by inputting a formula referencing the image or an image name and/or by otherwise identifying the image and/or the cell(s) with which the image is associated using a gesture, touch, mouse click, keyboard input, and the like.

At retrieve parameters operation 606, one or more parameters associated with the selected at least one image may be retrieved. Retrieve parameters operation 606 may be performed by a parameter retriever (e.g., parameter retriever 116) of a spreadsheet application (e.g., spreadsheet application 110). As described above, parameters of images may include, for instance, image data and/or image attributes. Image data may include raw pixel data, an array of pixel values, or any other data for rendering the image. Image attributes may include opacity, color palette, resolution, aspect ratio, image dimensions, author, creation date and/or time, file name, tags, file size, GPS location information, etc. In some cases, image attributes may be retrieved from metadata associated with an image file. In other cases, image data and/or image attributes may be retrieved from a compound data type associated with the image. As should be appreciated, one or more parameters may be retrieved for each identified image via any suitable means.

At receive charting function operation 608, a selection of a charting function may be received, either automatically or by user indication. For example, as described above with respect to receive charting function operation 210, a selection of a charting function may be received by a charting component (e.g., charting component 118) of a spreadsheet application. As described above, a selection of a charting function including a chart type and/or parameters for charting may be received via any suitable means.

At create chart operation 610, a chart may be created incorporating the at least one image and/or the one or more parameters. For instance, a charting component (charting component 118) may create a chart and a UX component (UX component 120) may create a chart incorporating at least one image, as described above with respect to create chart operation 312. In particular, the image or a representation of the image (e.g., icon) may be incorporated into the chart. Alternatively, as described with respect to respect to create chart operation 412, a charting component may create a chart based on charting the one or more parameters. As should be appreciated, a charting component may create a chart that both incorporates the at least one image and charts the one or more parameters. Moreover, in addition to an image, the above-described operations may be applied to other objects associated with a spreadsheet, e.g., an audio file, a video, streaming data, and the like.

As should be further appreciated, operations 602-610 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 7:
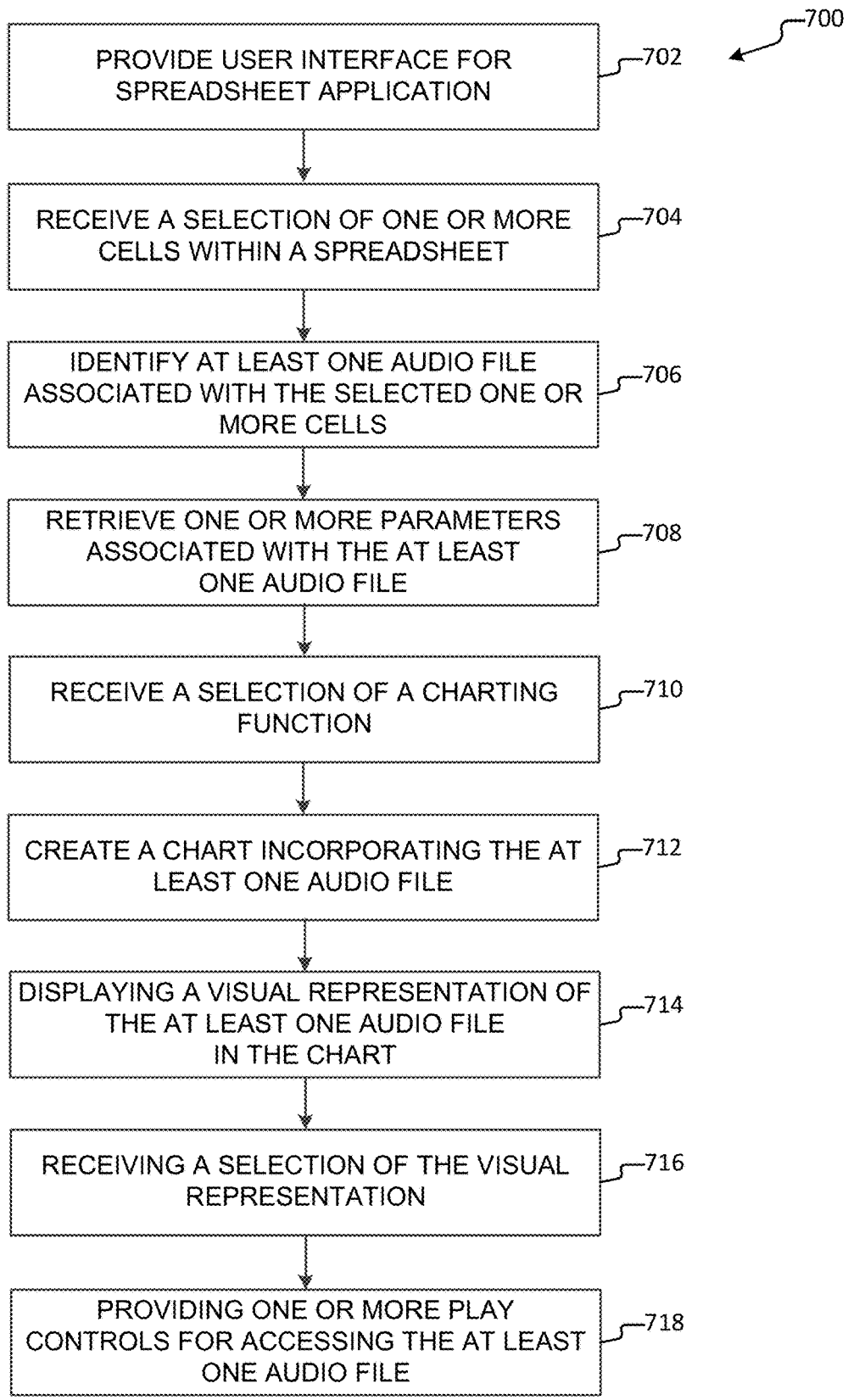
FIG. 7 illustrates a method for playing an audio file incorporated into a chart, according to an example embodiment.

FIG. 7 illustrates a method for playing an audio file incorporated into a chart, according to an example embodiment.

Method 700 begins with provide interface operation 702, where a spreadsheet application may provide (or cause to be provided) a user interface to a user. For example, as described above with reference to provide interface operation 202, a UX component (e.g., UX component 120) may facilitate a user experience (UX) by providing the user interface of a spreadsheet application (e.g., spreadsheet application 110) via a display. Selections and/or inputs may be received by the user interface based on gestures, touch, mouse movements, and the like.

At receive selection operation 704, one or more cells of a spreadsheet may be selected, either automatically (e.g., based on a function) or by user selection. For example, as described above with respect to receive selection operation 204, a selection component (e.g., selection component 112) may receive a selection of one or more cells, either automatically or by user indication.

At identify audio file operation 706, at least one audio file associated with the selected one or more cells may be identified. For example, an object identifier (e.g., object identifier 114) may identify at least one audio file associated with the selected one or more cells. In aspects, an audio file may be "associated" with one or more cells by being embedded in the one or more cells, anchored to the one or more cells, referenced by a formula, name or pointer within the one or more cells, positioned within the same row or column as a selected cell of the one or more cells, and the like. As should be appreciated, at least one audio file associated with the selected one or more cells may be identified by any suitable means.

At retrieve parameters operation 708, one or more parameters associated with the identified at least one audio file may be retrieved. Retrieve parameters operation 708 may be performed by a parameter retriever (e.g., parameter retriever 116) of a spreadsheet application (e.g., spreadsheet application 110). As described above, parameters of audio files may include, for instance, audio data and/or audio attributes. Audio data may include, e.g., modulated data for reproducing soundwaves. Audio attributes may include, e.g., frequency, amplitude, sampling rate, codec, bitrate, volume, pitch, speed, channel, audio effects, author/artist, creation date and/or time, file name, file size, duration, etc. In some cases, audio attributes may be retrieved from metadata associated with an audio file. In other cases, audio data and/or audio attributes may be retrieved from a compound data type associated with the audio file. As should be appreciated, one or more parameters may be retrieved for each identified audio file via any suitable means.

At receive charting function operation 710, a selection of a charting function may be received, either automatically or by user indication. For example, as described above with respect to receive charting function operation 210, a selection of a charting function may be received by a charting component (e.g., charting component 118) of a spreadsheet application. In some aspects, an interface such as a toolbar, ribbon, dropdown menu, etc., may be provided for receiving a selection of the charting function. The interface may display various types of charts for selection, e.g., bar charts, map charts, scatter plots, line graphs, tree charts, pie charts, radar charts, and the like. In other aspects, a chart may be automatically selected. Further, the interface may provide for selecting one or more parameters to be charted. In some cases, e.g., where the selected one or more cells are associated with a plurality of audio files, a selection may be received to chart parameters such as the duration or volume for each audio file. In some aspects, where parameters are not displayed within the spreadsheet, an additional interface (e.g., dropdown menu) may be provided for selecting such parameters for charting. That is, some parameters may be associated with an audio file as metadata or as a compound data type and may not be visible as values within cells of the spreadsheet. As should be appreciated, a selection of a charting function including a chart type and/or parameters for charting may be received via any suitable means.

At create chart operation 712, a chart may be created incorporating the at least one audio file. For instance, a charting component (charting component 118) may create a chart and a UX component (UX component 120) may provide the chart in an interface of the spreadsheet application. In particular, the audio file or a visual representation of the audio file may be incorporated into the chart. For example, three audio files may be associated with the selected one or more cells. The audio files may correspond to three deposition recordings, two for a first witness and one for a second witness. A duration for each audio file may be retrieved from metadata associated with the audio file. The total duration for the deposition for each witness may be provided in a bar chart. In this case, the individual durations for the two audio files corresponding to the first witness may be combined into a single bar of the bar chart. In some examples, although provided as metadata, the durations for each audio file may not be visible as values within the selected one or more cells. As should be appreciated, the above examples are provided for purposes of explanation and should not be considered limiting.

At display operation 714, a visual representation of the at least one audio file may be displayed in the chart. Continuing with the example above, a visual representation of each of the three audio files may be incorporated into a bar representing a duration of deposition for a particular witness. For the bar that represents a combination of the durations for two deposition recordings, visual representations of both audio files may be incorporated into the bar. A visual representation may include, for instance, a speaker icon, play icon, waveform rendering, sliced waveform rendering, track name with metadata, special icon with metadata, etc. For example, the visual representation may depict the actual waveform and may be interactive. That is, a user may scroll along the visual representation and begin listening to the audio file from any position along the waveform. Alternatively, the visual representation may not depict the actual waveform but may be a standard representation of a waveform and may be overlaid with a play icon. As should be appreciated, any suitable icon or other symbol may be provided as a visual representation for the at least one audio file.

At receive selection operation 716, a selection of the visual representation may be received. For example, the visual representation may be selected by gesture, touch, mouse click, keyboard input, cursor hover, and the like. Selection of the visual representation may further include activating a play icon associated with the visual representation or launching a user interface by right-clicking or hovering over the visual representation, and the like. As should be appreciated, selection of the visual representation may be received by any suitable means.

At provide operation 718, one or more play controls may be provided for accessing the at least one audio file. For instance, the play controls may include controls for playing, skipping forward or back, pausing, rewinding, fast forwarding and/or stopping the at least one audio file. In response to receiving an activation of any of the play controls, the audio file may be accessed by a user. As should be appreciated, in addition to an audio file, the above-described operations may be applied to other objects associated with a spreadsheet, e.g., a video, streaming data, and the like.

As should be further appreciated, operations 702-718 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 8:
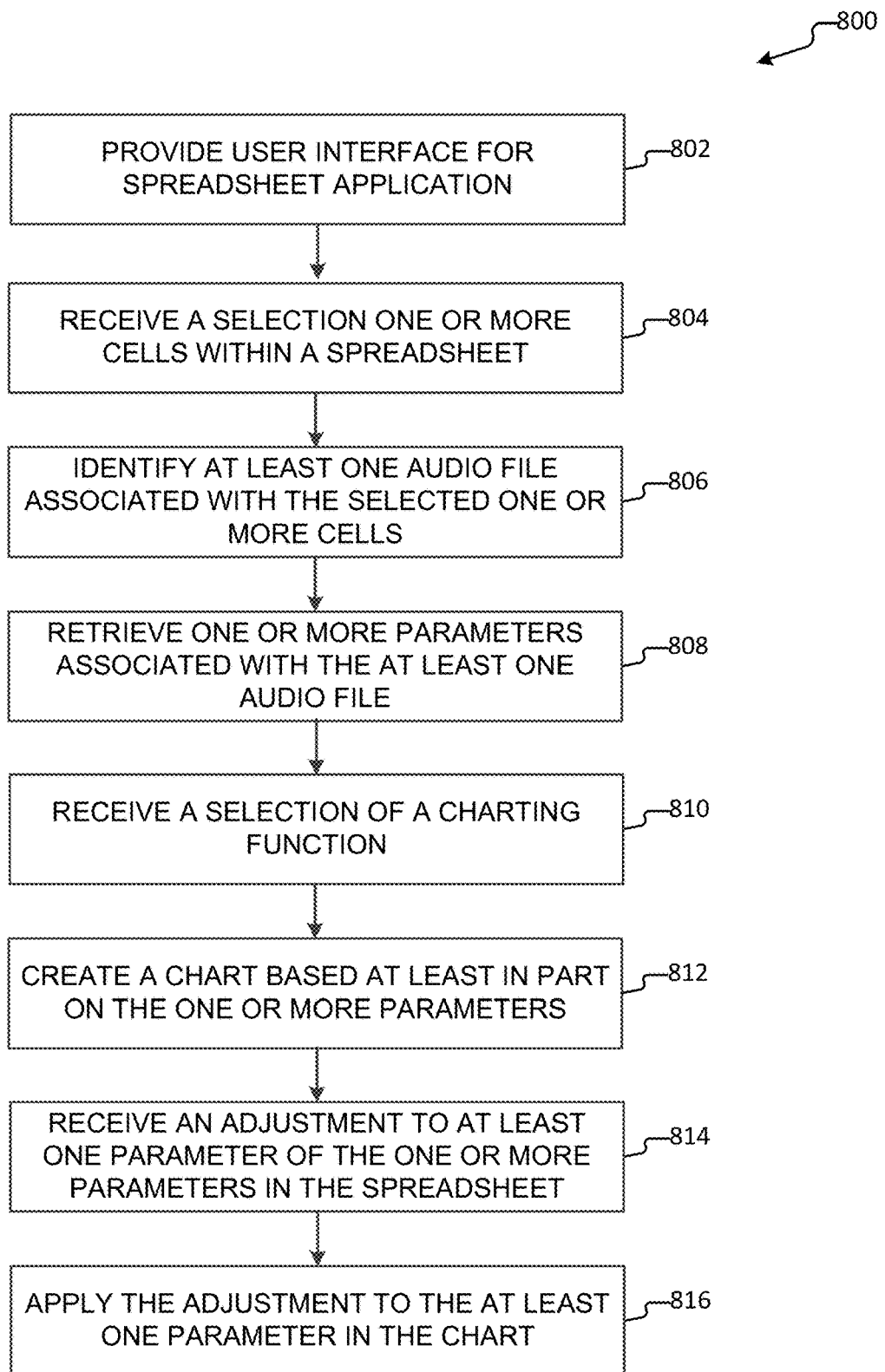
FIG. 8 illustrates a method for manipulating an audio file associated with a spreadsheet that is incorporated into a chart, according to an example embodiment.

FIG. 8 illustrates a method for manipulating an audio file associated with a spreadsheet that is incorporated into a chart, according to an example embodiment.

Method 800 begins with provide interface operation 802, where a spreadsheet application may provide (or cause to be provided) a user interface to a user. For example, as described above with reference to provide interface operation 202, a UX component (e.g., UX component 120) may facilitate a user experience (UX) by providing the user interface of a spreadsheet application (e.g., spreadsheet application 110) via a display.

At receive selection operation 804, one or more cells of a spreadsheet may be selected, either automatically (e.g., based on a function) or by user selection. For example, as described above with respect to receive selection operation 204, a selection component (e.g., selection component 112) may receive a selection of one or more cells, either automatically or by user indication.

At identify audio file operation 806, at least one audio file associated with the selected one or more cells may be identified. For example, as described with respect to identify audio file operation 706, an object identifier (e.g., object identifier 114) may identify at least one audio file associated with the selected one or more cells.

At retrieve parameters operation 808, one or more parameters associated with the identified at least one audio file may be retrieved. Retrieve parameters operation 708 may be performed by a parameter retriever (e.g., parameter retriever 116) of a spreadsheet application (e.g., spreadsheet application 110), as described above with reference to retrieve parameters operation 708.

At receive charting function operation 810, a selection of a charting function may be received, either automatically or by user indication. For example, as described above with respect to receive charting function operations 210 and 710, a selection of a charting function may be received by a charting component (e.g., charting component 118) of a spreadsheet application. As detailed above, an interface may provide for selecting one or more parameters to be charted. In some cases, e.g., where the selected one or more cells are associated with a plurality of audio files, a selection may be received to chart parameters such as the duration or volume for each audio file. In some aspects, where parameters are not displayed within the spreadsheet, an additional interface (e.g., dropdown menu) may be provided for selecting such parameters for charting. That is, some parameters may be associated with an audio file as metadata or as a compound data type and may not be visible as values within cells of the spreadsheet. As should be appreciated, a selection of a charting function including a chart type and/or parameters for charting may be received via any suitable means.

At create chart operation 812, a chart may be created based at least in part on the one or more parameters. For instance, a charting component (charting component 118) may create a chart and a UX component (UX component 120) may provide the chart in an interface of the spreadsheet application. Continuing with the example above, a volume and a pitch for the plurality of audio files associated with the selected one or more cells may be charted in a bubble chart. In further examples, each audio file or a representation of each audio file may be incorporated a bubble representing the volume and pitch for the audio file in the bubble chart. As should be appreciated, a chart may be created based on any parameter(s) associated with an audio file.

Figure 21A:
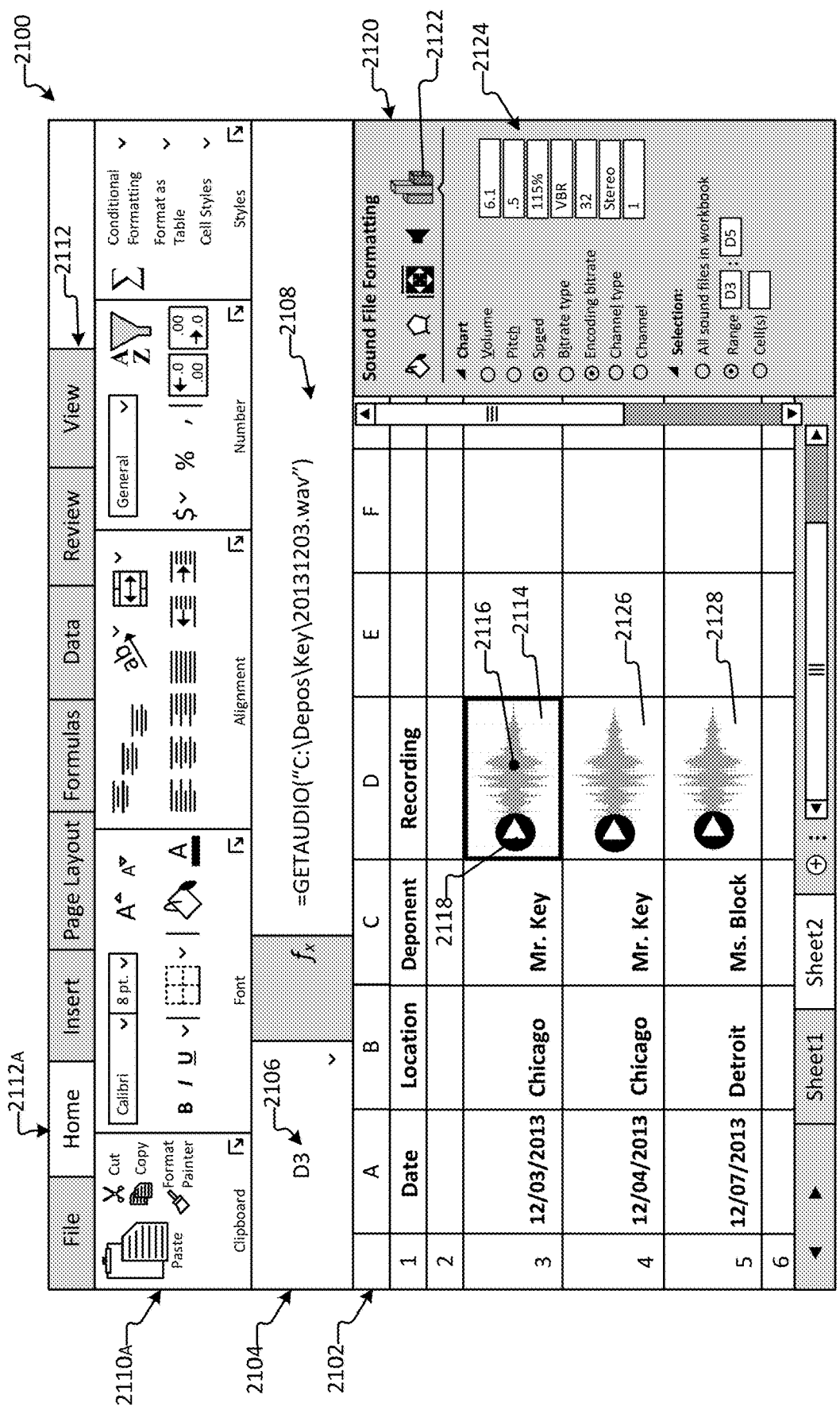
FIG. 21A illustrates an interface showing an audio file associated with a spreadsheet, the spreadsheet proving a charting menu specific to the audio file, according to an example embodiment.

At receive adjustment operation 814, an adjustment to at least one parameter of the one or more parameters may be received in the spreadsheet application. For instance, as illustrated by FIG. 21A, a formatting menu 2120 may be provided by the spreadsheet application with various selections and input fields 2124 for adjusting parameters to manipulate the audio file. For instance, an interface may be provided for adjusting audio attributes such as volume, pitch, speed, bitrate type, bitrate, channel type, channel, and the like. In aspects, such adjustments may be written to the audio file. Continuing with the example above, a volume for a first audio file of the plurality of audio files associated with the selected one or more cells may be adjusted.

At apply adjustment operation 816, the adjustment may be applied to the at least one audio file incorporated into the chart. For instance, when an adjustment is made to a pitch of an audio file within the spreadsheet application, the adjustment to the pitch may be rewritten to the audio file. Furthermore, if the audio file is incorporated into a chart, the pitch of the sound in the audio file as rendered within the chart may be adjusted accordingly. Continuing with the example above in which the volume for the first audio file has been adjusted, a position and/or size of the bubble associated with the volume and pitch for the first audio file in the bubble chart may be adjusted accordingly. Moreover, as the adjustment to the pitch received in the spreadsheet may be rewritten to the first audio file, the pitch for the first audio file as rendered and incorporated into the chart may also be adjusted. In some examples, both the adjustment to the charted parameter and to the audio file incorporated in the chart may be automatically applied within the chart. As should be appreciated, in addition to an audio file, the above-described operations may be applied to other objects associated with a spreadsheet, e.g., an image, a video, streaming data, and the like.

As should be further appreciated, operations 802-816 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 9:
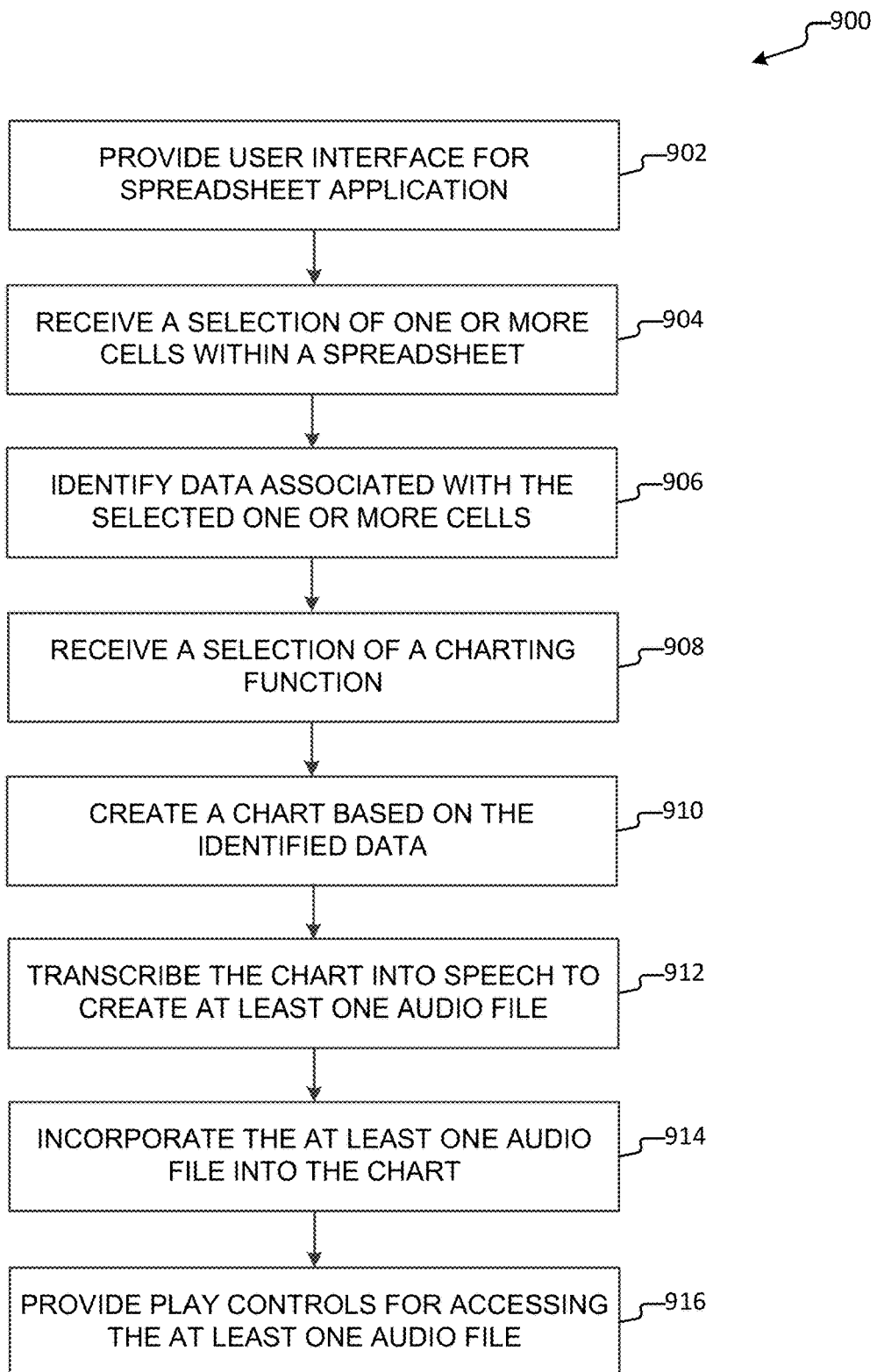
FIG. 9 illustrates a method for transcribing a chart into speech and incorporating an audio file of the speech into the chart, according to an example embodiment.

FIG. 9 illustrates a method for transcribing a chart into speech and incorporating an audio file of the speech into the chart, according to an example embodiment.

Method 900 begins with provide interface operation 902, where a spreadsheet application may provide (or cause to be provided) a user interface to a user. For example, as described above with reference to provide interface operation 202, a UX component (e.g., UX component 120) may facilitate a user experience (UX) by providing the user interface of a spreadsheet application (e.g., spreadsheet application 110) via a display.

At receive selection operation 904, one or more cells of a spreadsheet may be selected, either automatically (e.g., based on a function) or by user selection. For example, as described above with respect to receive selection operation 204, a selection component (e.g., selection component 112) may receive a selection of one or more cells, either automatically or by user indication.

At identify data operation 906, data associated with the selected one or more cells may be identified. For example, data may be represented as values within the selected one or more cells. In an example, the identified data may include a company's revenue values for successive months of a particular year. As should be appreciated, the identified data may include any values associated with the selected one or more cells.

At receive charting function operation 908, a selection of a charting function may be received, either automatically or by user indication. For example, a selection of a charting function may be received by a charting component (e.g., charting component 118) of a spreadsheet application, as described above with respect to receive charting function operation 508.

At create chart operation 910, a chart may be created based at least in part on the identified data. For instance, a charting component (charting component 118) may create a chart and a UX component (UX component 120) may provide the chart in an interface of the spreadsheet application. Continuing with the example above, a bar chart may be created that presents a company's revenue values for each month of a particular year. As should be appreciated, any suitable chart may be created based on the selected charting function and the identified data.

At transcribe operation 912, the chart may be transcribed into speech to create at least one audio file. Continuing with the example above, the speech transcription may describe the company's revenue values for each month of a particular year. For instance, e.g., for low vision users, the data within the chart may be transcribed (e.g., "Text to Speech") and the data may be "played" for the user at any time. To further improve user experience, particularly for low vision users, the chart may be customized to associate sounds with colors, numbers, trends, or any other aspect of the chart. Sound waves representing the speech transcription may be digitally encoded (e.g., by pulse-code modulation), in some cases processed (e.g., filtered, edited, etc.) and/or compressed (e.g., based on a codec to reduce file size), and stored as the at least one audio file.

At incorporate operation 914, the at least one audio file may be incorporated into the chart. For instance, a charting component (charting component 118) may incorporate the audio file into the chart and a UX component (UX component 120) may provide the chart in an interface of the spreadsheet application. In this way, by transcribing the data into an audio file and incorporating the audio file into the chart, the chart becomes able to read its own data.

At provide operation 916, one or more play controls may be provided for accessing the at least one audio file. For instance, the play controls may include controls for playing, skipping forward or back, pausing, rewinding, fast forwarding and/or stopping the at least one audio file. In response to receiving an activation of any of the play controls, the audio file may be accessed by a user. In at least some cases, e.g., for a low-vision user, the audio file may be "played" automatically when the chart is created.

As should be appreciated, operations 902-916 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 10:
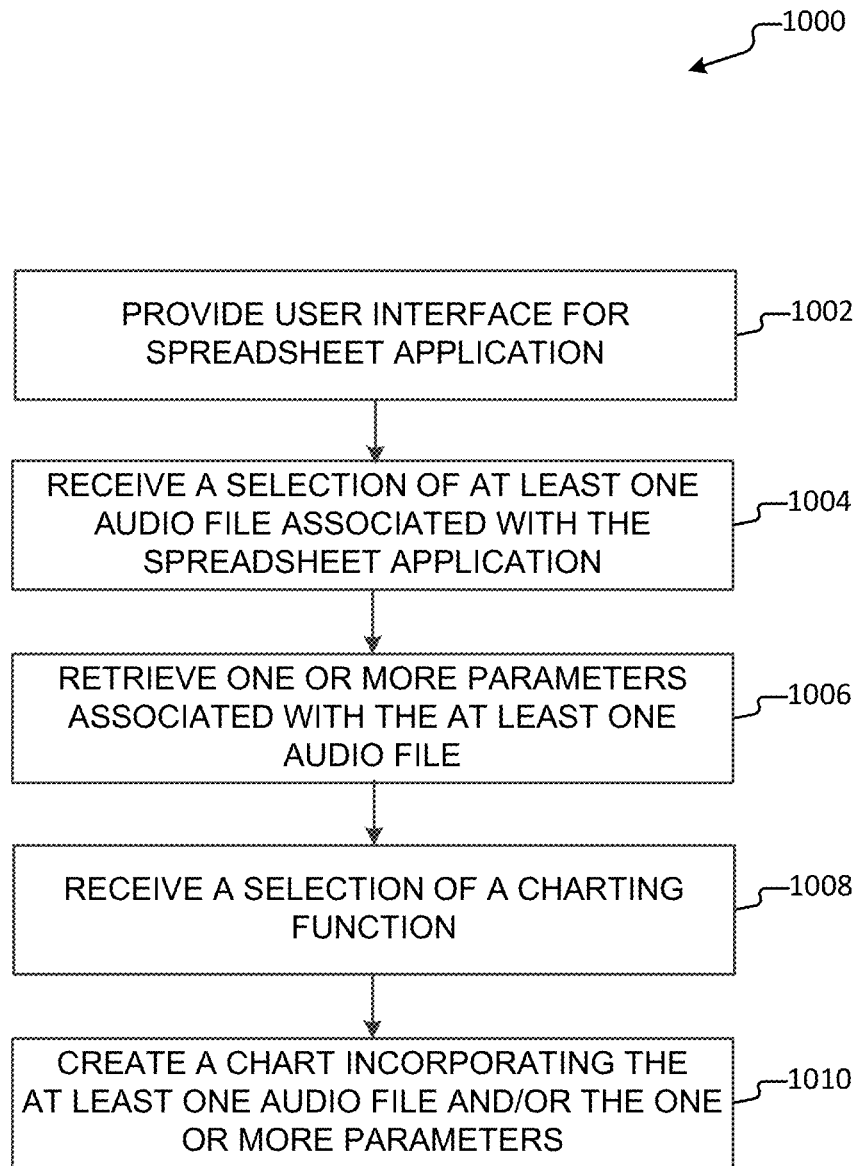
FIG. 10 illustrates a method for selecting and incorporating an audio file into a chart, according to an example embodiment.

FIG. 10 illustrates a method for selecting and incorporating an audio file into a chart, according to an example embodiment.

Method 1000 begins with provide interface operation 1002, where a spreadsheet application may provide (or cause to be provided) a user interface to a user. For example, as described above with reference to provide interface operation 202, a UX component (e.g., UX component 120) may facilitate a user experience (UX) by providing the user interface of a spreadsheet application (e.g., spreadsheet application 110) via a display.

At receive selection operation 1004, at least one audio file associated with a spreadsheet may be selected, either automatically (e.g., based on a function) or by user indication. In some aspects, operations may call (or select) an audio file without requiring user input, e.g., operations such as 'data refresh,' 'import from such and such data source,' 'copy paste,' etc. In other aspects, a spreadsheet application (e.g., spreadsheet application 110) may provide the spreadsheet to a user within an interface and the user may select at least one audio file associated with the spreadsheet. Audio files associated with the spreadsheet may be selected by highlighting, by inputting a formula referencing the audio file or an audio file name and/or by otherwise identifying the audio file and/or the cell(s) with which the audio file is associated using a gesture, touch, mouse click, keyboard input, and the like.

At retrieve parameters operation 1006, one or more parameters associated with the selected at least one audio file may be retrieved. Retrieve parameters operation 1006 may be performed by a parameter retriever (e.g., parameter retriever 116) of a spreadsheet application (e.g., spreadsheet application 110). As described above, parameters of audio files may include, for instance, audio data and/or audio attributes. Audio data may include, e.g., modulated data for reproducing soundwaves. Audio attributes may include, e.g., frequency, amplitude, sampling rate, codec, bitrate, volume, pitch, speed, channel, audio effects, author/artist, creation date and/or time, file name, file size, duration, etc. In some cases, audio attributes may be retrieved from metadata associated with an audio file. In other cases, audio data and/or audio attributes may be retrieved from a compound data type associated with the audio file. As should be appreciated, one or more parameters may be retrieved for each identified audio file via any suitable means.

At receive charting function operation 1008, a selection of a charting function may be received, either automatically or by user indication. For example, as described above with respect to receive charting function operation 210, a selection of a charting function may be received by a charting component (e.g., charting component 118) of a spreadsheet application. As described above, a selection of a charting function including a chart type and/or parameters for charting may be received via any suitable means.

At create chart operation 1010, a chart may be created incorporating the at least one audio file and/or the one or more parameters. For instance, a charting component (charting component 118) may create a chart and a UX component (UX component 120) may create a chart incorporating the at least one audio file, as described above with respect to create chart operation 712. In particular, the audio file or a visual representation of the audio file may be incorporated into the chart. Alternatively, as described with respect to respect to create chart operation 812, a charting component may create a chart based on charting the one or more parameters. As should be appreciated, a charting component may create a chart that both incorporates the at least one audio file and charts the one or more parameters. Moreover, in addition to an audio file, the above-described operations may be applied to other objects associated with a spreadsheet, e.g., an image, a video, streaming data, and the like.

As should be further appreciated, operations 1002-1010 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 11:
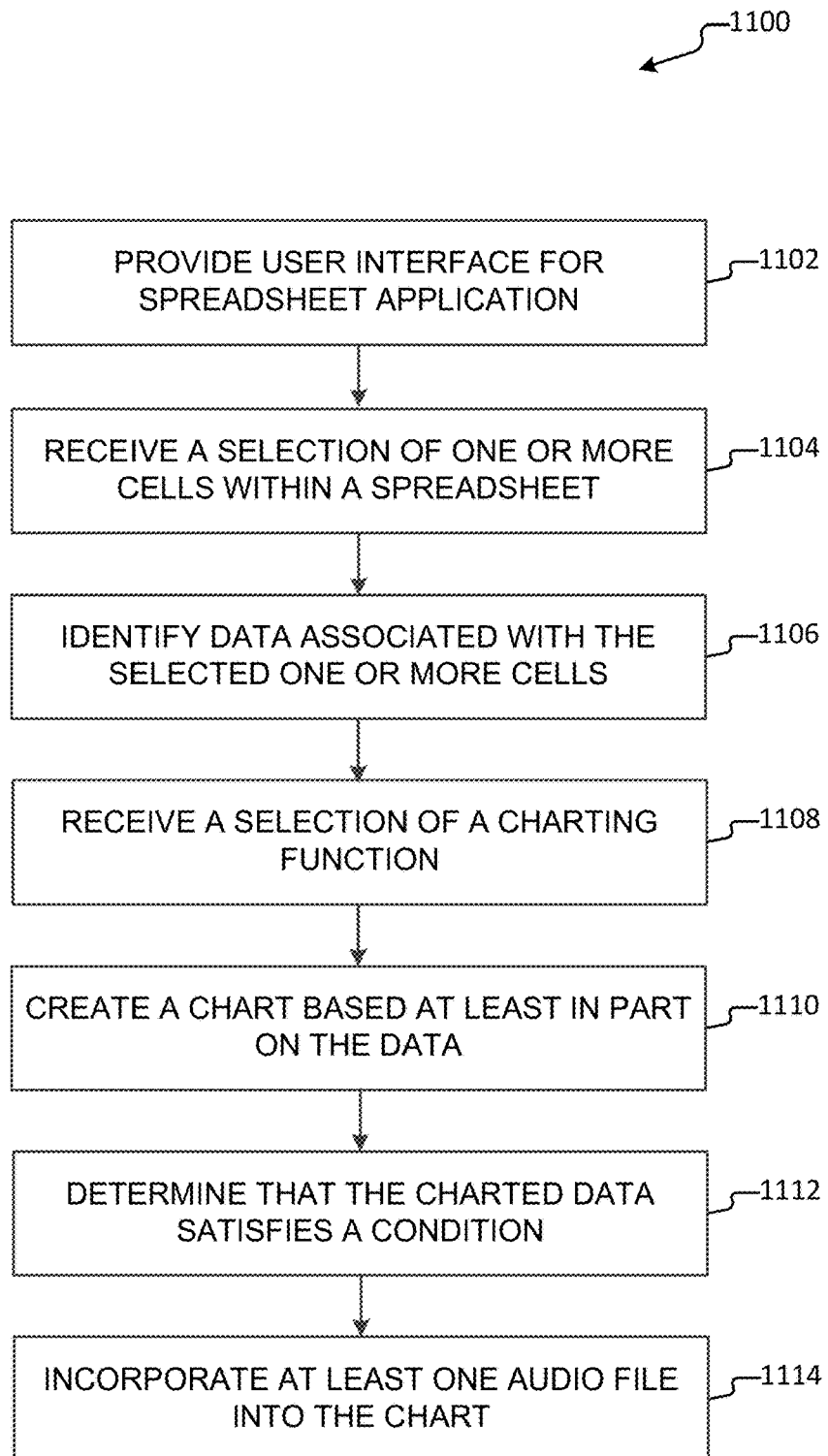
FIG. 11 illustrates a method for incorporating an audio file into a chart in response to satisfaction of a condition, according to an example embodiment.

FIG. 11 illustrates a method for incorporating an audio file into a chart in response to satisfaction of a condition, according to an example embodiment.

Method 1100 begins with provide interface operation 1102, where a spreadsheet application may provide (or cause to be provided) a user interface to a user. For example, as described above with reference to provide interface operation 202, a UX component (e.g., UX component 120) may facilitate a user experience (UX) by providing the user interface of a spreadsheet application (e.g., spreadsheet application 110) via a display.

At receive selection operation 1104, one or more cells of a spreadsheet may be selected, either automatically (e.g., based on a function) or by user selection. For example, as described above with respect to receive selection operation 204, a selection component (e.g., selection component 112) may receive a selection of one or more cells, either automatically or by user indication.

At identify data operation 1106, data associated with the selected one or more cells may be identified. For example, data may be represented as values within the selected one or more cells. In an example, the identified data may include a company's revenue values for successive months of a particular year. As should be appreciated, the identified data may include any values associated with the selected one or more cells.

At receive charting function operation 1108, a selection of a charting function may be received, either automatically or by user indication. For example, a selection of a charting function may be received by a charting component (e.g., charting component 118) of a spreadsheet application, as described with respect to receive charting function operation 508.

At create chart operation 1110, a chart may be created based at least in part on the identified data. For instance, a charting component (charting component 118) may create a chart and a UX component (UX component 120) may provide the chart in an interface of the spreadsheet application. Continuing with the example above, a bar chart may be created that presents a company's revenue values for each month of a particular year. As should be appreciated, any suitable chart may be created based on the selected charting function and the identified data.

At determination operation 1112, it may be determined whether the charted data satisfies a condition. In aspects, the condition may be specified by a user or may be automatically generated by the spreadsheet application. For instance, continuing with the example above, a user may specify a condition such that when revenue values exceed a particular threshold, e.g., $30,000, an audio file should be incorporated into the chart. In this case, the revenue values for each month may be evaluated against the threshold to determine whether the condition is satisfied. In another example, a standardized condition may include a condition specifying that an audio alert should be incorporated into a chart and each time medical data exceeds a particular standardized threshold the audio alert should "play."

At incorporate operation 1114, at least one audio file may be incorporated into the chart. For instance, a charting component (charting component 118) may create a chart and a UX component (UX component 120) may provide the chart in an interface of the spreadsheet application. In particular, in response to determining that the charted data satisfies the condition, at least one audio file may be incorporated into the chart. As with the condition, the audio file may also be specified by a user or automatically generated by the spreadsheet application. For instance, a condition function may include a reference to the audio file or other identifier. Continuing with the example above, an audio file encoding an audio encouragement may be incorporated into a bar representing revenue values that exceed a threshold of $30,000 for a particular month. In another example, an audio file encoding an audio alert may be played in a chart when glucose levels exceed a threshold of 300 mg/dl for more than two hours or when blood pressure levels exceed a threshold of 190/120 for more than an hour, and the like. As should be appreciated, any suitable audio file may be incorporated into a chart upon a determination that a condition is satisfied by the charted data. Moreover, in addition to an audio file, the above-described operations may be applied to other objects associated with a spreadsheet, e.g., an image, a video, streaming data, and the like.

As should be further appreciated, operations 1102-1114 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 12:
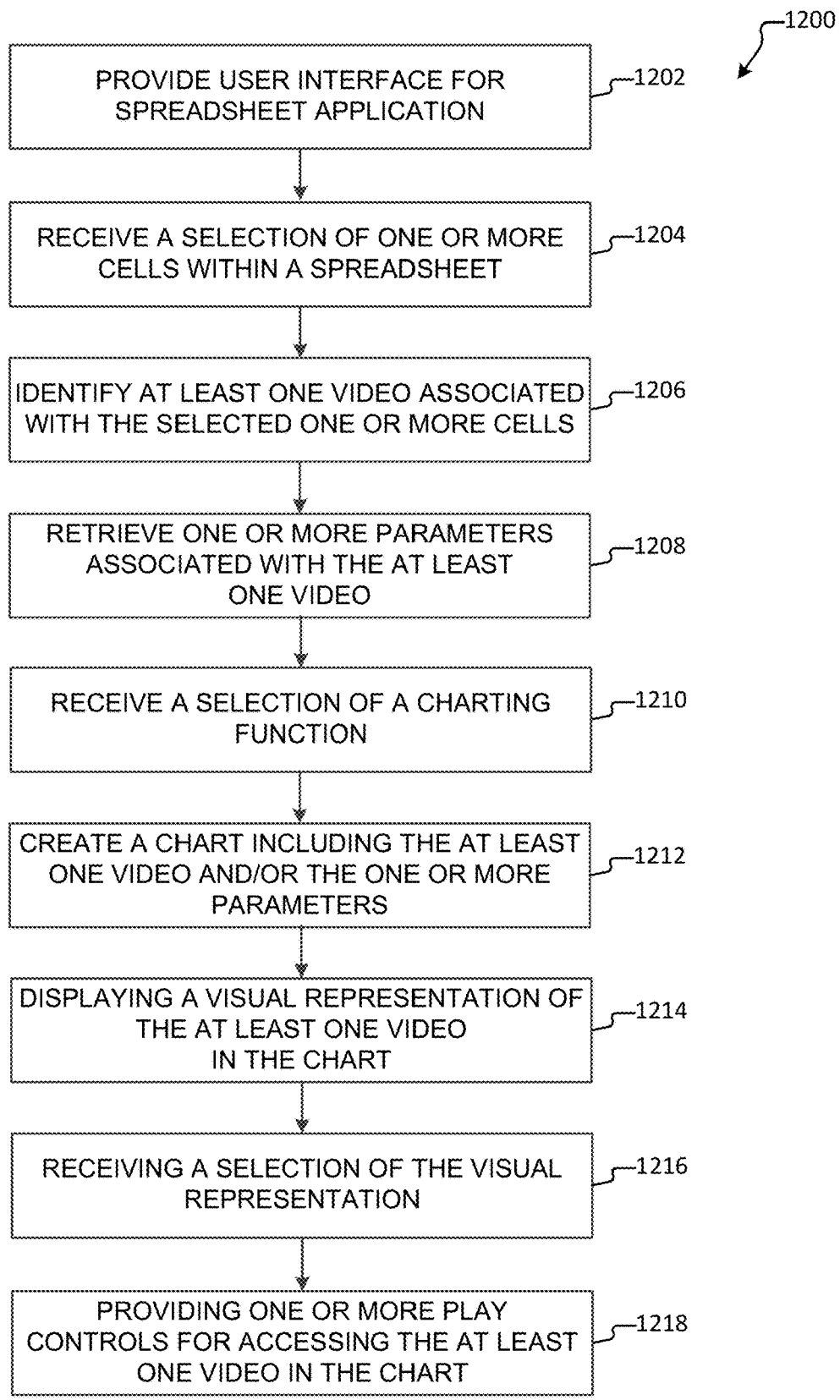
FIG. 12 illustrates a method for playing a video incorporated into a chart, according to an example embodiment.

FIG. 12 illustrates a method for playing a video incorporated into a chart, according to an example embodiment.

Method 1200 begins with provide interface operation 1202, where a spreadsheet application may provide (or cause to be provided) a user interface to a user. For example, as described above with reference to provide interface operation 202, a UX component (e.g., UX component 120) may facilitate a user experience (UX) by providing the user interface of a spreadsheet application (e.g., spreadsheet application 110) via a display.

At receive selection operation 1204, one or more cells of a spreadsheet may be selected, either automatically (e.g., based on a function) or by user selection. For example, as described above with respect to receive selection operation 204, a selection component (e.g., selection component 112) may receive a selection of one or more cells, either automatically or by user indication.

At identify video operation 1206, at least one video associated with the selected one or more cells may be identified. For example, an object identifier (e.g., object identifier 114) may identify the at least one video associated with the selected one or more cells. In aspects, a video may be "associated" with one or more cells by being embedded in the one or more cells, anchored to the one or more cells, referenced by a formula, name or pointer within the one or more cells, positioned within the same row or column as a selected cell of the one or more cells, and the like. As should be appreciated, at least one video associated with the selected one or more cells may be identified by any suitable means.

At retrieve parameters operation 1208, one or more parameters associated with the identified at least one video may be retrieved. Retrieve parameters operation 1208 may be performed by a parameter retriever (e.g., parameter retriever 116) of a spreadsheet application (e.g., spreadsheet application 110). As described above, parameters of videos may include, for instance, video data and/or video attributes. Video data may include, for instance, an array of pixel values for rendering each individual frame of a video and/or modulated data for reproducing soundwaves of an audio track. Video attributes may include, for instance, a frame rate, aspect ratio, duration, resolution, bits per frame, video size, synchronization data, etc. Video attributes may further include individual frame attributes (e.g., aspect ratio, color space, bitrate, etc.) and/or audio attributes (e.g., pitch, volume, speed, etc.). In some cases, video attributes may be retrieved from metadata associated with a video. In other cases, video data and/or video attributes may be retrieved from a compound data type associated with the video. As should be appreciated, one or more parameters may be retrieved for each identified video via any suitable means.

At receive charting function operation 1210, a selection of a charting function may be received, either automatically or by user indication. For example, as described above with respect to receive charting function operation 210, a selection of a charting function may be received by a charting component (e.g., charting component 118) of a spreadsheet application. In some aspects, an interface such as a toolbar, ribbon, dropdown menu, etc., may be provided for receiving a selection of the charting function. The interface may display various types of charts for selection, e.g., bar charts, map charts, scatter plots, line graphs, tree charts, pie charts, radar charts, and the like. Further, the interface may provide for selecting one or more parameters to be charted. In some cases, e.g., where the selected one or more cells are associated with a plurality of videos, a selection may be received to chart parameters such as a duration or a frame rate or a volume for each video. In some aspects, where parameters are not displayed within the spreadsheet, an additional interface (e.g., dropdown menu) may be provided for selecting such parameters for charting. That is, some parameters may be associated with a video as metadata or as a compound data type and may not be visible as values within cells of the spreadsheet. As should be appreciated, a selection of a charting function including a chart type and/or parameters for charting may be received via any suitable means.

At create chart operation 1212, a chart may be created incorporating the at least one video. For instance, a charting component (charting component 118) may create a chart and a UX component (UX component 120) may provide the chart in an interface of the spreadsheet application. In particular, the video or a visual representation of the video may be incorporated into the chart. For example, three videos may be associated with the selected one or more cells. The videos may correspond to three documentaries. A duration for each video may be retrieved from the selected one or more cells or from metadata associated with the video. The duration for each documentary may be provided in a bar chart. In some examples, although provided as metadata, the durations for each video may not be visible as values within the selected one or more cells. As should be appreciated, the above examples are provided for purposes of explanation and should not be considered limiting.

At display operation 1214, a visual representation of the at least one video may be displayed in the chart. Continuing with the example above, a visual representation of each of the three videos may be incorporated into a bar representing a duration for each documentary. A visual representation may include, for instance, a speaker icon, play icon, a single image frame overlaid with a play icon, a video name with metadata, a special icon with metadata, etc. For example, the visual representation may depict an actual image frame of the video and may be interactive. That is, a user may scroll through the video and begin watching the video from any image frame. Alternatively, the visual representation may not depict an actual image frame but may be a film poster for the video and may be overlaid with a play icon. As should be appreciated, any suitable icon or other symbol may be provided as a visual representation for the at least one video.

At receive selection operation 1216, a selection of the visual representation may be received. For example, the visual representation may be selected by gesture, touch, mouse click, keyboard input, cursor hover, and the like. Selection of the visual representation may further include activating a play icon associated with the visual representation or launching a user interface by right-clicking or hovering over the visual representation, and the like. As should be appreciated, selection of the visual representation may be received by any suitable means.

At provide operation 1218, one or more play controls may be provided for accessing the at least one video. For instance, the play controls may include controls for playing, skipping forward or back, pausing, rewinding, fast forwarding and/or stopping the at least one video. In response to receiving an activation of any of the play controls, the video may be accessed by a user. As should be appreciated, in addition to video, the above-described operations may be applied to other objects associated with a spreadsheet, e.g., an audio file, streaming data, and the like.

As should be further appreciated, operations 1202-1218 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 13:
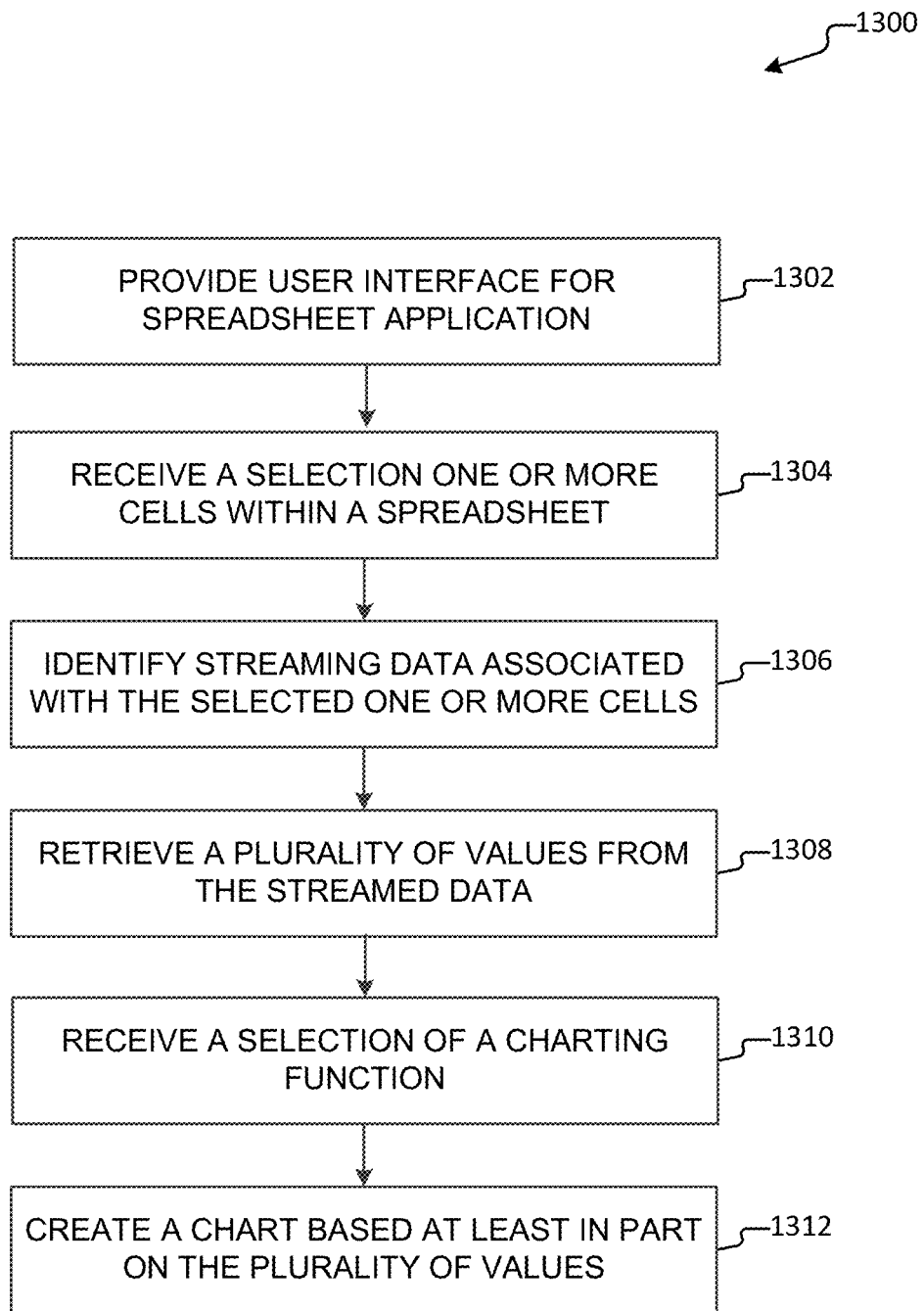
FIG. 13 illustrates a method for charting streaming data that is associated with a spreadsheet, according to an example embodiment.

FIG. 13 illustrates a method for charting streaming data that is associated with a spreadsheet, according to an example embodiment.

Method 1300 begins with provide interface operation 1302, where a spreadsheet application may provide (or cause to be provided) a user interface to a user. For example, as described above with reference to provide interface operation 202, a UX component (e.g., UX component 120) may facilitate a user experience (UX) by providing the user interface of a spreadsheet application (e.g., spreadsheet application 110) via a display.

At receive selection operation 1304, one or more cells of a spreadsheet may be selected, either automatically (e.g., based on a function) or by user selection. For example, as described above with respect to receive selection operation 204, a selection component (e.g., selection component 112) may receive a selection of one or more cells, either automatically or by user indication.

At identify streaming data operation 1306, streaming data associated with the selected one or more cells may be identified. As detailed above, streaming data may refer to any type of data provided via a communications connection (e.g., via Bluetooth®, cellular, WAN, LAN, wired or wireless media, etc.) over some period of time. For instance, streaming data may refer to streaming audio (e.g., podcast, music, audio book), streaming video (e.g., live sports broadcast, YouTube® video, third-party hosted video, multiple frames transmitted from a camera, recorded video transmitted from a mobile device or video recorder, etc.), data feeds (e.g., twitter feed, stock ticker, fitness data from a wearable device, medical data from a medical device, diagnostic data from a mechanical device, etc.), and the like. Devices capable of streaming data may include, for instance, wearable devices (including watches, fitness bands, health monitoring devices, etc.), cameras, appliances, mobile devices, automobiles, etc. For example, streaming data may be identified based on a hyperlink within the selected one or more cells. In an example, the identified streaming data may include a heartrate values monitored on a periodic basis by a wearable device. In some cases, the heartrate values may be substantially continuously monitored and streamed from the wearable device in near real time.

At retrieve operation 1308, a plurality of values may be retrieved from the streaming data. That is, discrete values for various types of streamed data may be retrieved from the stream. For instance, discrete pitch values for streaming audio, discrete stock price values from a stock ticker, discrete health monitoring values from a medical device, and the like, may be retrieved from a stream. Continuing with the example above, discrete heartrate values may be retrieved from streaming data transmitted by a wearable device. In some cases, the heartrate values may be retrieved in near real time from the stream.

At receive charting function operation 1310, a selection of a charting function may be received, either automatically or by user indication. For example, a selection of a charting function may be received by a charting component (e.g., charting component 118) of a spreadsheet application, as described above with respect to receive charting function operation 508.

At create chart operation 1312, a chart may be created based at least in part on the identified streaming data. For instance, a charting component (charting component 118) may create a chart and a UX component (UX component 120) may provide the chart in an interface of the spreadsheet application. Continuing with the example above, a line graph may be created that presents an individual's heartrate values as monitored by a wearable device in near real time. That is, the line graph may be dynamically updated to present new heartrate values as they are received from the wearable device. By way of further example, with reference to a stock ticker, a data segment associated data values for a single trading day for a single stock may be extracted and displayed to a user (e.g., as a line graph or otherwise). Alternatively, a data segment associated with a group of stocks (e.g., a standard index or a custom group of stocks) may be extracted and displayed to a user (e.g., as a bar chart per stock, line graph of average prices-per-share, etc.). Further, each data segment representing a positive slope (e.g., increasing stock price) may be displayed over a day, a month, a year, etc. In still further examples, a live feed of stock prices can be appended during an earnings report and overlaid as a chart onto the video to show the immediate effect of the report on stock price. As should be appreciated, any suitable chart may be created based on the selected charting function and the identified streaming data.

As should be further appreciated, operations 1302-1312 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIG. 14A illustrates an interface showing at least one image associated with one or more cells of a spreadsheet, according to an example embodiment.

As illustrated, an interface 1400 of a spreadsheet application is provided. Interface 1400 includes a spreadsheet 1402, a navigation ribbon 1404 (including a cell identifier 1406 and a formula bar 1408), and a home toolbar 1410A. Interface 1400 further includes a plurality of tabs 1412 for accessing various aspects and operations of the spreadsheet application. As illustrated, a home tab, i.e., tab 1412A entitled "Home," is selected, which is indicated as an "unshaded" tab. As further illustrated, cell D3 is selected, as indicated by thickened and/or colored outlining of the cell border of cell D3. However, a selection of a cell may be indicated by any suitable means, such as highlighting, shading, perceived three-dimensional enlargement, and the like. As shown, a cell identifier 1406 (e.g., "D3") for the selected cell is displayed in navigation ribbon 1404. Additionally, formula bar 1408 displays a function calling a file locator, e.g., fx=IMAGE("http://www.BMWpics.com/Z4.png"), for the image (i.e., image 1414) displayed within cell D3.

As further illustrated by FIG. 14A, images 1414-1418 are pictures of different automobiles. In this case, additional data describing images 1414-1418 within cells D3-D5 of column 1432 is stored in cells within adjacent rows and/or columns. For example, in column "A" (i.e., column 1428), cells A3, A4 and A5 contain data regarding the "makes" of the automobiles shown in images 1414, 1416, and 1418, respectively. In column "B" (i.e., column 1430), cells B3, B4 and B5 contain data regarding the "models" of the automobiles shown in images 1414, 1416 and 1418, respectively. Cells C3, C4 and C5 of column "C" (i.e., column 1420) contain data regarding the "prices" (e.g., sticker prices) of the automobiles shown in images 1414, 1416 and 1418, respectively. Furthermore, row "3" (i.e., row 1422) provides the make, model, and price related to image 1414, row "4" (i.e., row 1424) provides the make, model, and price related to image 1416, and row "5" (i.e., row 1426) provides the make, model, and price related to image 1418. In aspects, the cells within a row may include values or objects (in this case, an image) that are related.

In some aspects, in response to selecting a cell that includes an associated image, a formatting menu 1456 (or other interface) may be provided for manipulating the associated image. In other aspects, formatting menu 1456 may be provided in response to additional input (e.g., a right click) within a selected cell. Formatting menu 1456 may include a number of tabs for viewing and manipulating various image attributes. For instance, formatting menu 1456 may include a color tab, a cell tab, a sizing tab 1462, an image tab, and a charting tab 1460, and the like. Sizing tab 1462 may display image attributes directed to image size and orientation such as "height," "width," "rotation," "scale height," "scale width," "aspect ratio," as well as displaying an original size for the image. Additionally, an image tab may provide image data and/or image attributes for viewing and manipulation of the image, such as resolution, sharpness, luminance, opacity, transparency, and the like (not shown). Color tab may provide image data and/or image attributes for viewing or manipulating a color palette for the image. In some cases, charting tab 1460 may be provided for selecting one or more image parameters for charting, including image data and/or image attributes of the associated image.

Formatting menu 1456 may also expose one or more operations for manipulating image data and/or image attributes of an associated image. For example, a input fields 1458, which may include UI controls (e.g., +/− controls), may be provided for one or more of the image attributes displayed by sizing tab 1462. In this regard, a current value for the image data or image attribute may be provided within the input field and a user may directly overwrite the current value by inputting a new value and/or adjusting the current value up or down using the UI controls. For instance, with reference to image attributes displayed by the sizing tab described above, values for "height," "width," "rotation," "scale height," and "scale width" may be adjusted by direct input and/or adjusted up or down using +/− controls. In some aspects, a preview (not shown) of an associated image may be provided by the formatting menu 1456 so that adjustments to an image may be viewed prior to acceptance. Additionally or alternatively, a "reset" button may be provided to return adjusted parameters back to an original version of the image. As should be appreciated, the above examples of image attributes are not exhaustive and any image attribute may be similarly surfaced and adjusted. Moreover, upon adjusting an image attribute via formatting menu 1456, corresponding changes may be made to the image in a chart.

Formatting menu 1456 may further provide UI controls for turning certain settings on or off. For instance, a selection may be provided for "locking (or fixing) aspect ratio" and a further selection may be provided for locking (or fixing) the aspect ratio "relative to an original size" of the image. With reference to sizing an image, additional selections may be provided to "move and size" the image with a cell, "move without sizing" the image with a cell, and "don't move or size" the image with a cell. Additional operations, such as printing an associated image or printing the image with additional data, may be provided. In further aspects, image data (e.g., an array of pixel values for rendering the image) may be surfaced and operations for manipulating the image data may be exposed to a user (not shown). In this way, image processing may be enabled for images within a spreadsheet. In some cases, some options may be disabled when certain settings are selected. For example, sizing options may be disabled when a "fit to cell" setting is selected. The above examples are provided for purposes of explanation only and should not be understood as limiting.

In other aspects of the present disclosure, rather than providing formatting menu 1456 (as illustrated by FIG. 14A), a formatting toolbar may be provided (not shown). For example, the formatting toolbar may be provided upon selection of a "Pic Format" tab. Options available in a formatting toolbar (not shown) associated with a pic format tab may include, for instance, moving an image from foreground to background, or background to foreground. Options may also including editing the image (e.g., touchup tools, etc.), adjusting colors, and/or adding artistic effects. Options for sizing the image, cropping the image, changing image orientation (e.g., vertically aligned to horizontally aligned), popping an image out of a cell, changing picture styles, changing picture borders, and/or changing picture layout may also be provided. Any number of options for manipulating images associated with cells may be provided in any suitable ribbon, tab, toolbar, menu, and the like. Moreover, upon manipulating an image within the spreadsheet, corresponding changes to the image may be made within a chart. As should be appreciated, in addition to an image, the above-described operations may be applied to other objects associated with a spreadsheet, e.g., an audio file, a video, streaming data, and the like.

As should be further appreciated, the various devices, components, etc., described with respect to FIG. 14A are not intended to limit the systems and methods to the particular components described. Accordingly, additional topology configurations may be used to practice the methods and systems herein and/or some components described may be excluded without departing from the methods and systems disclosed herein.

Figure 14B:
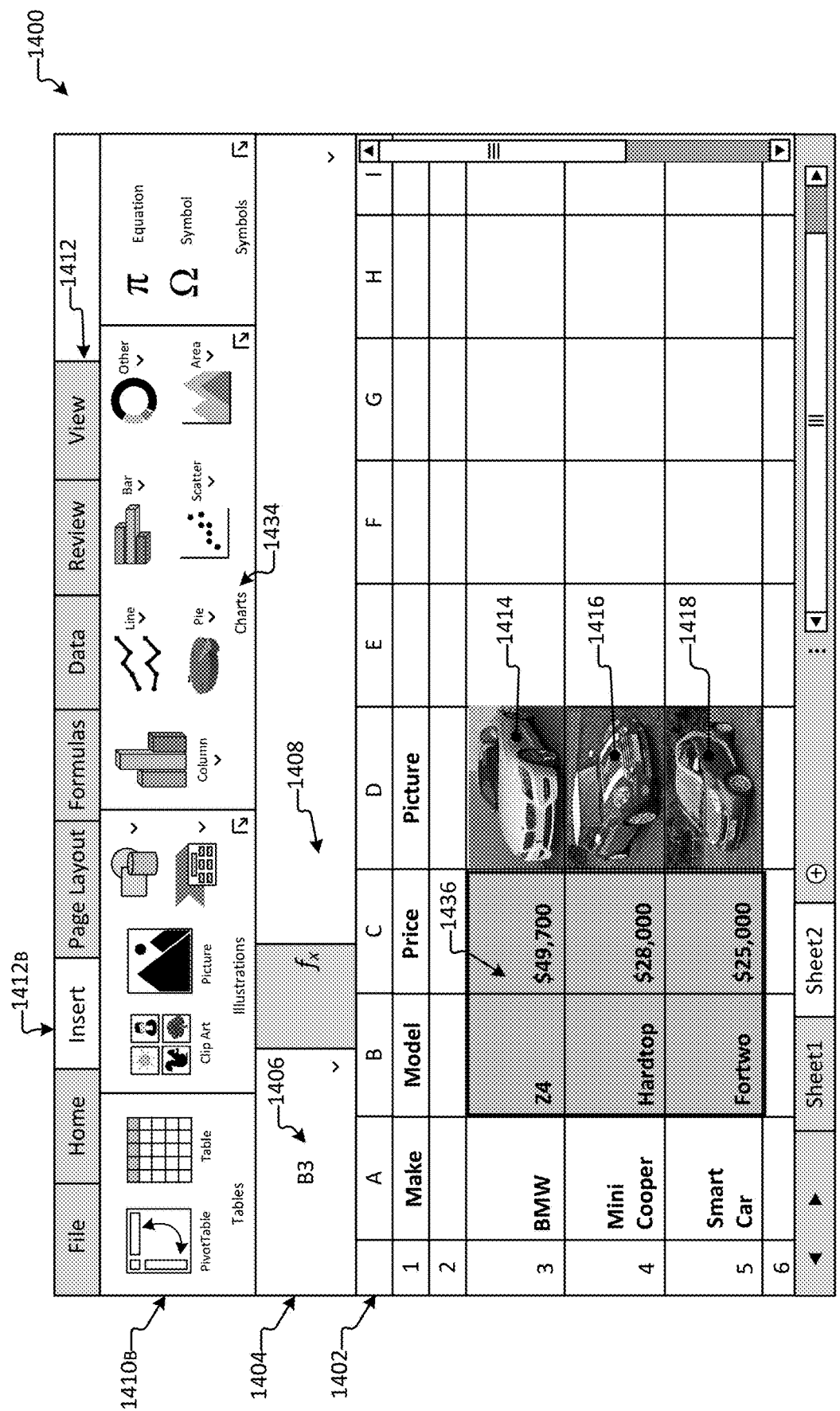
FIG. 14B illustrates an interface showing a selection cells associated with images in a spreadsheet, according to an example embodiment.

FIG. 14B illustrates an interface showing a selection cells associated with images in a spreadsheet, according to an example embodiment.

Similar to FIG. 14A, FIG. 14B shows interface 1400 of a spreadsheet application including spreadsheet 1402 and navigation ribbon 1404, which includes cell identifier 1406 and formula bar 1408. In this case, a range of cells 1436 (e.g., B3:C5) is identified as selected (e.g., by shading) and the cell at the top left corner of the range (i.e., cell B3) is identified by cell identifier 1406 (e.g., "B3") in the navigation pane 1404. The range of cells 1436 may be selected by highlighting the range of cells, touching (or swiping) the range of cells, entering "=B3:C5" into the formula bar, etc. In some cases, in response to a selection of a range of cells, formula bar 1408 may be blank (shown).

As further illustrated, an insert tab, i.e., tab 1412C entitled "Insert," has been selected, as indicated by an unshaded tab. In response to selection of insert tab 1412C, insert toolbar 1410B is provided. Insert toolbar 1410B provides a number of options for selecting various items to insert into the spreadsheet 1402. For instance, tables including pivot tables and other tables; illustrations including clip art, pictures, shapes, SmartArt, etc.; and symbols including equations and other symbols may be inserted into spreadsheet 1402. Additionally, insert toolbar 1410B provides for selecting various charts 1434, including bar charts, line graphs, pie charts, scatter plots, area graphs, etc., for insertion into spreadsheet 1402.

As should be appreciated, the various devices, components, etc., described with respect to FIG. 14B are not intended to limit the systems and methods to the particular components described. Accordingly, additional topology configurations may be used to practice the methods and systems herein and/or some components described may be excluded without departing from the methods and systems disclosed herein.

Figure 14C:
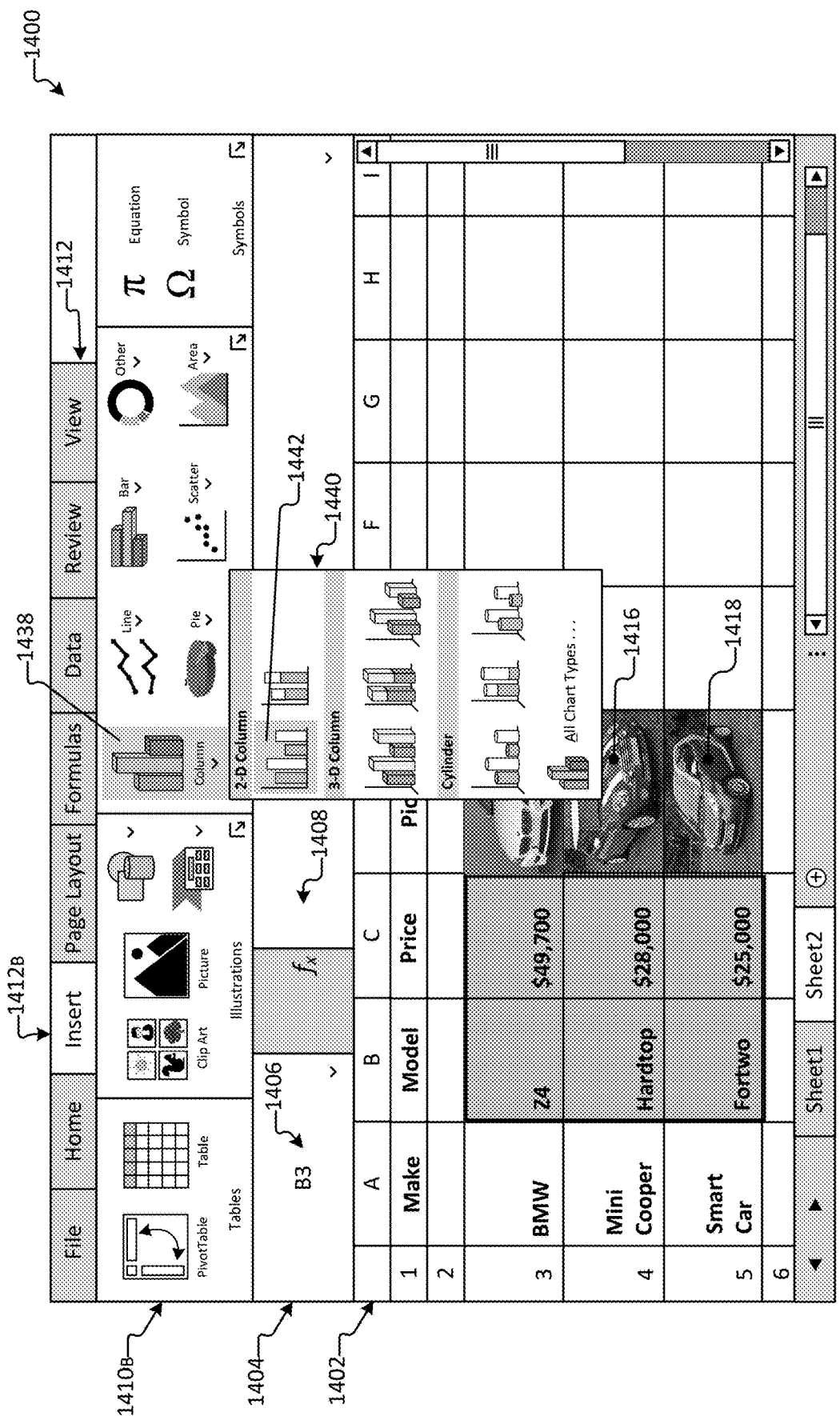
FIG. 14C illustrates an interface for selecting a charting function, according to an example embodiment.

FIG. 14C illustrates an interface for selecting a charting function, according to an example embodiment.

Similar to FIGS. 14A and 14B, FIG. 14C shows interface 1400 of a spreadsheet application including spreadsheet 1402 and navigation ribbon 1404, which includes cell identifier 1406 and formula bar 1408. As detailed above, a range of cells 1436 (e.g., B3:C5) is identified as selected (e.g., by shading) and the cell at the top left corner of the range (i.e., cell B3) is identified by cell identifier 1406 (e.g., "B3") in the navigation pane 1404.

As further illustrated by FIG. 14C, a bar chart icon 1438 has been selected (in particular, a column bar chart). In aspects, in response to selecting bar chart icon 1438, a dropdown menu 1440 (or other interface) may be provided for selecting different types of bar charts, such as two-dimensional (2D) bar charts, three-dimensional (3D) bar charts, cylinder bar charts, etc. In other aspects, dropdown menu 1440 may be provided in response to additional input (e.g., right click, cursor hover, etc.). As illustrated, 2D bar chart 1442 is identified as selected (e.g., by shading).

As should be appreciated, the various devices, components, etc., described with respect to FIG. 14C are not intended to limit the systems and methods to the particular components described. Accordingly, additional topology configurations may be used to practice the methods and systems herein and/or some components described may be excluded without departing from the methods and systems disclosed herein.

Figure 14D:
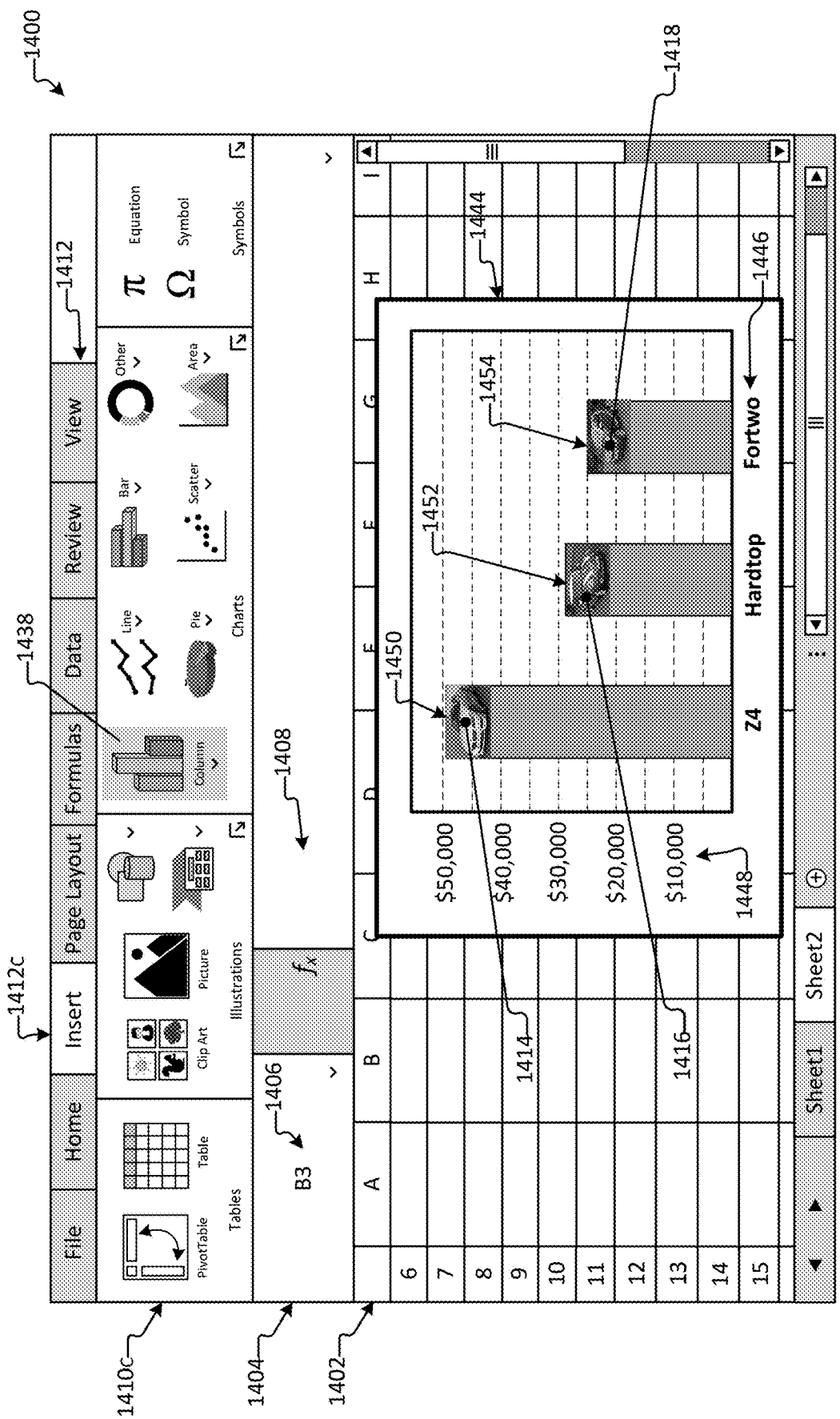
FIG. 14D illustrates a bar chart incorporating images, according to an example embodiment.

FIG. 14D illustrates a bar chart incorporating images, according to an example embodiment.

Similar to FIGS. 14A-14C, FIG. 14D shows interface 1400 of a spreadsheet application including spreadsheet 1402 and navigation ribbon 1404, which includes cell identifier 1406 and formula bar 1408. As further illustrated by FIG. 14D, a bar chart icon 1438 has been selected (in particular, a column bar chart). In this case, chart 1444 has been created and inserted in spreadsheet 1402. In examples, chart 1444 may be inserted as an overlay (shown) on spreadsheet 1402 or may be launched in a separate window or interface (not shown).

Chart 1444 is a bar chart graphing automobile models 1446 versus price 1448. In this case, a first bar 1450 represents a first sticker price for model "Z4," a second bar 1452 represents a second sticker price for model "Hardtop," and a third bar 1454 represents a third sticker price for model "Fortwo." As further illustrated, although images 1414, 1416 and 1418 were not within the selected range of cells 1436, these images have been incorporated into the chart. In aspects, images 1414, 1416 and 1418 may be identified as associated with the selected range of cells 1436 based on being within the same rows, respectively, as at least one cell within the selected range of cells 1436.

In particular, a first image (e.g., image 1414) of a Z4 model is incorporated into the first bar 1450, a second image (e.g., image 1416) of a Hardtop model is incorporated into the second bar 1452, and a third image (e.g., image 1418) of a Fortwo model is incorporated into the third bar 1454. As shown, the first, second and third images are incorporated at a top of the first bar 1450, the second bar 1452 and the third bar 1454, respectively. In other examples, the first, second and third images may be shown as fill for the first, second and third bars 1450-1454, or represented by a visual representation (e.g., icon) which displays the first, second or third images upon selection, or otherwise incorporated into the chart 1444. In still other examples, other objects (e.g., audio files, videos, streaming data, etc.) may be associated with the selected range of cells 1436 and may be similarly incorporated within chart 1444.

As should be appreciated, the various devices, components, etc., described with respect to FIG. 14D are not intended to limit the systems and methods to the particular components described. Accordingly, additional topology configurations may be used to practice the methods and systems herein and/or some components described may be excluded without departing from the methods and systems disclosed herein.

Figure 15A:
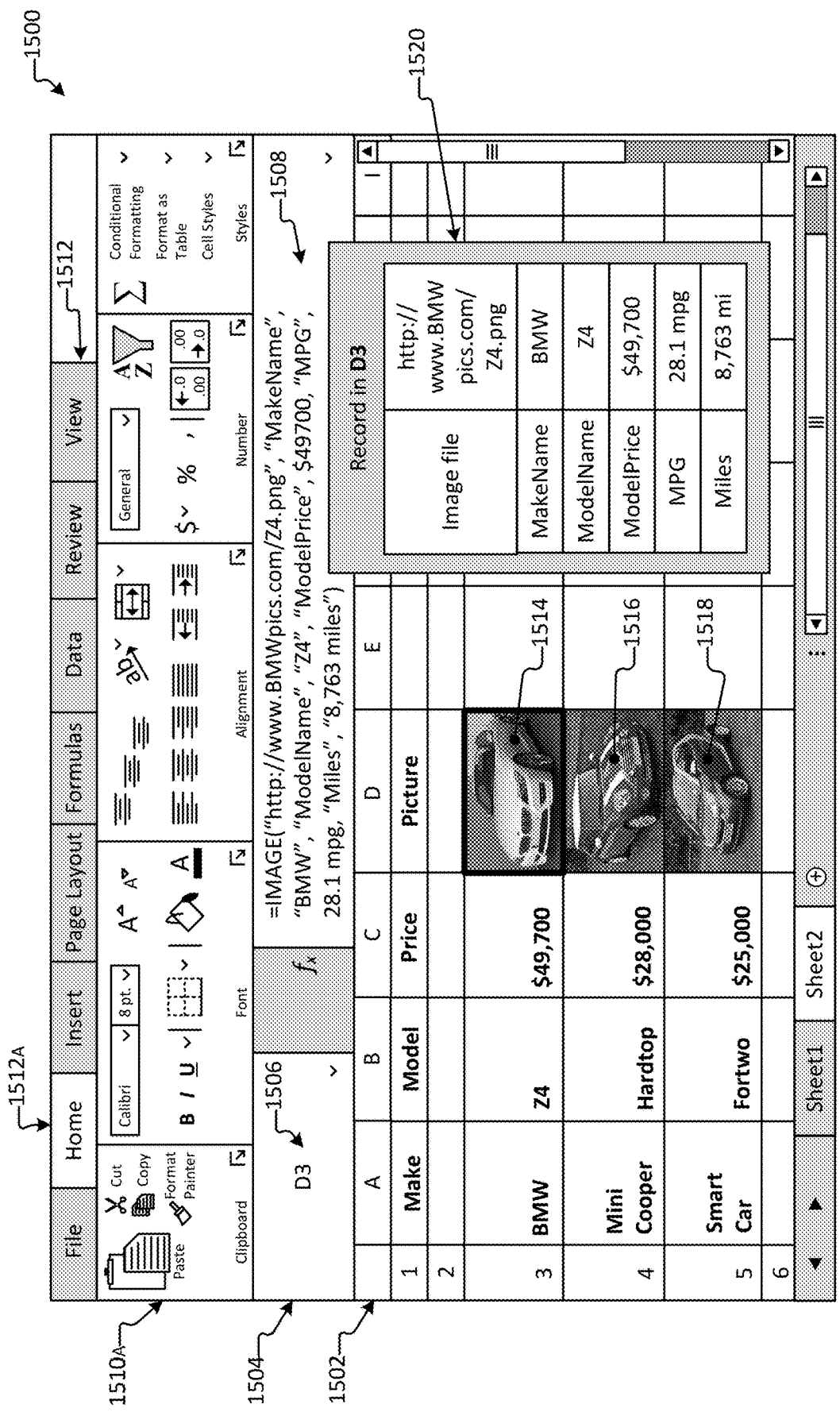
FIG. 15A illustrates an interface showing a selected image associated with a compound data type represented by a record, according to an example embodiment.

FIG. 15A illustrates an interface showing a selected image associated with a compound data type represented by a record, according to an example embodiment.

As illustrated, an interface 1500 of a spreadsheet application is provided. Interface 1500 includes a spreadsheet 1502, a navigation ribbon 1504 (including a cell identifier 1506 and a formula bar 1508), and a home toolbar 1510A. Interface 1500 further includes a plurality of tabs 1512 for accessing various aspects and operations of the spreadsheet application. As illustrated, a home tab, i.e., tab 1512A entitled "Home," is selected, which is indicated as an "unshaded" tab. As further illustrated, cell D3 is selected, as indicated by thickened and/or colored outlining of the cell border of cell D3. A cell identifier 1506 (e.g., "D3") for the selected cell is displayed in navigation ribbon 1504.

As illustrated, cell D3 contains image 1514, which depicts an automobile. In some aspects, image 1514 may be associated with a compound data type. In this case, a formula bar 1508 may display a function describing the compound data type associated with image 1514 contained in cell D3. In other aspects (not shown), formula bar 1508 for cell D3 may display a function referencing a globally unique name for the compound data type associated with image 1514 contained in cell D3.

A function representing the compound data type may be identified using a variety of syntax. For instance, the function may surface whatever image data, image attributes or additional data are stored in the compound data type and may be represented as: =IMAGE("http://www.BMWpics.com/Z4.png", "MakeName", "BMW", "ModelName", "Z4", "ModelPrice", $49700, "MPG", 28.1 mpg, "Miles", "8,763 miles"). In this case, a first portion of the function may reference a file locator for image 1514, e.g., =IMAGE ("http://www.BMWpics.com/Z4.png"), and a second portion of the function may reference additional data, e.g., "MakeName", "BMW", "ModelName", "Z4", "ModelPrice", $49,700, "MPG", 28.1 mpg, "Miles", "8,763 miles".

As further illustrated, a record 1520 may display fields and values of the compound data type contained in cell D3. In this case, where a user combines an image with an arbitrary set of values (e.g., a record), the function may be represented as: =IMAGE("http://www.BMWpics.com/Z4.png", RECORD("MakeName", "BMW", "ModelName", "Z4", "ModelPrice", $49,700, "MPG", 28.1 mpg, "Miles", "8,763 miles")). In still other aspects, where an image (identified by a ".png" file extension) is added to a compound data type constructed by a user, the image would amount to a value within the compound data type (e.g., a record) and the function may be represented as: =RECORD ("Image", Z4.png, "MakeName", "BMW", "ModelName", "Z4", "ModelPrice", $49,700, "MPG", 28.1 mpg, "Miles", "8,763 miles"). In still other aspects, a user may create a compound data type and give the compound data type a name (e.g., "AutoResearch"). The next time the compound data type is used, each attribute name is already known as a field in the "AutoResearch" compound data type and only the values need to be called out in the function, which may be represented as: =AUTORESEARCH("http://www.BMWpics.com/Z4.png", "BMW", "Z4", $49,700, 28.1 mpg, "8,763 miles"). Further, the function may simply reference attributes of the image and read the values from metadata, e.g., =RECORD("Image", "http://www.BMWpics.com/Z4.png", "BMW", "ModelName", "Z4", "ModelPrice", Z4.price, "MPG", Z4.mpg, "Miles", Z4.miles). In this case, a user may provide custom fields within the compound data type (e.g., record) and, by dereferencing the 'image' field, values may be read from metadata and populated in the user's defined fields in the record. As should be appreciated, in addition to an image, the above-described operations may be applied to other objects associated with a spreadsheet, e.g., an audio file, a video, streaming data, and the like.

As should be appreciated, users may add objects to a spreadsheet as native object types. In this case, code may be written that represents an object, which code can be added to a cell, to a file, at some URL, which the spreadsheet application may traverse to retrieve the object. In this case, the object may be defined by its internal representation, e.g., its code. For instance, the object may have JSON properties. The formula bar for a cell in which the object resides may then display an icon for that object type, or text that indicates the object is of a particular type, etc. Dereferencing the properties of the object, e.g., through A1.<propertyName>, can be used, so long as the developer implemented name/properties, or more accurately implemented an interface that allows the spreadsheet to retrieve such object parameters. In aspects, a developer may be able to define literally any property for an object, e.g., a "shoe size" property for a video. Additionally or alternatively, a user interface may be provided that surfaces properties for the object to the user in a dialog. That is, spreadsheet functionality may be provided such that developers are not required to make objects with function representations, i.e., objects without such representations may still be compatible. In some implementations, an object may be built using a general card UI for specifying the object, a name for the object, arbitrary name/value pairs, etc. In some cases, while the data structures and behavior of the object may be the same, this implementation may not generate a function representation for the object, providing flexibility to the developer.

As should be further appreciated, the various devices, components, etc., described with respect to FIG. 15A are not intended to limit the systems and methods to the particular components described. Accordingly, additional topology configurations may be used to practice the methods and systems herein and/or some components described may be excluded without departing from the methods and systems disclosed herein.

Figure 15B:
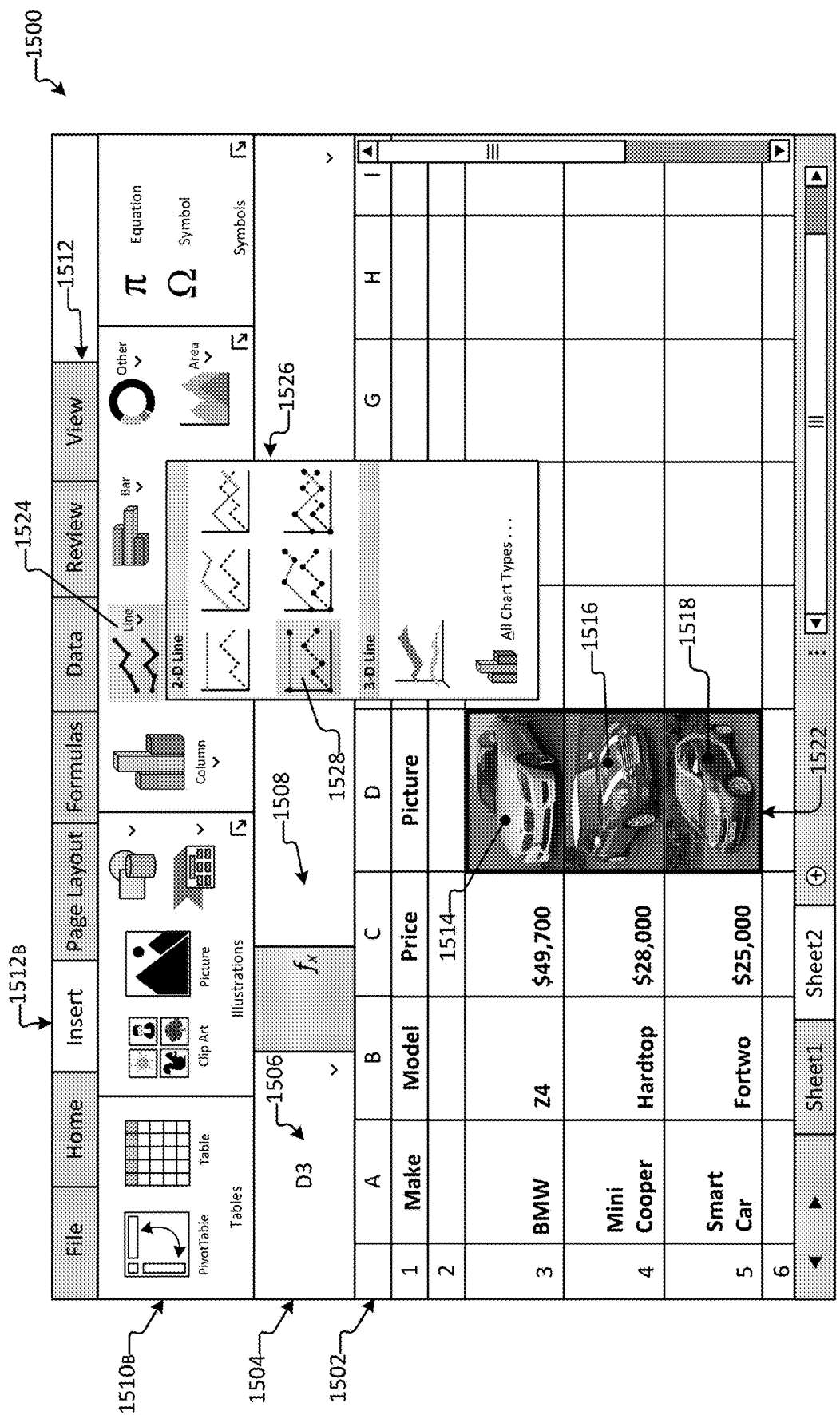
FIG. 15B illustrates an interface for selecting a charting function, according to an example embodiment.

FIG. 15B illustrates an interface for selecting a charting function, according to an example embodiment.

Similar to FIG. 15A, FIG. 15B shows interface 1500 of a spreadsheet application including spreadsheet 1502 and navigation ribbon 1504, which includes cell identifier 1506 and formula bar 1508. In this case, a range of cells 1522 (e.g., D3:D5) is identified as selected (e.g., by outlining) and the cell at the top of the range (i.e., cell D3) is identified by cell identifier 1506 (e.g., "D3") in the navigation pane 1504. The range of cells 1522 may be selected by highlighting the range of cells, touching (or swiping) the range of cells, entering "=D3:D5" into the formula bar, etc. In some cases, in response to a selection of a range of cells, formula bar 1508 may be blank (shown).

As further illustrated, an insert tab, i.e., tab 1512B entitled "Insert," has been selected, as indicated by an unshaded tab. In response to selection of insert tab 1512B, insert toolbar 1510B is provided. Insert toolbar 1510B provides a number of options for selecting various items to insert into the spreadsheet 1502, as described above with respect to FIG. 14C. For instance, insert toolbar 1510B provides for selecting various charts, including bar charts, line graphs, pie charts, scatter plots, area graphs, etc., for insertion into spreadsheet 1502.

As further illustrated by FIG. 15B, a line graph icon 1524 is identified as selected (e.g., by shading). In aspects, in response to selecting line graph icon 1524, a dropdown menu 1526 (or other interface) may be provided for selecting different types of line graphs, such as two-dimensional (2D) line graphs, three-dimensional (3D) line graphs, etc. In other aspects, dropdown menu 1526 may be provided in response to additional input (e.g., right click, cursor hover, etc.). As illustrated, 2D line graph 1528 is identified as selected (e.g., by shading).

As should be appreciated, the various devices, components, etc., described with respect to FIG. 15B are not intended to limit the systems and methods to the particular components described. Accordingly, additional topology configurations may be used to practice the methods and systems herein and/or some components described may be excluded without departing from the methods and systems disclosed herein.

Figure 15C:
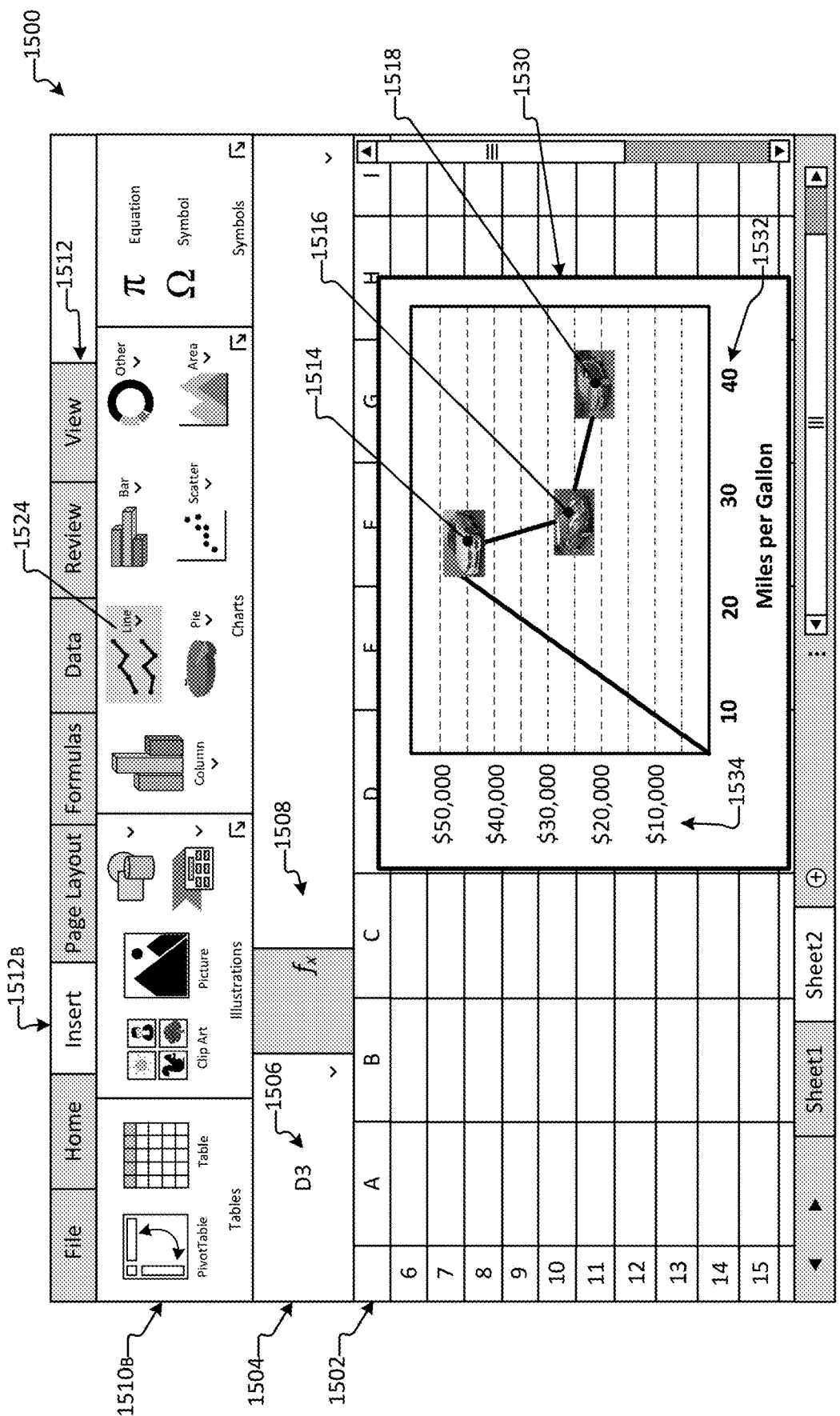
FIG. 15C illustrates a line graph charting values associated with images in compound data types, according to an example embodiment.

FIG. 15C illustrates a line graph charting values associated with images in compound data types, according to an example embodiment.

Similar to FIGS. 15A-15B, FIG. 15C shows interface 1500 of a spreadsheet application including spreadsheet 1502 and navigation ribbon 1504, which includes cell identifier 1506 and formula bar 1508. As further illustrated by FIG. 15C, a line graph icon 1524 has been selected (as indicated by shading). In this case, chart 1530 has been created and inserted in spreadsheet 1502. In examples, chart 1530 may be inserted as an overlay (shown) on spreadsheet 1502 or may be launched in a separate window or interface (not shown).

Chart 1530 is a line graph charting miles per gallon (mpg) 1532 versus price 1534. That is, although values for miles per gallon for each automobile were not represented within the selected range of cells 1522, this data was nonetheless charted. In this regard, a value for mpg may be represented in a compound data type associated with each image, as illustrated for image 1514 in FIG. 15A, and may be identified and charted. In this case, a first image (e.g., image 1514) represents a first data point for model "Z4," a second image (e.g., image 1516) represents a second data point for model "Hardtop," and a third image (e.g., image 1518) represents a third data point for model "Fortwo" on the chart 1530. In other examples, rather than providing images 1514-1518 as data points, a visual representation (e.g., icon) for each image 1514-1518 may be provided as a data point. In response to selection of the visual representations, one or more of images 1514-1518 may be displayed as an overlay to chart 1530, within a separate window, or otherwise. In further aspects, data and/or parameters associated with compound data types for other objects (e.g., audio files, videos, streaming data) within a spreadsheet may be similarly charted and such objects may be similarly incorporated into a chart such as chart 1530.

As should be appreciated, the various devices, components, etc., described with respect to FIG. 15C are not intended to limit the systems and methods to the particular components described. Accordingly, additional topology configurations may be used to practice the methods and systems herein and/or some components described may be excluded without departing from the methods and systems disclosed herein.

Figure 16:
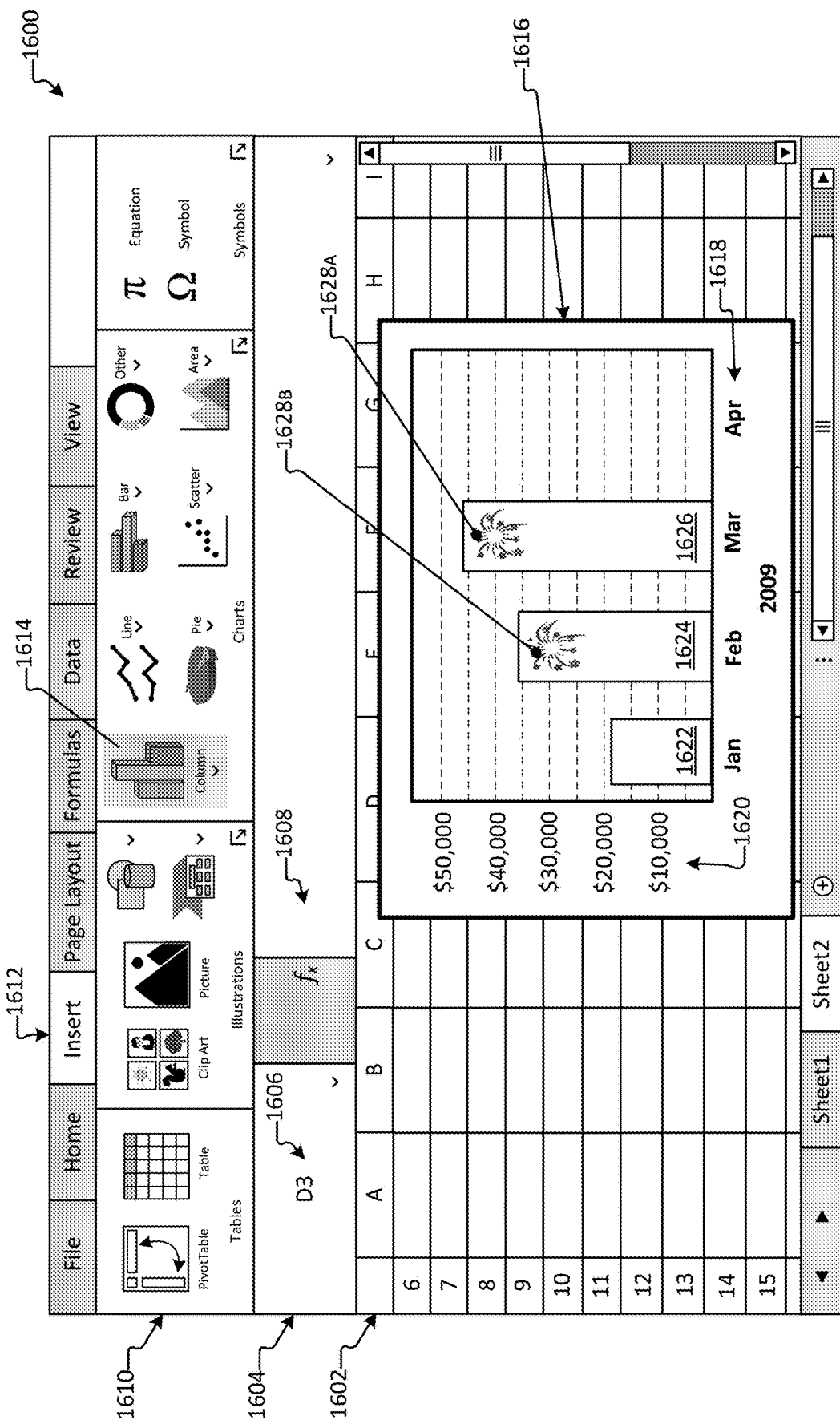
FIG. 16 illustrates a bar chart incorporating images in response to satisfaction of a condition, according to a first example embodiment.

FIG. 16 illustrates a bar chart incorporating images in response to satisfaction of a condition, according to a first example embodiment.

FIG. 16 shows interface 1600 of a spreadsheet application including spreadsheet 1602 and navigation ribbon 1604, which includes cell identifier 1606 and formula bar 1608. As further illustrated, an insert tab, i.e., tab 1612 entitled "Insert," has been selected, as indicated by an unshaded tab. In response to selection of insert tab 1612, insert toolbar 1610 is provided. Insert toolbar 1610 provides a number of options for selecting various items to insert into the spreadsheet 1602. For instance, insert toolbar 1610 provides for selecting various charts, including bar charts, line graphs, pie charts, scatter plots, area graphs, etc., for insertion into spreadsheet 1602.

As further illustrated by FIG. 16, a bar chart icon 1614 has been selected (in particular, a column bar chart). In this case, chart 1616 has been created and inserted in spreadsheet 1602. In examples, chart 1616 may be inserted as an overlay (shown) on spreadsheet 1602 or may be launched in a separate window or interface (not shown). Chart 1616 is a bar chart graphing revenue values 1620 for months 1618. In this case, a first bar 1622 represents a first revenue value for January, a second bar 1624 represents a second revenue value for February, and a third bar 1626 represents a third revenue value for March. In this example, underlying spreadsheet data is not shown.

As illustrated, a first image 1628A of fireworks is incorporated into the second bar 1624 and a second image 1628B of fireworks is incorporated into the third bar 1626. In aspects, a condition may be specified by a user or may be automatically generated by the spreadsheet application. For instance, the condition may specify that when revenue values exceed a particular threshold, e.g., $30,000, an image 1628 of fireworks should be incorporated into a corresponding bar or data point of the chart. In this case, the revenue values for each month may be evaluated against the threshold to determine whether the condition is satisfied. In aspects, a file locator, link, reference or pointer to image 1628 may be included in a condition function. As illustrated, the first revenue value for January does not exceed the threshold, whereas the second and third revenue values (represented by the second and third bars 1624-1626, respectively) for February and March exceed the threshold of $30,000. Accordingly, image 1628 of fireworks is not incorporated into the first bar 1622 and is incorporated into each of the second and third bars 1624-1626 as first image 1628A and second image 1628B.

As shown, the first image 1628A and the second image 1628B are incorporated at a top of the second bar 1624 and the third bar 1626, respectively. In other examples, the first and second images 1628A-B may be shown as fill for the second and third bars 1624-1626, or represented by a visual representation (e.g., icon) which displays the first and second images 1628A-B upon selection. In other examples, other objects (e.g., audio files, videos, streaming data) may be similarly incorporated within chart 1616 upon satisfaction of a condition.

As should be appreciated, the various devices, components, etc., described with respect to FIG. 16 are not intended to limit the systems and methods to the particular components described. Accordingly, additional topology configurations may be used to practice the methods and systems herein and/or some components described may be excluded without departing from the methods and systems disclosed herein.

Figure 17:
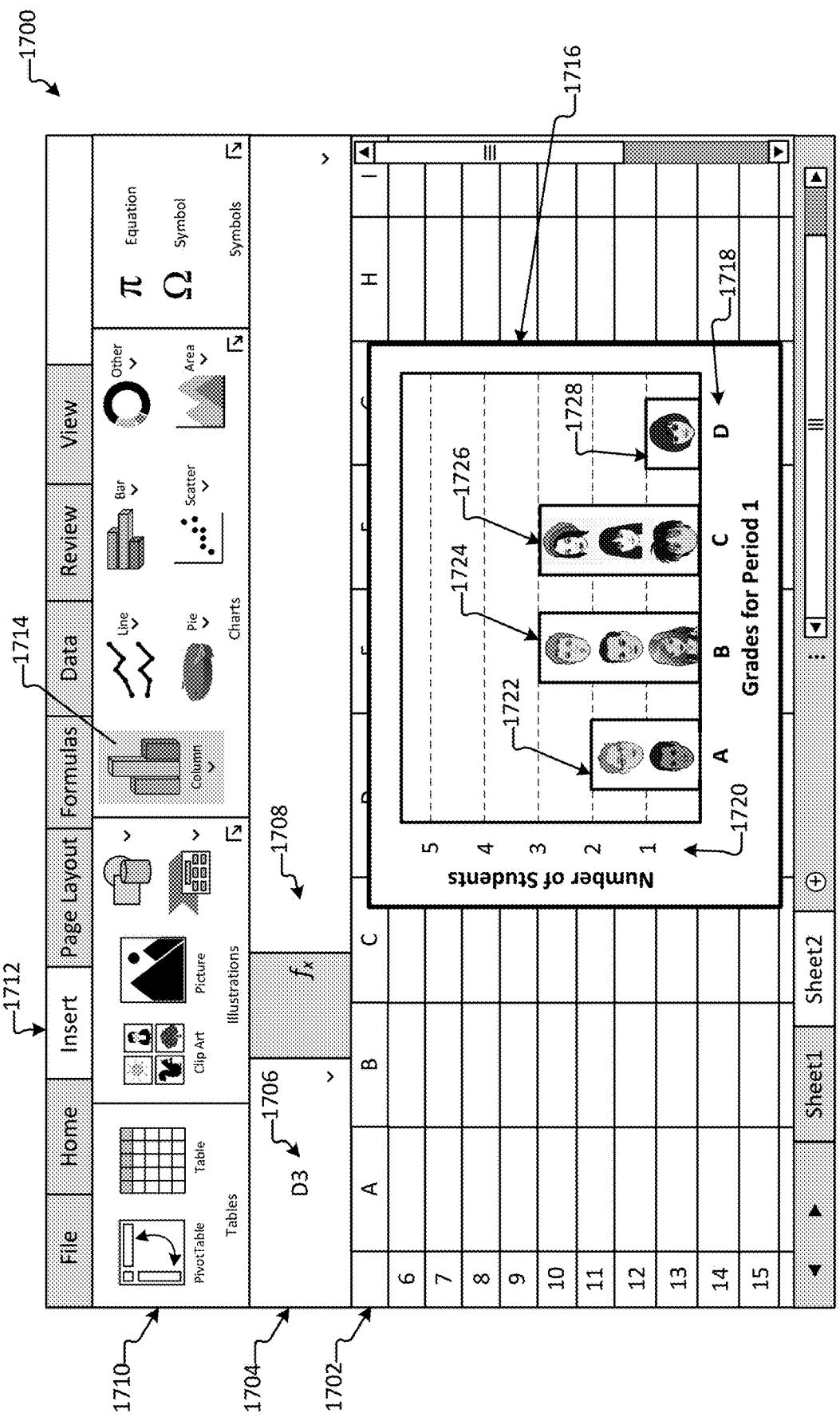
FIG. 17 illustrates a bar chart incorporating a plurality of images within a single bar, according to an example embodiment.

FIG. 17 illustrates a bar chart incorporating a plurality of images within a single bar, according to an example embodiment.

FIG. 17 shows interface 1700 of a spreadsheet application including spreadsheet 1702 and navigation ribbon 1704, which includes cell identifier 1706 and formula bar 1708. As further illustrated, an insert tab, i.e., tab 1712 entitled "Insert," has been selected, as indicated by an unshaded tab. In response to selection of insert tab 1712, insert toolbar 1710 is provided. Insert toolbar 1710 provides for selecting various charts, including bar charts, line graphs, pie charts, scatter plots, area graphs, etc., for insertion into spreadsheet 1702.

As further illustrated by FIG. 17, a bar chart icon 1714 has been selected (in particular, a column bar chart). In this regard, chart 1716 has been created and inserted in spreadsheet 1702. In examples, chart 1716 may be inserted as an overlay (shown) on spreadsheet 1702 or may be launched in a separate window or interface (not shown). Chart 1716 is a bar chart graphing a number of students 1720 having grades 1718 for period 1 of a class. In this case, a first bar 1722 represents a first number of students (i.e., two students) having "A's", a second bar 1724 represents a second number of students (i.e., three students) having "B's", a third bar 1726 represents a third number of students (i.e., three students) having "C's", and a fourth bar 1728 represents a fourth number of students (i.e., one student) having a "D". In this example, underlying spreadsheet data is not shown.

As illustrated, two images (one image corresponding to each of the two students having A's) are incorporated into the first bar 1722, three images (one image corresponding to each of the three students having B's) are incorporated into the second bar 1724, three images (one image corresponding to each of the three students having C's) are incorporated into the third bar 1726, and one image corresponding to the student having a D is incorporated into the fourth bar 1728. In aspects, images corresponding to each student may be associated with one or more cells selected for charting (not shown) in chart 1716, or images corresponding to each student may be associated with at least one cell that is within the same row as at least one cell of the selected one or more cells. In further aspects, selection of a charting function may include an indication to incorporate the images corresponding to the students into the chart. Alternatively, the images corresponding to the students may automatically be incorporated into the chart. As shown, images corresponding to the students are sized to fit within first, second, third and fourth bars 1722-1728. In other examples, the images may be represented by visual representations (e.g., icons) that display the images corresponding to the students upon selection. As should be appreciated, the above-described operations may be applied to other objects associated with a spreadsheet, e.g., an audio file, a video, streaming data, and the like.

As should be further appreciated, the various devices, components, etc., described with respect to FIG. 17 are not intended to limit the systems and methods to the particular components described. Accordingly, additional topology configurations may be used to practice the methods and systems herein and/or some components described may be excluded without departing from the methods and systems disclosed herein.

Figure 18:
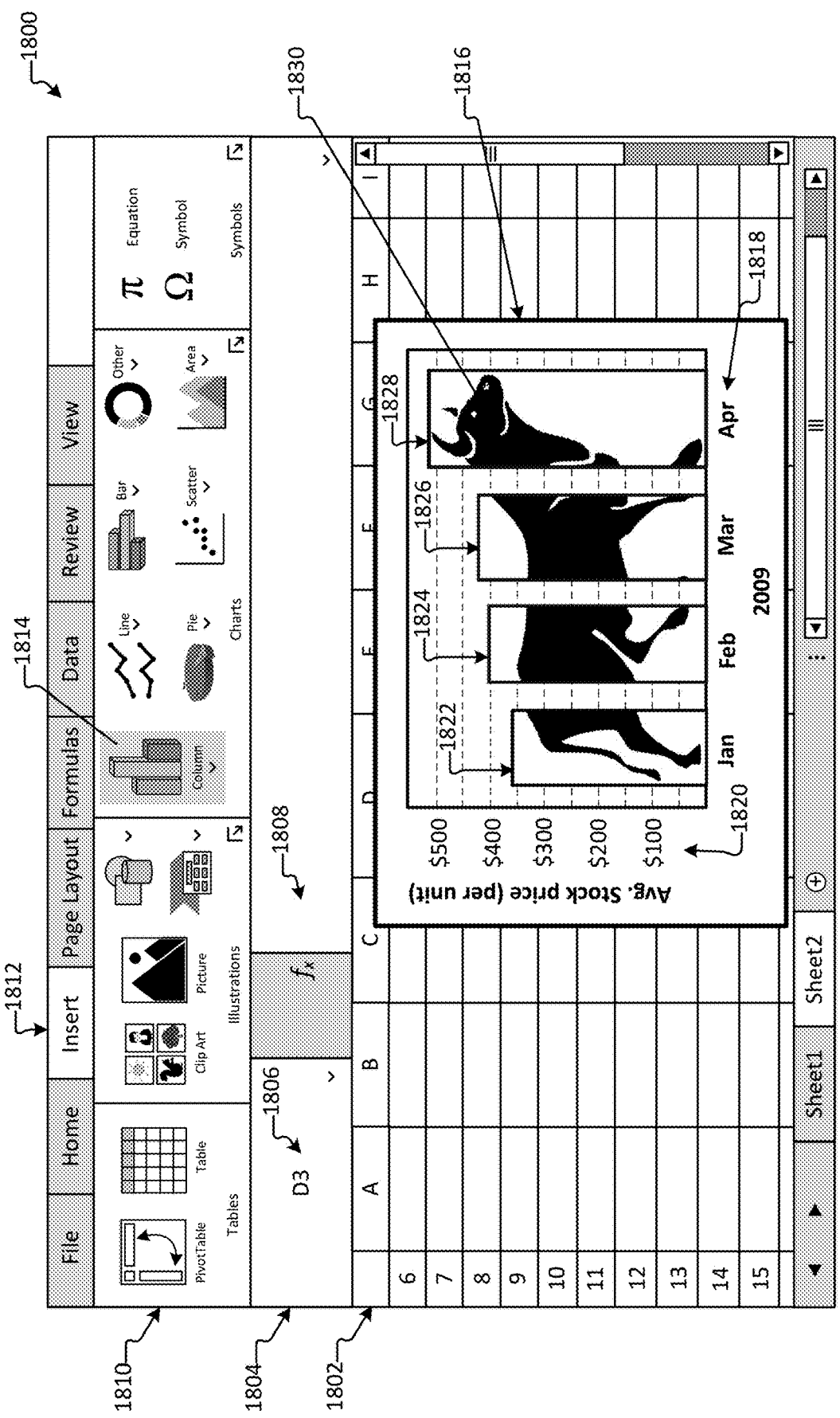
FIG. 18 illustrates a bar chart incorporating an image in response to satisfaction of a condition, according to a second example embodiment.

FIG. 18 illustrates a bar chart incorporating an image in response to satisfaction of a condition, according to a second example embodiment.

FIG. 18 shows interface 1800 of a spreadsheet application including spreadsheet 1802 and navigation ribbon 1804, which includes cell identifier 1806 and formula bar 1808. As further illustrated, an insert tab, i.e., tab 1812 entitled "Insert," has been selected, as indicated by an unshaded tab. In response to selection of insert tab 1812, insert toolbar 1810 is provided. Insert toolbar 1810 provides for selecting various charts, including bar charts, line graphs, pie charts, scatter plots, area graphs, etc., for insertion into spreadsheet 1802.

As further illustrated by FIG. 18, a bar chart icon 1814 has been selected (in particular, a column bar chart). In this case, chart 1816 has been created and inserted in spreadsheet 1802. In examples, chart 1816 may be inserted as an overlay (shown) on spreadsheet 1802 or may be launched in a separate window or interface (not shown). Chart 1816 is a bar chart graphing average stock prices 1820 (e.g., for a particular stock or a group of stocks) for months 1818. In this case, a first bar 1822 represents a first average stock price for January, a second bar 1824 represents a second average stock price for February, a third bar 1826 represents a third average stock price for March, and a fourth bar 1828 represents a fourth average stock price for April. In this example, underlying spreadsheet data is not shown.

As illustrated, a single image of a bull (i.e., image 1830) is incorporated as fill across each of the first, second, third and fourth bars 1822-1828. In aspects, a condition may be specified by a user or may be automatically generated by the spreadsheet application. For instance, the condition may specify that when average stock prices are increasing month over month (e.g., for a particular stock or a group of stocks), image 1830 of a bull should be incorporated as fill into the bars of the chart. Conversely, the same or another condition may specify that when average stock prices are decreasing month over month (e.g., for a particular stock or a group of stocks), an image of a bear (not shown) should be incorporated as fill into the bars of the chart.

As shown, the average stock prices for each month may be evaluated to determine whether they are increasing or decreasing in order to determine whether the condition is satisfied. In aspects, a file locator, link, reference or pointer to image 1830 may be included in a condition function. As illustrated, the first average stock price for January is less than the second average stock price for February, which is less than the third average stock price for March, which is less than the fourth average stock price for April. In this case, the average stock prices are increasing month-over-month between January and April. Accordingly, image 1830 of a bull is incorporated as fill in each of the first, second, third and fourth bars 1822-1828. In contrast, had the average stock price decreased between March and April, based on the condition, an image of a bear would have been incorporated as fill in the fourth bar 1828 for April (not shown). As should be appreciated, other objects may be incorporated into a chart based on a condition, e.g., an audio file, a video, streaming data, and the like.

As should be further appreciated, the various devices, components, etc., described with respect to FIG. 18 are not intended to limit the systems and methods to the particular components described. Accordingly, additional topology configurations may be used to practice the methods and systems herein and/or some components described may be excluded without departing from the methods and systems disclosed herein.

Figure 19A:
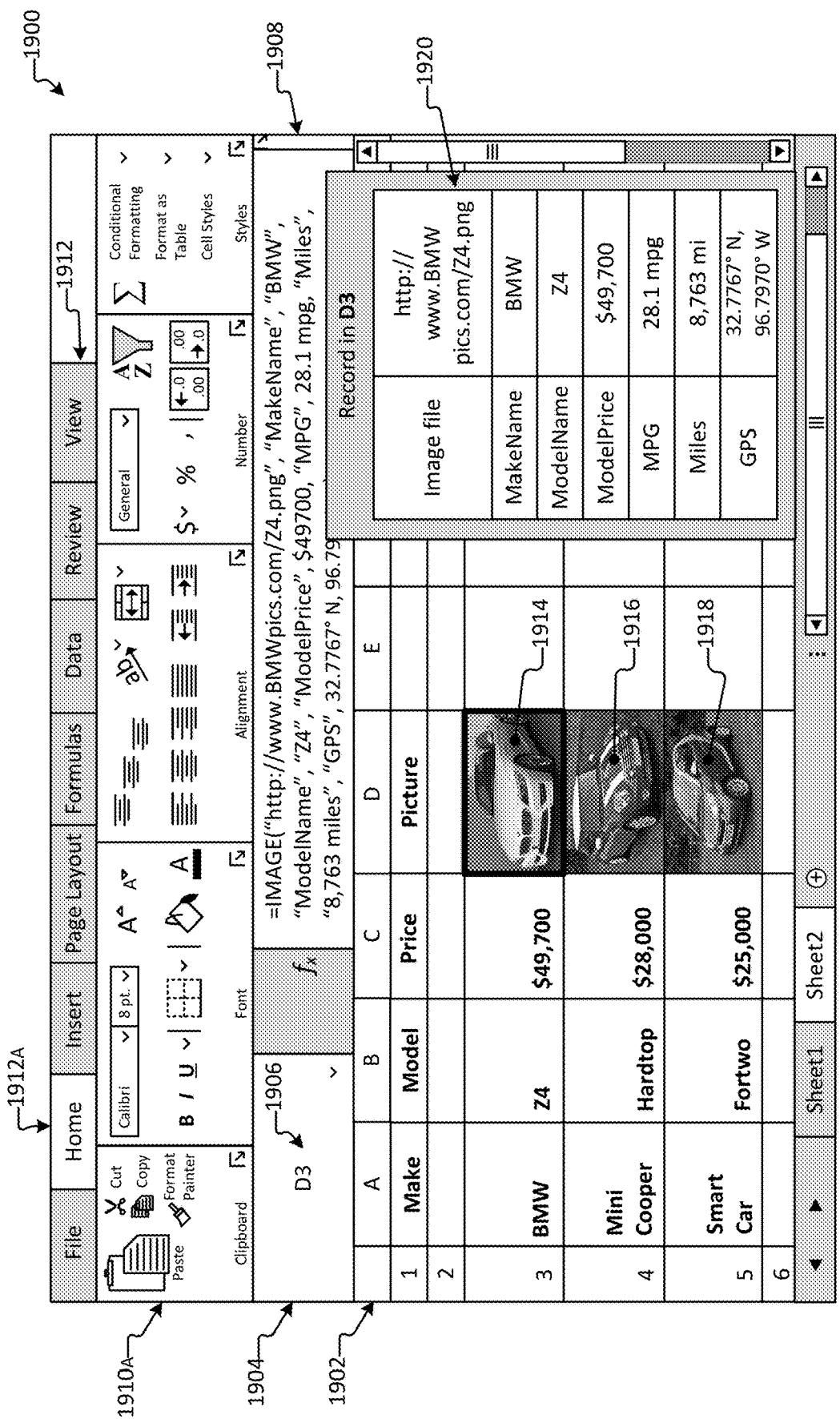
FIG. 19A illustrates an interface showing a selected image associated with a compound data type represented by a record, according to an example embodiment.

FIG. 19A illustrates an interface showing a selected image associated with a compound data type represented by a record, according to an example embodiment.

As illustrated, an interface 1900 of a spreadsheet application is provided. Interface 1900 includes a spreadsheet 1902, a navigation ribbon 1904 (including a cell identifier 1906 and a formula bar 1908), and a home toolbar 1910A. Interface 1900 further includes a plurality of tabs 1912 for accessing various aspects and operations of the spreadsheet application. As illustrated, a home tab, i.e., tab 1912A entitled "Home," is selected, which is indicated as an "unshaded" tab. As further illustrated, cell D3 is selected, as indicated by thickened and/or colored outlining of the cell border of cell D3. A cell identifier 1906 (e.g., "D3") for the selected cell is displayed in navigation ribbon 1904.

As illustrated, cell D3 contains image 1914, which depicts an automobile. In some aspects, image 1914 may be associated with a compound data type. In this case, a formula bar 1908 may display a function describing the compound data type associated with image 1914 contained in cell D3. In other aspects (not shown), formula bar 1908 for cell D3 may display a function referencing a globally unique name for the compound data type associated with image 1914 contained in cell D3.

A function representing the compound data type may be identified using a variety of syntax. For instance, the function may surface whatever image data, image attributes or additional data are stored in the compound data type and may be represented as: =IMAGE("http://www.BMWpics.com/Z4.png", "MakeName", "BMW", "ModelName", "Z4", "ModelPrice", $49700, "MPG", 28.1 mpg, "Miles", "8,763 miles", "GPS", 32.7767° N, 96.7970° W). In this case, a first portion of the function may reference a file locator for image 1914, e.g., =IMAGE("http://www.BMWpics.com/Z4.png"), and a second portion of the function may reference additional data, e.g., ("MakeName", "BMW", "ModelName", "Z4", "ModelPrice", $49,700, "MPG", 28.1 mpg, "Miles", "8,763 miles", "GPS", 32.7767° N, 96.7970° W).

As further illustrated, a record 1920 may display fields and values of the compound data type contained in cell D3. In this case, where a user combines an image with an arbitrary set of values (e.g., a record), the function may be represented as: =IMAGE("http://www.BMWpics.com/Z4.png", RECORD("MakeName", "BMW", "ModelName", "Z4", "ModelPrice", $49,700, "MPG", 28.1 mpg, "Miles", "8,763 miles", "GPS", 32.7767° N, 96.7970° W)). In still other aspects, where an image (identified by a ".png" file extension) is added to a compound data type constructed by a user, the image would amount to a value within the compound data type (e.g., a record) and the function may be represented as: =RECORD("Image", Z4.png, "MakeName", "BMW", "ModelName", "Z4", "ModelPrice", $49,700, "MPG", 28.1 mpg, "Miles", "8,763 miles", "GPS", 32.7767° N, 96.7970° W). In still other aspects, a user may create a compound data type and give the compound data type a name (e.g., "AutoResearch"). The next time the compound data type is used, each attribute name is already known as a field in the "AutoResearch" compound data type and only the values need to be called out in the function, which may be represented as: =AUTORESEARCH("http://www.BMWpics.com/Z4.png", "BMW", "Z4", $49,700, 28.1 mpg, "8,763 miles", 32.7767° N, 96.7970° W). Further, the function may simply reference attributes of the image and read the values from metadata, e.g., =RECORD("Image", "http://www.BMWpics.com/Z4.png", "BMW", "ModelName", "Z4", "ModelPrice", Z4.price, "MPG", Z4.mpg, "Miles", Z4.miles, "GPS", Z4.gps). In this case, a user may provide custom fields within the compound data type (e.g., record) and, by dereferencing the 'image' field, values may be read from metadata and populated in the user's defined fields in the record.

As should be appreciated, the various devices, components, etc., described with respect to FIG. 19A are not intended to limit the systems and methods to the particular components described. Accordingly, additional topology configurations may be used to practice the methods and systems herein and/or some components described may be excluded without departing from the methods and systems disclosed herein.

Figure 19B:
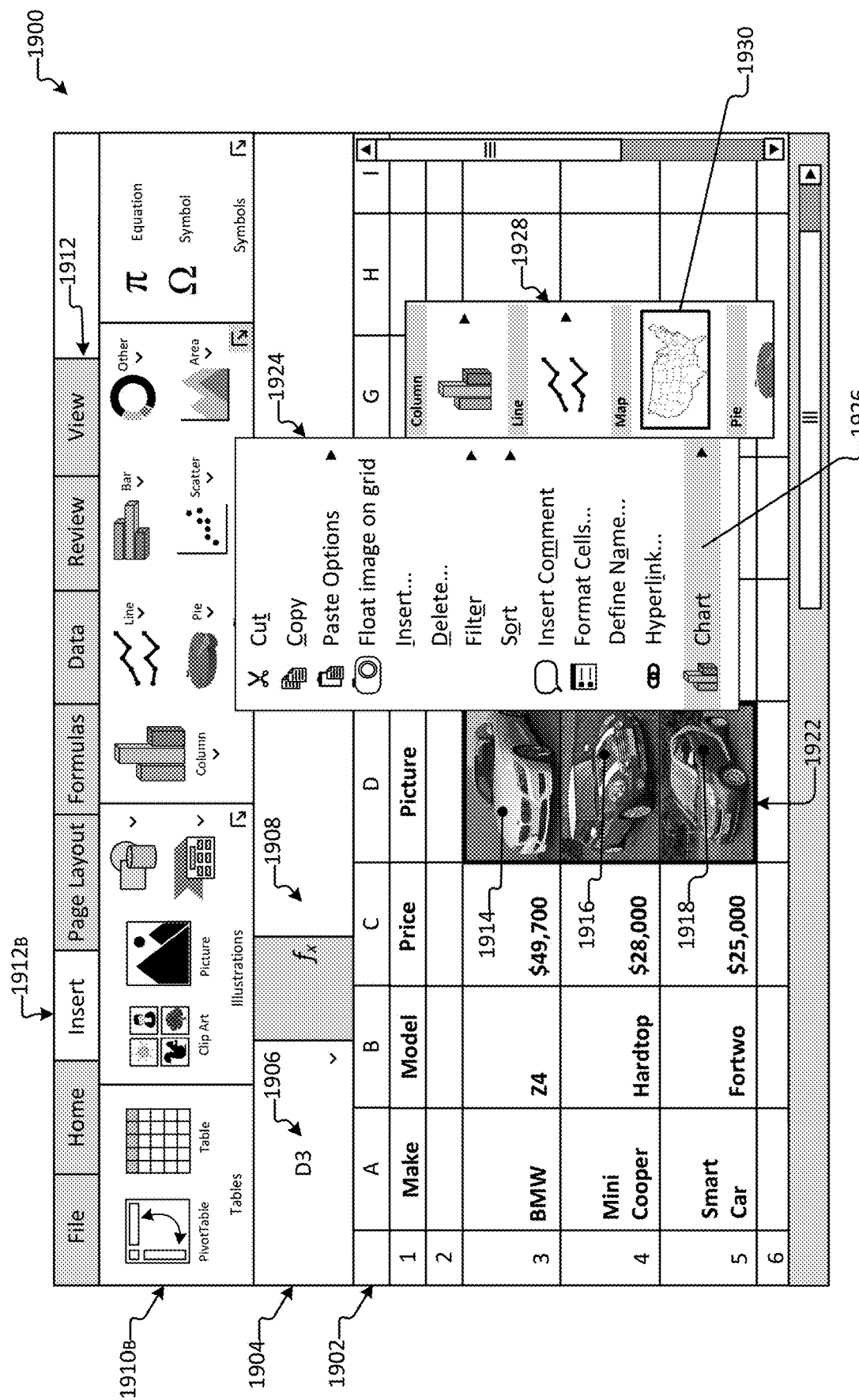
FIG. 19B illustrates a popup interface for selecting a charting function for images in a spreadsheet, according to an example embodiment.

FIG. 19B illustrates a popup interface for selecting a charting function for images in a spreadsheet, according to an example embodiment.

Similar to FIG. 19A, FIG. 19B shows interface 1900 of a spreadsheet application including spreadsheet 1902 and navigation ribbon 1904, which includes cell identifier 1906 and formula bar 1908. In this case, a range of cells 1922 (e.g., D3:D5) is identified as selected (e.g., by outlining) and the cell at the top of the range (i.e., cell D3) is identified by cell identifier 1906 (e.g., "D3") in the navigation pane 1904. The range of cells 1922 may be selected by highlighting the range of cells, touching (or swiping) the range of cells, entering "=D3:D5" into the formula bar, etc. In some cases, in response to a selection of a range of cells, formula bar 1908 may be blank (shown).

As further illustrated, an insert tab, i.e., tab 1912B entitled "Insert," has been selected, as indicated by an unshaded tab. In response to selection of insert tab 1912B, insert toolbar 1910B is provided. Insert toolbar 1910B provides for selecting various charts, including bar charts, line graphs, pie charts, scatter plots, area graphs, etc., for insertion into spreadsheet 1902. In aspects, in response to selecting the range of cells 1922, a first popup menu 1924 (or other interface) may be provided with any number of options for manipulating data or objects associated with the selected range of cells 1922.

As illustrated, first popup menu 1924 provides options including "Cut," "Copy" and "Paste." In this case, data or objects may be cut from a cell, copied in a cell and/or pasted to a cell. Additionally, first popup menu 1924 provides an option to "Float an image on grid," an "Insert" option, and a "Delete" option. The "Insert" option may enable a user to associate data, images or other objects with the selected range of cells 1922. In contrast to the "Insert" option, the "Delete" option may enable a user to delete data, images or other objects from the selected range of cells 1922. In addition, first popup menu 1924 may provide "Filter" and "Sort" options, an "Insert Comment" option and a "Format Cells" option. A "Define Name" option may enable a globally unique name to be assigned to an image or other object. First popup menu 1924 may further provide a "Hyperlink"

option for inserting a hyperlink to a file, a webpage, third-party streaming service, data streaming device, or otherwise.

Additionally, a "Chart" option 1926 may be provided for selecting a charting function for application to the selected range of cells 1922. In response to selecting "Chart" option 1926, a second popup menu 1928 may be provided. The second popup menu 1928 may provide options for selecting different types of charts, such as bar charts, line graphs, map charts, pie charts, etc. As illustrated, map chart option 1930 is identified as selected (e.g., by outlining).

As should be appreciated, the various devices, components, etc., described with respect to FIG. 19B are not intended to limit the systems and methods to the particular components described. Accordingly, additional topology configurations may be used to practice the methods and systems herein and/or some components described may be excluded without departing from the methods and systems disclosed herein.

Figure 19C:
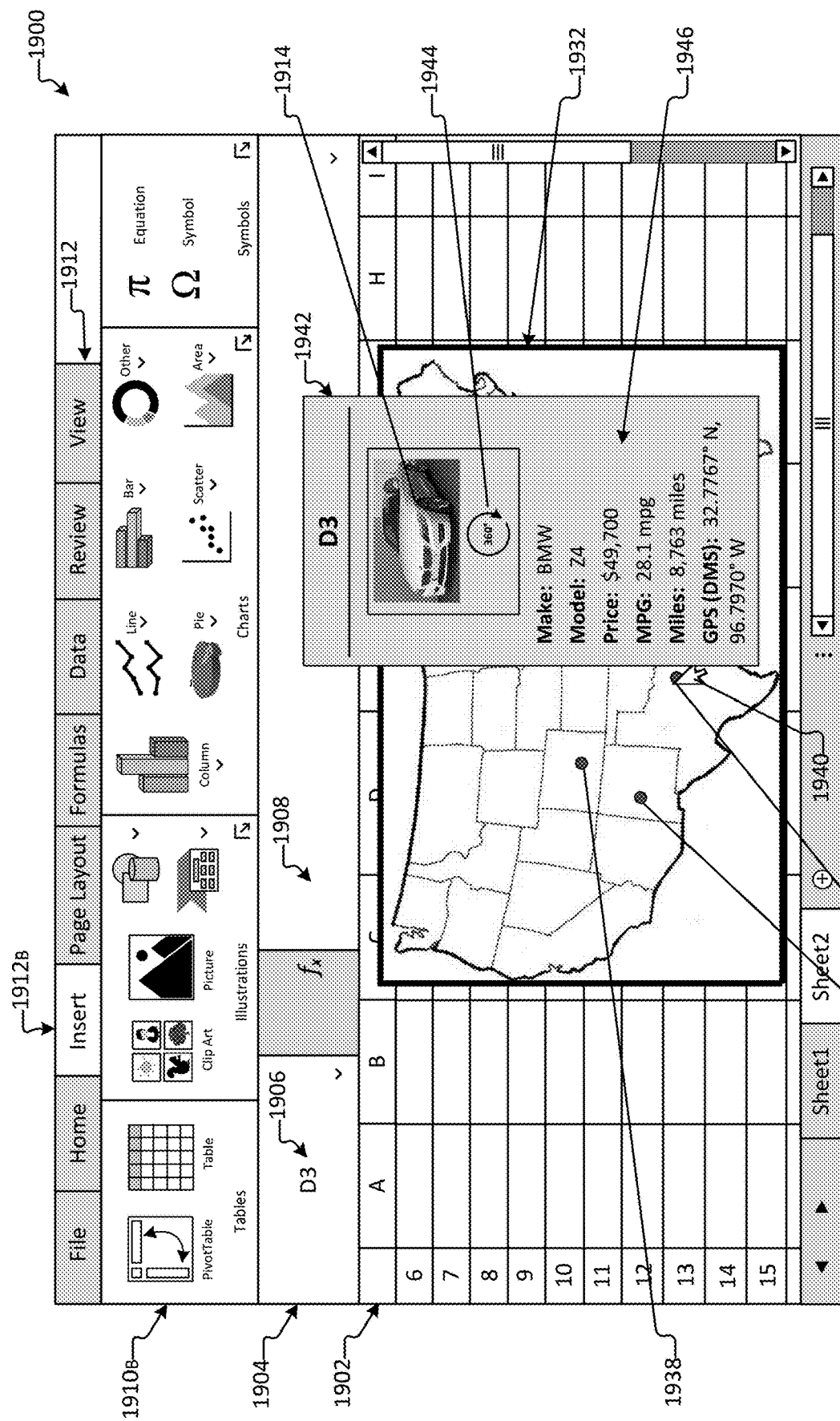
FIG. 19C illustrates a map chart with a card view of an image, according to an example embodiment.

FIG. 19C illustrates a map chart with a card view of an image, according to an example embodiment.

Similar to FIGS. 19A-19B, FIG. 19C shows interface 1900 of a spreadsheet application including spreadsheet 1902 and navigation ribbon 1904, which includes cell identifier 1906 and formula bar 1908. As further illustrated by FIG. 19C, chart 1932 has been created and inserted in spreadsheet 1902. In examples, chart 1932 may be inserted as an overlay (shown) on spreadsheet 1902 or may be launched in a separate window or interface (not shown).

Chart 1932 is a map chart graphing GPS locations for images. That is, although GPS locations for each of the images 1914-1918 were not represented within the selected range of cells 1922, this data was nonetheless charted. In this regard, a GPS location for each image (e.g., corresponding to where the image was taken) may be represented in a compound data type associated with the image, as illustrated for image 1914 in FIG. 19A. The spreadsheet application may extract and identify such data within the compound data type associated with each image (e.g., via a parameter retriever 116) and may chart the data (e.g., via a charting component 118). For example, a first image (e.g., image 1914) may be represented by a first GPS location 1934, a second image (e.g., image 1916) may be represented by a second GPS location 1936, and a third image (e.g., image 1918) may be represented by a third GPS location 1938 on the chart 1932.

Furthermore, a visual representation (e.g., active data point) at each GPS location may be selectable to view the corresponding image. For instance, in response to selection of a visual representation, a corresponding image (e.g., one of images 1914-1918) may be displayed as an overlay to chart 1932, within a separate window, or otherwise. In further examples, a "card view" of a corresponding image may be displayed in response to selection of a visual representation. As illustrated, a visual representation (e.g., active data point) for GPS location 1934 has been selected by hovering (as indicated by cursor icon 1940 shown near or over GPS location 1934). In response to selecting the visual representation, card 1942 is displayed as an overlay to chart 1932. Card 1942 may be provided in an organized and stylized layout, including a formatted header (e.g., "D3"), image 1914 displayed within an interactive insert (e.g., including a view control 1944 allowing for 360° views of the automobile), and additional data 1946 (e.g., including formatted data descriptors for each piece of information). In the illustrated aspect, card 1942 is entitled "D3," which corresponds to cell D3 within which image 1914 is located in the spreadsheet 1902. Alternatively, card 1942 may be entitled "Z4" (the model of the automobile depicted by image 1914) or "BMW" (the make of the automobile depicted by image 1914) or otherwise.

Additional data 1946 corresponds to at least a portion of the data contained within the compound data type associated with image 1914, as illustrated by record 1920. In particular, additional data 1946 provides information regarding the automobile depicted by image 1914, including the make, model, price, mpg, miles, and GPS location. As illustrated by FIG. 19A, some of this information is provided as values within the selected range of cells 1922, whereas other information is available within the record 1920 of the compound data type associated with image 1914. As detailed above, the spreadsheet may identify and chart data from either source. In some cases, card 1942 may provide information obtained within a link associated with an image. For instance, 360° views of the automobile depicted by image 1914 may be obtained by following the link to the image, e.g., http://www.BMWpics.com/Z4.png, or otherwise, and may be provided in card 1942. In this regard, card 1932 provides a user-friendly interface (e.g., organized and stylized) for viewing additional data associated with image 1914 in response to user selection. In further aspects, data and/or parameters associated with compound data types for other objects (e.g., audio files, videos, streaming data) within a spreadsheet may be similarly charted and such objects may be similarly incorporated into a chart such as chart 1932.

As should be appreciated, the various devices, components, etc., described with respect to FIG. 19C are not intended to limit the systems and methods to the particular components described. Accordingly, additional topology configurations may be used to practice the methods and systems herein and/or some components described may be excluded without departing from the methods and systems disclosed herein.

Figure 20A:
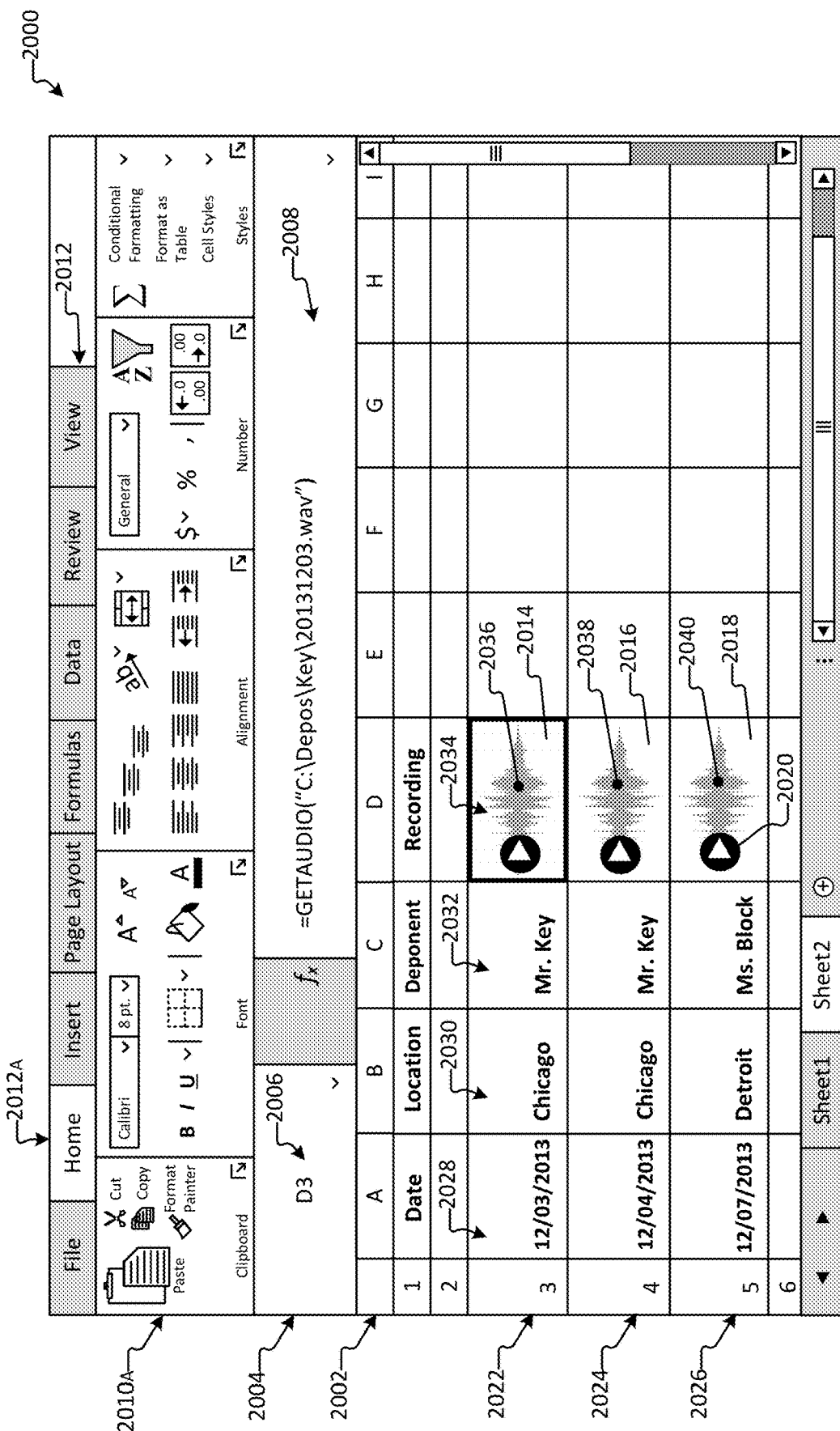
FIG. 20A illustrates an interface showing audio files associated with cells of a spreadsheet, according to an example embodiment.

FIG. 20A illustrates an interface showing audio files associated with cells of a spreadsheet, according to an example embodiment.

As illustrated, an interface 2000 of a spreadsheet application is provided. Interface 2000 includes a spreadsheet 2002, a navigation ribbon 2004 (including a cell identifier 2006 and a formula bar 2008), and a home toolbar 2010A. Interface 2000 further includes a plurality of tabs 2012 for accessing various aspects and operations of the spreadsheet application. As illustrated, a home tab, i.e., tab 2012A entitled "Home," is selected, which is indicated as an "unshaded" tab. As further illustrated, cell D3 is selected, as indicated by thickened and/or colored outlining of the cell border of cell D3. As shown, a cell identifier 2006 (e.g., "D3") for the selected cell is displayed in navigation ribbon 2004. Additionally, formula bar 2008 displays a function calling a file locator, e.g., fx=GETAUDIO("C:\Depos\Key\20131203.wav") for the audio file (i.e., audio file 2014) displayed within cell D3.

As further illustrated, a visual representation 2036 of audio file 2014 is displayed in cell D3. A visual representation of an audio file may be provided as any suitable identifier of an audio file, e.g., a waveform rendering (shown), a speaker icon, a play icon, a special icon with metadata, a file name, and the like. FIG. 20A also illustrates a play control 2020 displayed over visual representation 2040 of audio file 2018. In response to activating play control 2020, audio file 2018 may be played. Similarly, play controls are displayed over visual representations 2036 and 2038 for playing audio files 2014 and 2016, respectively. As further illustrated by FIG. 20A, additional data describing audio files 2014, 2016 and 2018 is stored in cells within adjacent rows and/or columns. For example, in column A (i.e., column 2028), cells A3, A4 and A5 contain data regarding the deposition "dates" of the depositions recorded in audio files 2014, 2016, and 2018, respectively. In column B (i.e., column 2030), cells B3, B4 and B5 contain data regarding the "location" of the depositions recorded in audio files 2014, 2016 and 2018, respectively. In column C (i.e., column 2032), cells C3, C4 and C5 contain data regarding the "deponent" in the depositions recorded in audio files 2014, 2016 and 2018, respectively.

As should be appreciated, the various devices, components, etc., described with respect to FIG. 20A are not intended to limit the systems and methods to the particular components described. Accordingly, additional topology configurations may be used to practice the methods and systems herein and/or some components described may be excluded without departing from the methods and systems disclosed herein.

Figure 20B:
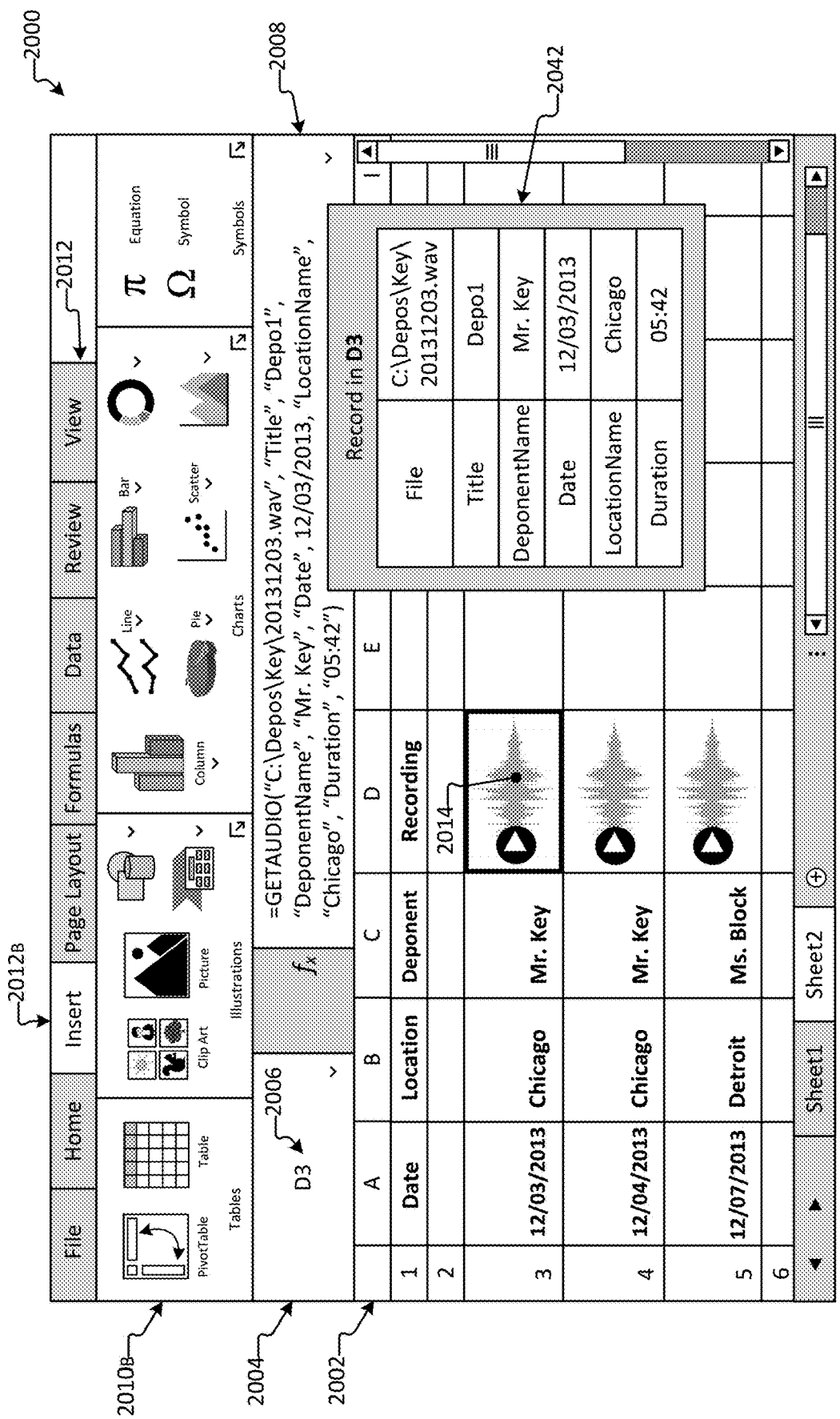
FIG. 20B illustrates an interface showing a selected audio file associated with a compound data type represented by a record, according to an example embodiment.

FIG. 20B illustrates an interface showing a selected audio file associated with a compound data type represented by a record, according to an example embodiment.

Similar to FIG. 20A, FIG. 20B shows interface 2000 of a spreadsheet application including spreadsheet 2002, navigation ribbon 2004 (which includes cell identifier 2006 and formula bar 2008), and an insert toolbar 2010B. Interface 2000 further includes a plurality of tabs 2012 for accessing various aspects and operations of the spreadsheet application. As illustrated, an insert tab, i.e., tab 2012B entitled "Insert," is selected, which is indicated as an unshaded tab. As further illustrated, cell D3 is selected, as indicated by thickened and/or colored outlining of the cell border of cell D3. A cell identifier 2006 (e.g., "D3") for the selected cell is displayed in navigation ribbon 2004.

As illustrated, a visual representation 2036 of audio file 2014 (which is a deposition recording) is displayed in cell D3. In some aspects, audio file 2014 may be associated with a compound data type. In this case, a formula bar 2008 may display a function describing the compound data type associated with audio file 2014 contained in cell D3. In other aspects (not shown), formula bar 2008 for cell D3 may display a function referencing a globally unique name for the compound data type associated with audio file 2014 contained in cell D3.

A function representing the compound data type may be identified using a variety of syntax. For instance, the function may surface whatever audio data, audio attributes or additional data are stored in the compound data type and may be represented as: =GETAUDIO("C:\Depos\Key\20131203.wav", "Title", "Depo1", "DeponentName", "Mr. Key", "Date", Dec. 3, 2013, "LocationName", "Chicago", "Duration", "05:42"). In this case, a first portion of the function may reference a file locator for audio file 2014, e.g., =GETAUDIO("C:\Depos\Key\20131203.wav"), and a second portion of the function may reference additional data, e.g., ("Title", "Depo1", "DeponentName", "Mr. Key", "Date", Dec. 3, 2013, "LocationName", "Chicago", "Duration", "05:42").

As further illustrated, a record 2042 may display fields and values of the compound data type contained in cell D3. In this case, where a user combines an audio file with an arbitrary set of values (e.g., a record), the function may be represented as: =GETAUDIO("C:\depos\key\2013203.wav", RECORD("Title", "Depo1", "Deponent-Name", "Mr. Key", "Date", Dec. 3, 2013, "LocationName", "Chicago", "Duration", "05:42")). In still other aspects, where an audio file (identified by a ".wav" file extension) is added to a compound data type constructed by a user, the audio file would amount to a value within the compound data type (e.g., a record) and the function may be represented as: =RECORD("Audio", "C:\depos\key\2013203.wav", "Title", "Depo1", "DeponentName", "Mr. Key", "Date", Dec. 3, 2013, "LocationName", "Chicago", "Duration", "05:42"). In still other aspects, a user may create a compound data type and give the compound data type a name (e.g., "Deposition"). The next time the compound data type is used, each attribute name is already known as a field in the "Deposition" compound data type and only the values need to be called out in the function, which may be represented as: =DEPOSITION("C:\depos\key\2013203.wav", "Depo1", "Mr. Key", Dec. 3, 2013, "LocationName", "Chicago", "Duration", "05:42"). Further, the function may simply reference attributes of the audio file and read the values from metadata, e.g., =RECORD("Audio", "C:\depos\key\2013203.wav", "Title", Audio.Title "DeponentName", "Mr. Key", "Date", Audio.CreatedDate, "LocationName", Audio.CreatedPlace, "Duration", Audio.Time). In this case, a user may provide custom fields within the compound data type (e.g., record) and, by dereferencing the 'audio' field, values may be read from metadata and populated in the user's defined fields in the record.

As should be appreciated, the various devices, components, etc., described with respect to FIG. 20B are not intended to limit the systems and methods to the particular components described. Accordingly, additional topology configurations may be used to practice the methods and systems herein and/or some components described may be excluded without departing from the methods and systems disclosed herein.

Figure 20C:
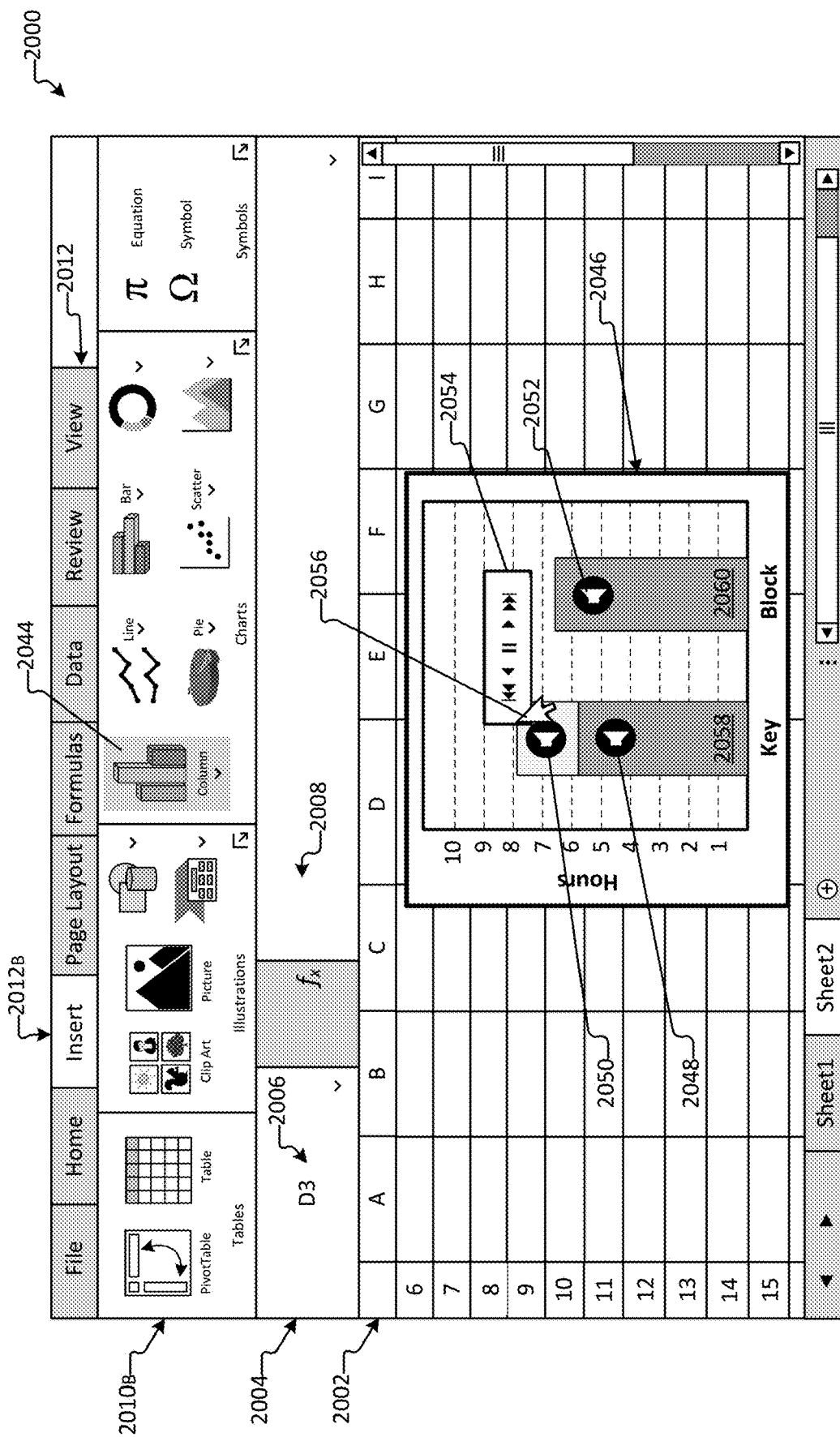
FIG. 20C illustrates a bar chart incorporating a plurality of audio files within a single bar, according to an example embodiment.

FIG. 20C illustrates a bar chart incorporating a plurality of audio files within a single bar, according to an example embodiment.

Similar to FIGS. 20A-20B, FIG. 20C shows interface 2000 of a spreadsheet application including spreadsheet 2002, navigation ribbon 2004 (which includes cell identifier 2006 and formula bar 2008), and insert toolbar 2010B. As illustrated, insert tab 2012B is selected, which is identified as an unshaded tab. In response to selection of insert tab 2012B, insert toolbar 2010B is displayed and provides for selecting various charts, including bar charts, line graphs, pie charts, scatter plots, area graphs, etc., for insertion into spreadsheet 2002.

As further illustrated by FIG. 20C, bar chart icon 2044 has been selected (in particular, a column bar chart). In this regard, chart 2046 has been created and inserted in spreadsheet 2002. In examples, chart 2046 may be inserted as an overlay (shown) on spreadsheet 2002 or may be launched in a separate window or interface (not shown). Chart 2046 is a bar chart graphing total deposition time in hours for two deponents. In this case, a first bar 2058 represents total deposition time for a first deponent, Mr. Key, which includes two segments corresponding to two depositions as recorded on audio files 2014 and 2016. A second bar 2060 represents total deposition time for a second deponent, Ms. Block, corresponding to a deposition as recorded on audio file 2018.

As illustrated, a visual representation 2048 corresponding to audio file 2014 and a visual representation 2050 corresponding to audio file 2016 are incorporated into the first bar 2058. Additionally, a visual representation 2052 corresponding to audio file 2018 is incorporated into the second bar 2060. In this case, visual representations are in the form of speaker icons. As detailed above, a visual representation of an audio file may be provided as any suitable identifier of an audio file, e.g., a waveform rendering, a speaker icon, a play icon, a special icon with metadata, a file name, and the like.

Although values for the durations of each audio file are not represented within spreadsheet 2002, these values may be charted nonetheless. That is, as illustrated by FIG. 20B, each audio file may be associated with a compound data type storing audio data, audio attributes and/or addition data. As further illustrated by FIG. 20B, audio file 2014 is associated with a compound data type including a duration of 5 hours and 42 minutes (i.e., 05:42) for the recording of the deposition. While not illustrated by FIG. 20B, audio files 2016 and 2018 may also be associated with compound data types, which may each include a value for a duration of the corresponding deposition recording.

As further illustrated, visual representation 2050 (e.g., speaker icon) corresponding to audio file 2016 has been selected by hovering (as indicated by cursor icon 2056 shown near or over visual representation 2050). In response to selecting the visual representation, play controls 2054 are displayed for accessing audio file 2015. In particular, play controls 2054 include controls for playing, skipping forward or back, pausing and rewinding audio file 2016. As should be appreciated, in addition to an audio file, the above description may be applied to other objects associated with a spreadsheet, e.g., an image, a video, streaming data, and the like.

As should be further appreciated, the various devices, components, etc., described with respect to FIG. 20C are not intended to limit the systems and methods to the particular components described. Accordingly, additional topology configurations may be used to practice the methods and systems herein and/or some components described may be excluded without departing from the methods and systems disclosed herein.

FIG. 21A illustrates an interface showing an audio file associated with a spreadsheet, the spreadsheet proving a charting menu specific to the audio file, according to an example embodiment.

As illustrated, an interface 2100 of a spreadsheet application is provided. Interface 2100 includes a spreadsheet 2102, a navigation ribbon 2104 (including a cell identifier 2106 and a formula bar 2108), and a home toolbar 2110A. Interface 2100 further includes a plurality of tabs 2112 for accessing various aspects and operations of the spreadsheet application. As illustrated, a home tab 2112A is selected, which is indicated as an unshaded tab. As further illustrated, cell D3 is selected, as indicated by thickened and/or colored outlining of the cell border of cell D3. A cell identifier 2106 (e.g., "D3") for the selected cell is displayed in navigation ribbon 2104. Additionally, formula bar 2108 displays a function calling a file locator, e.g., fx=GETAUDIO("C:\Depos\Key\20131203.wav") for audio file 2114 displayed within cell D3.

As further illustrated, a visual representation 2116 of audio file 2114 is displayed in cell D3. A visual representation of an audio file may be provided as any suitable identifier of an audio file, e.g., a waveform rendering (shown), a speaker icon, a play icon, a special icon with metadata, a file name, and the like. FIG. 21A also illustrates a play control 2118 displayed over visual representation 2116 of audio file 2114. In response to activating play control 2118, audio file 2114 may be played or otherwise accessed. Additionally, audio file 2124 is associated with cell D4 and audio file 2126 is associated with cell D5.

In aspects, audio file 2114 may be associated with a compound data type storing audio parameters (e.g., audio data, audio attributes and/or additional data), as described above. In additional or alternative aspects, audio file 2114 may be associated with metadata storing audio parameters. As illustrated, in response to selection of cell D3 containing audio file 2114, a formatting menu 2120 may be provided by spreadsheet 2102. The formatting menu 2120 may be customized for audio file 2114 based on audio parameters (e.g., audio data, audio attributes and/or additional data) retrieved by the spreadsheet application for audio file 2114, e.g., from an associated compound data type and/or metadata. Formatting menu 2120 may include a number of tabs for viewing and manipulating various audio parameters. For instance, formatting menu 2120 may include a color tab, a cell tab, a sizing tab, an audio tab, and a charting tab 2122, and the like. For instance, the audio tab may provide audio data and/or audio attributes for viewing and manipulation of the audio file, such as volume, pitch, speed, bitrate type, bitrate, channel type, channel, and the like (not shown). As illustrated, charting tab 2122 is provided for selecting one or more audio parameters for charting, including audio data and/or audio attributes retrieved from a compound data type and/or metadata associated with the audio file 2114.

Charting tab 2122 provides, for example, options for selection and charting audio parameters such as "volume," "pitch," "speed," "bitrate type," "bitrate," "channel type," and/or "channel." Current values for audio file 2114 for each of the above parameters may also be provided. Charting tab 2122 may also provide for selecting a cell, range of cells and/or all audio files within a workbook (which may include one or more spreadsheets) for charting against the selected audio parameters. As illustrated, a selection for charting speed versus bitrate over a range of cells (i.e., D3:D5) has been made. In this way, charting one or more audio parameters of one or more audio files may be performed by a spreadsheet application. The above example is provided for purposes of explanation only and should not be understood to be limiting.

As should be appreciated, the various devices, components, etc., described with respect to FIG. 21A are not intended to limit the systems and methods to the particular components described. Accordingly, additional topology configurations may be used to practice the methods and systems herein and/or some components described may be excluded without departing from the methods and systems disclosed herein.

Figure 21B:
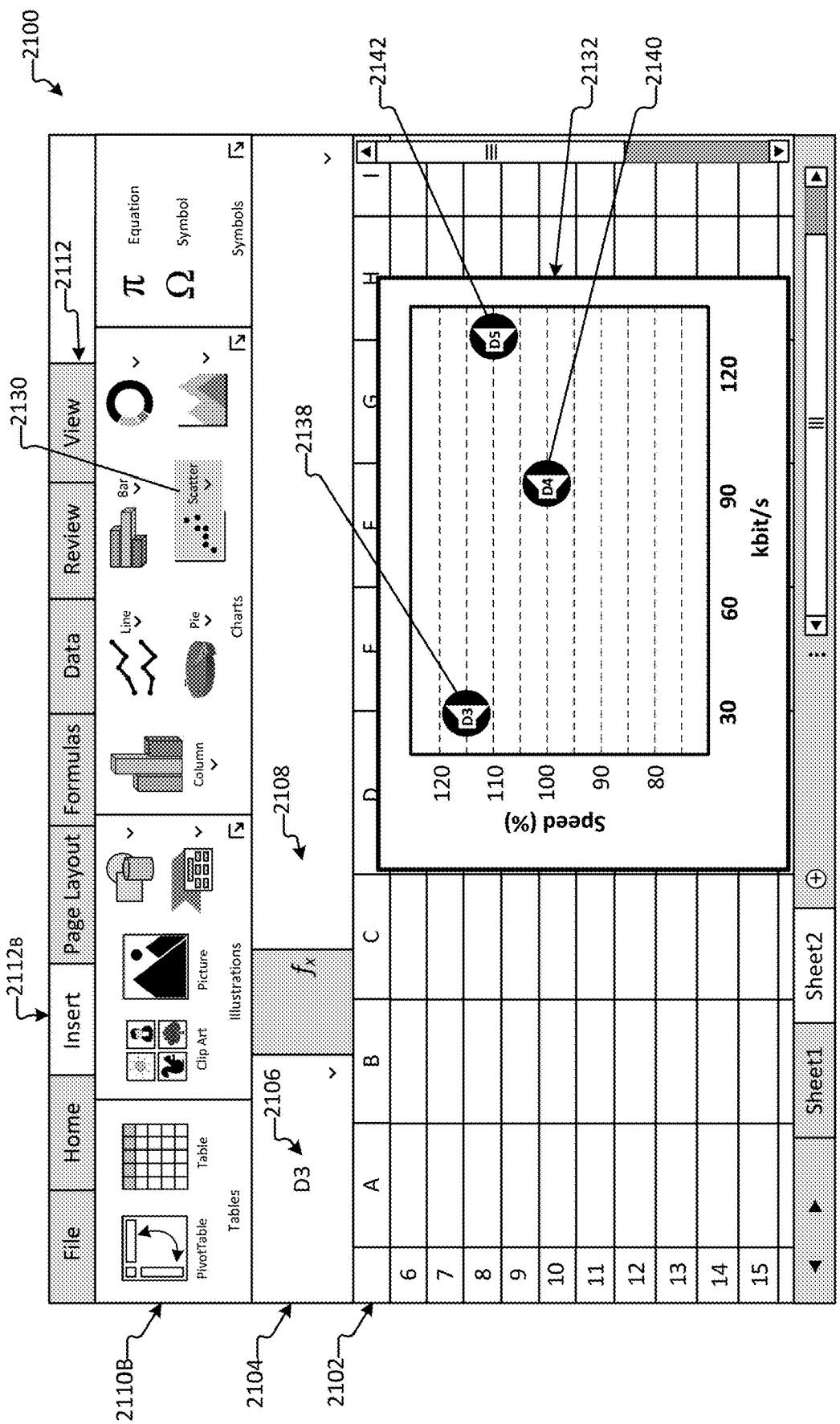
FIG. 21B illustrates a scatter plot incorporating visual representations for a plurality of audio files as data points, according to an example embodiment.

FIG. 21B illustrates a scatter plot incorporating visual representations for a plurality of audio files as data points, according to an example embodiment.

Similar to FIG. 21A, FIG. 21B shows interface 2100 of a spreadsheet application including spreadsheet 2102 and navigation ribbon 2104 (which includes cell identifier 2106 and formula bar 2108). As illustrated, insert tab 2112B is selected, which is identified as an unshaded tab. In response to selection of insert tab 2112B, insert toolbar 2110B is displayed and provides for selecting various charts, including bar charts, line graphs, pie charts, scatter plots, area graphs, etc., for insertion into spreadsheet 2102.

As further illustrated by FIG. 21B, scatter plot icon 2130 has been selected. In this regard, chart 2132 has been created and inserted in spreadsheet 2102. In examples, chart 2132 may be inserted as an overlay (shown) on spreadsheet 2102 or may be launched in a separate window or interface (not shown). Chart 2132 is a scatter plot graphing speed (%) versus bitrate (kbit/s) for a range of cells D3:D5, which cells each include an audio file (see FIG. 21A). In this case, a first data point comprising a first visual representation 2138 (i.e., a speaker icon with a "D3" identifier) represents a speed of 115% and an encoding bitrate of 32 kbit/s for audio file

2114, as illustrated in FIG. 21A by charting tab 2120. Similarly, a second data point comprising a second visual representation 2140 (i.e., a speaker icon with a "D4" identifier) represents a speed of 100% and an encoding bitrate of 96 kbit/s for audio file 2126 (audio parameters not shown in FIG. 21A) and a third data point comprising a third visual representation 2142 (i.e., a speaker icon with a "D5" identifier) represents a speed of 110% and an encoding bitrate of 128 kbit/s for audio file 2128 (audio parameters not shown in FIG. 21A).

Although values for the speeds and encoding bitrates of each audio file are not represented within spreadsheet 2102, these values were charted nonetheless. That is, as illustrated by FIG. 21B, each audio file may be associated with metadata and/or a compound data type storing audio data, audio attributes and/or addition data. As further illustrated by FIG. 21A, a spreadsheet application may extract values for audio parameters from metadata and/or a compound data type for an audio file and provide such values in a formatting menu (e.g., formatting menu 2120) for viewing and/or manipulation. Furthermore, such values of audio parameters may be selected for charting via a charting tab 2122. The above example is provided for purposes of explanation only and should not be understood to be limiting.

As should be appreciated, the various devices, components, etc., described with respect to FIG. 21B are not intended to limit the systems and methods to the particular components described. Accordingly, additional topology configurations may be used to practice the methods and systems herein and/or some components described may be excluded without departing from the methods and systems disclosed herein.

Figure 21C:
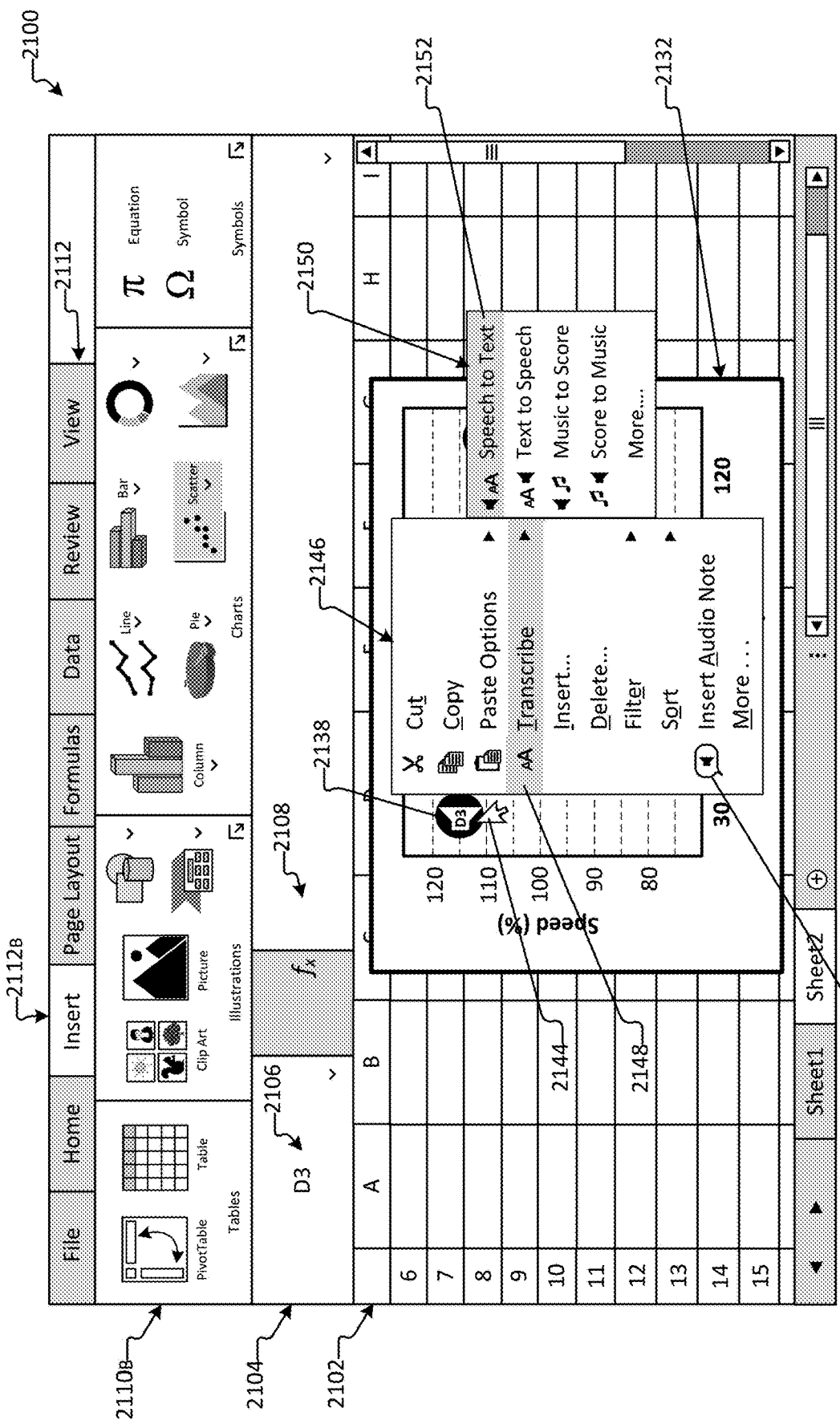
FIG. 21C illustrates a scatter plot with one or more popup menus for performing transcription, according to an example embodiment.

FIG. 21C illustrates a scatter plot with one or more popup menus for performing transcription, according to an example embodiment.

Similar to FIGS. 21A-21B, FIG. 21C shows interface 2100 of a spreadsheet application including spreadsheet 2102 and navigation ribbon 2104 (which includes cell identifier 2106 and formula bar 2108). As illustrated, insert tab 2112B is selected, which is identified as an unshaded tab. In response to selection of insert tab 2112B, insert toolbar 2110B is displayed and provides for selecting various charts, including bar charts, line graphs, pie charts, scatter plots, area graphs, etc., for insertion into spreadsheet 2102.

As further illustrated by FIG. 21C, chart 2132 has been created and inserted in spreadsheet 2102. Chart 2132 is a scatter plot graphing speed (%) versus bitrate (kbit/s) for a range of cells D3:D5, which cells each include an audio file (see FIG. 21A). As further illustrated, visual representation 2138 (e.g., a speaker icon with a "D3" identifier) corresponding to audio file 2114 has been selected by hovering (as indicated by cursor icon 2144 shown near or over visual representation 2138). In response to selecting the visual representation, a first popup menu 2146 (or other interface) may be provided with any number of options for manipulating audio file 2114. In other aspects, first popup menu 2146 may be provided in response to additional input (e.g., right click, etc.).

As illustrated, first popup menu 2146 provides options including "Cut," "Copy" and "Paste." Additionally, first popup menu 2146 provides transcribe option 2148, which is selected as evidenced by shading. In aspects, an audio file may be transcribed into alphanumeric or symbolic data and/or may be created from alphanumeric or symbolic data. In response to selection of transcribe option 2148, a second popup menu 2150 may be displayed. Second popup menu 2150 may provide a number of options for transcription, for example, "Speech to Text," "Text to Speech," "Music to Score," or "Score to Music," etc. As illustrated, the "Speech to Text" option 2152 has been selected (e.g., evidenced by shading).

For example, an audio file including speech may be converted into a text transcription (e.g., "Speech to Text"), which is a textual representation of each word or sound in the audio file. Conversely, a textual document may be converted into an audio file (e.g., "Text to Speech"), e.g., spoken words may be generated that correspond to the text of the document. In further aspects, an audio file of music may be transcribed into a musical score (e.g., "Music to Score"), including musical notes, bars, frames, and/or musical notations, representing the music of the audio file. Alternatively, a musical score may be converted by optical character recognition (OCR) into an audio file (e.g., "Score to Music") encoding data for producing sound waves representative of the musical score. Alternatively, a function may calculate a translation from musical score for piano to a musical score for saxophone (e.g., a scale and note translation may result in new values for each note in the music, where the 'result' is the new score).

In further aspects, e.g., for low vision users, data within a chart may be transcribed (e.g., "Text to Speech") and the data may be "played" for the user at any time. To further improve user experience, particularly for low vision users, the chart may be customized to associate sounds with colors, numbers, trends, or any other aspect of the chart. Similarly, by transcribing alphanumeric or other data into an audio file (e.g., "Text to Speech") and associating the audio file with the chart, a spreadsheet application becomes able to read its own data. As should be appreciated, transcription may include converting an audio file into alphanumeric or symbolic data and/or creating an audio file from alphanumeric or symbolic data according to any suitable means. Additionally, among other options, first popup menu 2146 may include an "Insert Audio Note" option 2156 that may enable a user to create (e.g., record) and associate an audio note with a chart.

As should be appreciated, the various devices, components, etc., described with respect to FIG. 21C are not intended to limit the systems and methods to the particular components described. Accordingly, additional topology configurations may be used to practice the methods and systems herein and/or some components described may be excluded without departing from the methods and systems disclosed herein.

Figure 21D:
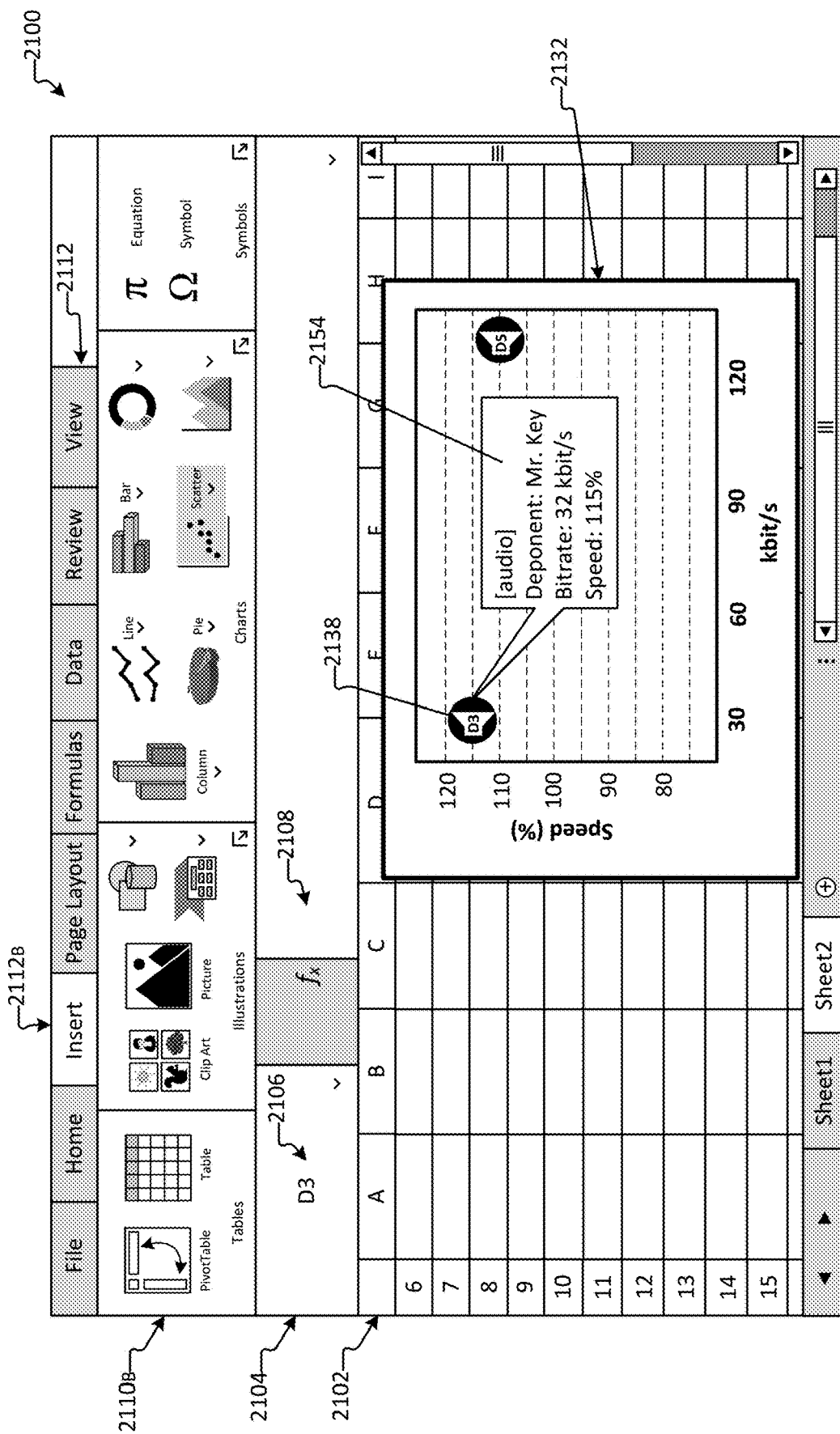
FIG. 21D illustrates a scatter plot showing an audio transcription associated with a data point, according to an example embodiment.

FIG. 21D illustrates a scatter plot showing an audio transcription associated with a data point, according to an example embodiment.

Similar to FIGS. 21A-21C, FIG. 21D shows interface 2100 of a spreadsheet application including spreadsheet 2102 and navigation ribbon 2104 (which includes cell identifier 2106 and formula bar 2108). As illustrated, insert tab 2112B is selected, which is identified as an unshaded tab and insert toolbar 2110B is displayed. As further illustrated by FIG. 21D, chart 2132 has been created and inserted in spreadsheet 2102. Chart 2132 is a scatter plot graphing speed (%) versus bitrate (kbit/s) for a range of cells D3:D5, which cells each include an audio file (see FIG. 21A).

As further illustrated, visual representation 2138 (e.g., a speaker icon with a "D3" identifier) corresponding to audio file 2114 is associated with a text transcription 2154 that specifies the encoding bitrate (e.g., 32 kbit/s) and speed (e.g., 115%) for audio file 2114, which records Mr. Key's deposition. In some cases, text transcription 2154 may be created and persistently displayed in chart 2132 in response to selection of the "Speech to Text" option 2152. In other cases, text transcription 2154 may be created and associated with visual representation 2138 in response to selection of the "Speech to Text" option 2152 but may be displayed in chart 2132 upon hovering over visual representation 2138. In this regard, different inputs may cause visual representation 2138 to perform different functionality. For example, visual representation 2138 may display text transcription 2154 in response to a cursor hover and may play audio file 2114 in response to a click input.

Similarly, in response to selection of "Insert Audio Note" option 2156, an audio note may be created (e.g., recorded) and associated with visual representation 2138 (not shown). As with text transcription 2154, the audio note may be played, or transcribed and displayed, upon selection (not shown). As should be appreciated, the above examples may be similarly applied to other objects associated with a spreadsheet (e.g., images, videos, streaming data, etc.) and should not be considered limiting.

As should be further appreciated, the various devices, components, etc., described with respect to FIG. 21D are not intended to limit the systems and methods to the particular components described. Accordingly, additional topology configurations may be used to practice the methods and systems herein and/or some components described may be excluded without departing from the methods and systems disclosed herein.

Figure 22A:
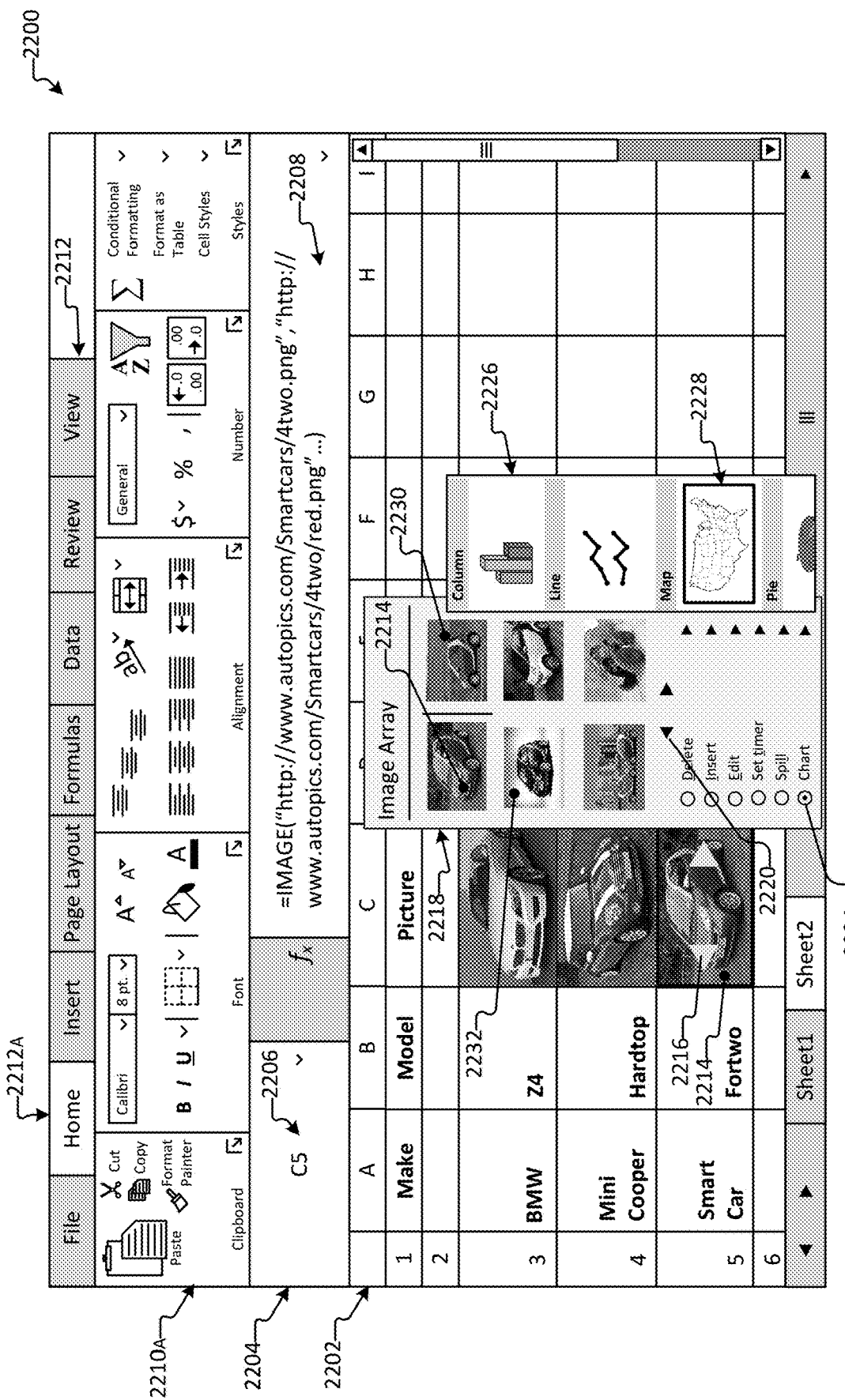
FIG. 22A illustrates an interface showing a UI element for viewing and interacting with a plurality of images associated with a cell in a spreadsheet, according to an example embodiment.

FIG. 22A illustrates an interface showing a UI element for viewing and interacting with a plurality of images associated with a cell in a spreadsheet, according to an example embodiment.

As illustrated, an interface 2200 of a spreadsheet application is provided. Interface 2200 includes a spreadsheet 2202, a navigation ribbon 2204 (including a cell identifier 2206 and a formula bar 2208), and a home toolbar 2210A. Interface 2200 further includes a plurality of tabs 2212 for accessing various aspects and operations of the spreadsheet application. As illustrated, a home tab 2212A is selected, which is indicated as an unshaded tab. As further illustrated, cell C5 is selected, as indicated by thickened and/or colored outlining of the cell border of cell C5. A cell identifier 2206 (e.g., "C5") for the selected cell is displayed in navigation ribbon 2204. Additionally, formula bar 2208 displays a function calling file locators for a plurality of images, e.g., =IMAGE("http://www.autopics.com/Smartcars/4two.png", "http://www.autopics.com/Smartcars/4two/red.png", etc.) associated with cell C5.

FIG. 22A illustrates a first image 2214 with scroll control 2216, which indicates that a plurality of images is associated with cell C5. In some aspects, the scroll control 2216 may enable a user to scroll backward (e.g., by activating the back arrow) or forward (e.g., by activating the forward arrow) one at a time through the plurality of images within the cell. Alternatively, the scroll control 2216 or another UI control may be activated to launch user interface 2218 for displaying and/or interacting with each of the plurality of images.

As illustrated, user interface 2218 displays each of the plurality of images associated with cell C5 in a grid configuration. In aspects, user interface 2218 may display the plurality of images in any suitable configuration, e.g., linear, carousel, etc. User interface 2218 may further provide options for performing operations on the plurality of images. For instance, a "Delete" option may be provided for removing one or more images from the array and an "Insert" option may be provided for adding one or more images to the array. Translation control 2220 enables a user to translate through the images to a position (identified by place marker 2222) for inserting a new image. User interface 2218 may further provide an "Edit" option for manipulating one or more images of the array and a "Set timer" option for cycling display of each image one at a time within cell C5. In still further aspects, a "Spill" option may be provided for spilling the array of images into separate cells.

In further aspects, a "Chart" option 2224 may be provided. In response to selecting "Chart" option 2224, a popup menu 2226 may be provided. The popup menu 2226 may provide options for selecting different types of charts, such as bar charts, line graphs, map charts, pie charts, etc. As illustrated, map chart option 2228 is identified as selected (e.g., by outlining). The above examples of options for viewing and interacting with a plurality of images are not intended to be exhaustive and should not be understood to be limiting.

As should be appreciated, the various devices, components, etc., described with respect to FIG. 22A are not intended to limit the systems and methods to the particular components described. Accordingly, additional topology configurations may be used to practice the methods and systems herein and/or some components described may be excluded without departing from the methods and systems disclosed herein.

Figure 22B:
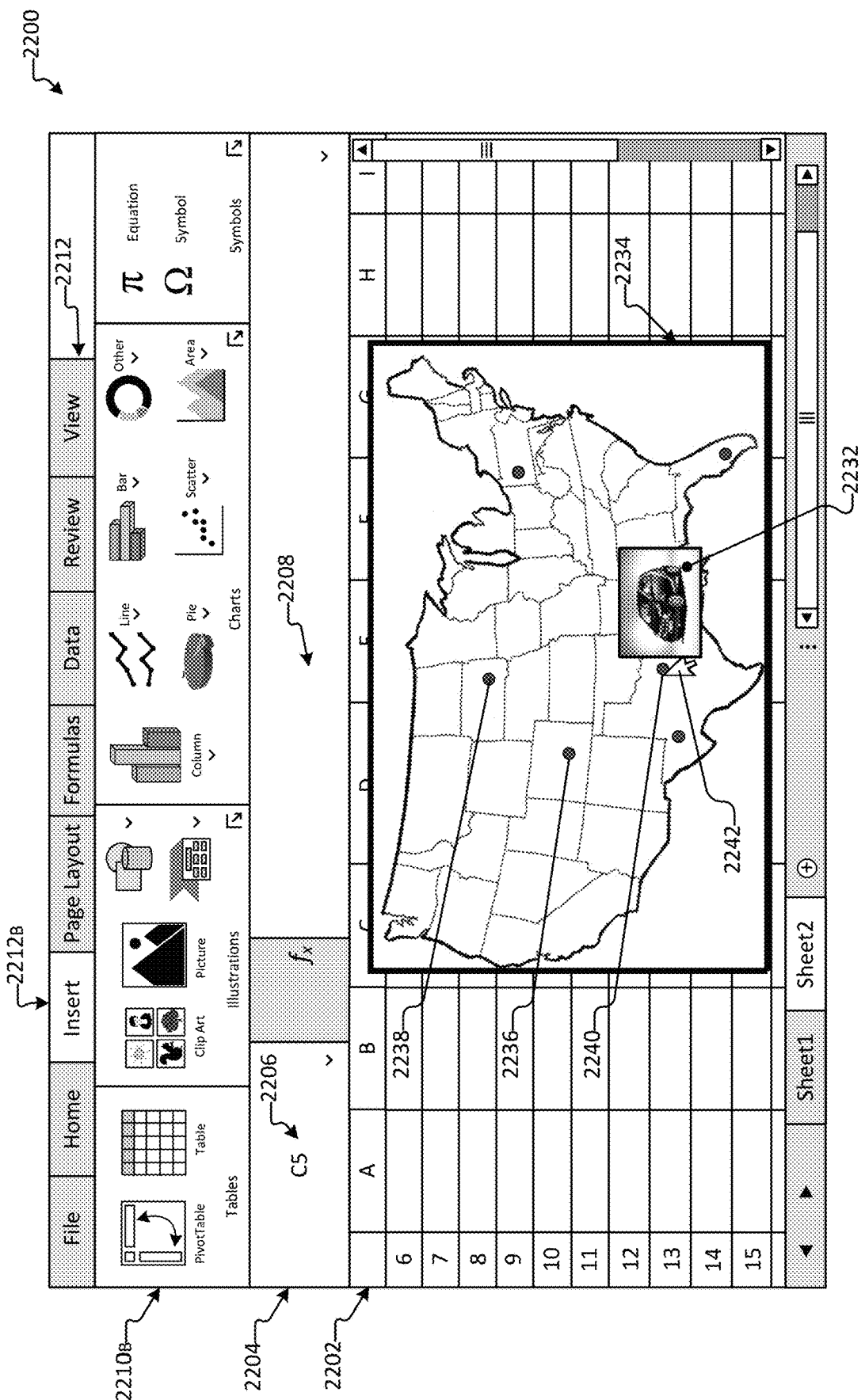
FIG. 22B illustrates a map chart with an incorporated image, according to an example embodiment.

FIG. 22B illustrates a map chart with an incorporated image, according to an example embodiment.

Similar to FIG. 22A, FIG. 22B shows interface 2200 of a spreadsheet application including spreadsheet 2202 and navigation ribbon 2204, which includes cell identifier 2206 and formula bar 2208. As further illustrated by FIG. 22B, chart 2234 has been created and inserted in spreadsheet 2202. In examples, chart 2234 may be inserted as an overlay (shown) on spreadsheet 2202 or may be launched in a separate window or interface (not shown).

Chart 2234 is a map chart graphing GPS locations for the plurality of images associated with cell C5 (see FIG. 22A). That is, although GPS locations for each of the plurality of images were not represented within the selected cell C5, this data was nonetheless charted. In this regard, a GPS location for each image (e.g., corresponding to where the image was taken) may be represented in a compound data type associated with cell C5 (not shown). In some aspects, the compound data type may include each image within the plurality of images displayed by user interface 2218. The compound data type may further include image parameters (e.g., image data, image attributes and/or additional data) for each of the plurality of images, including a GPS location corresponding to where each image was taken. In further aspects, the spreadsheet application may extract and identify such parameters within the compound data type associated with cell C5 (e.g., via a parameter retriever 116) and may chart the parameters (e.g., via a charting component 118). For example, first image 2214 may be represented by a first GPS location 2236, second image 2230 may be represented by a second GPS location 2238, and a third image 2232 may be represented by a third GPS location 2240 on the chart 2234.

Furthermore, a visual representation (e.g., active data point) at each GPS location may be selectable to view the corresponding image. For instance, in response to selection of a visual representation associated with GPS location 2240, a corresponding image (e.g., third image 2232) may be displayed as an overlay to chart 2234, within a separate window, or otherwise. As illustrated, the visual representation associated with GPS location 2240 has been selected by hovering (as indicated by cursor icon 2242 shown near or over GPS location 2240). In further aspects, one or more parameters associated with third image 2232 may be provided with the third image 2232 (e.g., GPS coordinates for GPS location 2240) (not shown).

As should be appreciated, the various devices, components, etc., described with respect to FIG. 22B are not intended to limit the systems and methods to the particular components described. Accordingly, additional topology configurations may be used to practice the methods and systems herein and/or some components described may be excluded without departing from the methods and systems disclosed herein.

Figure 22C:
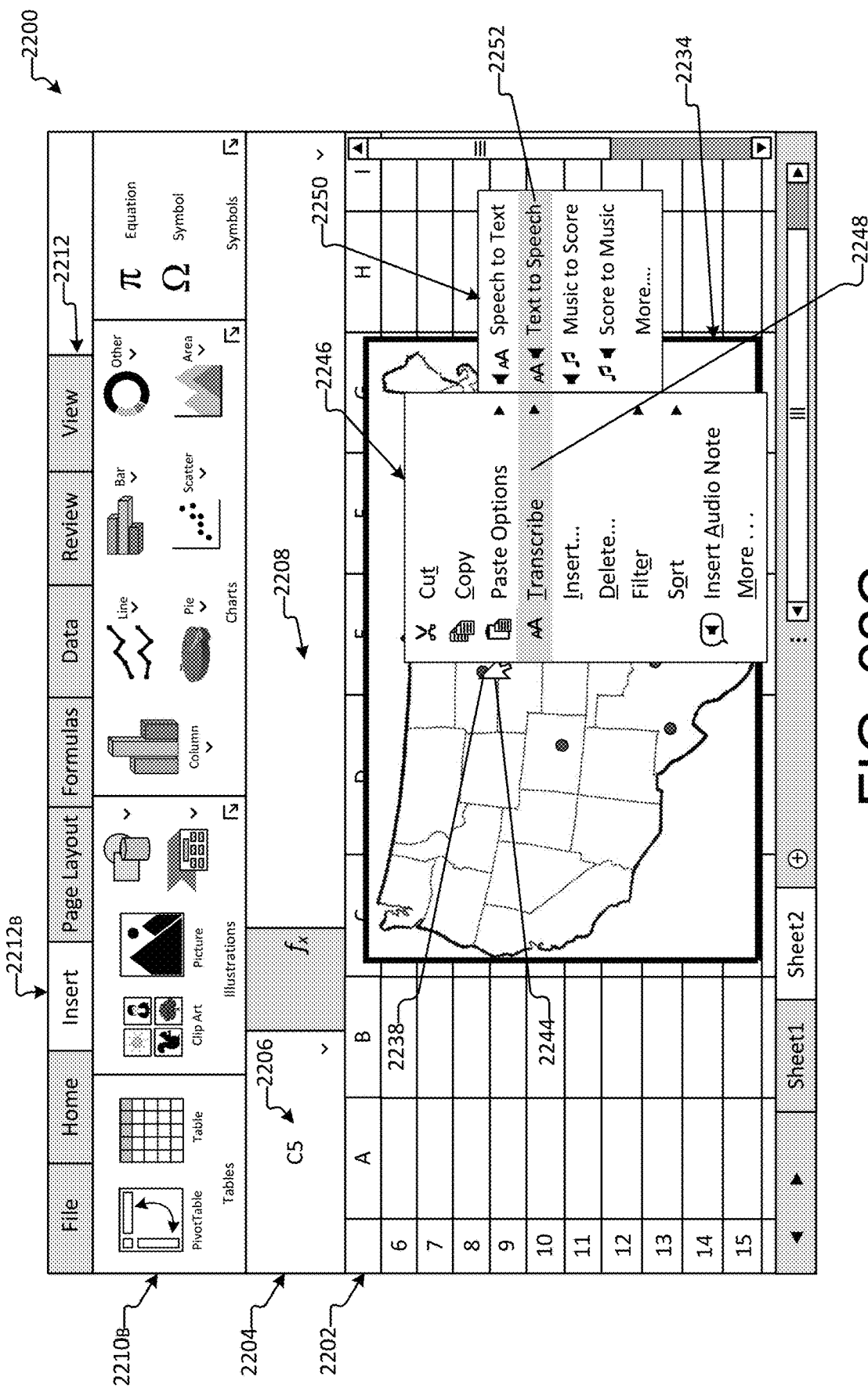
FIG. 22C illustrates a map chart with one or more popup menus for performing transcription, according to an example embodiment.

FIG. 22C illustrates a map chart with one or more popup menus for performing transcription, according to an example embodiment.

Similar to FIGS. 22A-22B, FIG. 22C shows interface 2200 of a spreadsheet application including spreadsheet 2202 and navigation ribbon 2204 (which includes cell identifier 2206 and formula bar 2208). As further illustrated by FIG. 22C, chart 2234 has been created and inserted in spreadsheet 2202. Chart 2234 is a map chart graphing GPS locations for the plurality of images associated with cell C5 (see FIG. 22A).

As further illustrated, a visual representation (e.g., an active data point) associated with second GPS location 2238 corresponding to second image 2230 has been selected by hovering (as indicated by cursor icon 2244 shown near or over second GPS location 2238). In response to selecting the visual representation, a first popup menu 2246 (or other interface) may be provided with any number of options for manipulating second image 2230. In other aspects, first popup menu 2246 may be provided in response to additional input (e.g., right click, etc.).

For example, first popup menu 2246 provides options including "Cut," "Copy" and "Paste." Additionally, first popup menu 2246 provides transcribe option 2248, which is selected as evidenced by shading. In aspects, chart may be transcribed into speech, e.g., for low-vision users. In response to selection of transcribe option 2248, a second popup menu 2250 may be displayed. Second popup menu 2250 may provide a number of options for transcription, for example, "Speech to Text," "Text to Speech," "Music to Score," or "Score to Music," etc. As illustrated, the "Text to Speech" option 2252 has been selected (e.g., evidenced by shading).

In this regard, a textual document such as a chart may be converted into an audio file (e.g., "Text to Speech"), e.g., spoken words may be generated that correspond to the alphanumeric text and data of the chart and may be "played" for the user at any time. With respect to the illustrated example, information regarding the second GPS location 2238 and/or the second image 2230 may be transcribed into speech and stored as an audio file. In this example, a visual indicator of the audio file may be associated with the chart at or near the second GPS location 2238. Alternatively, in response to selection of the "Text to Speech" option 2252, all or a substantial portion of the alphanumeric text and data within chart 2234 may be transcribed into speech. That is, information regarding each GPS location and/or each corresponding image, cities or states associated with the GPS locations, etc., may be transcribed into speech and stored as an audio file. To further improve user experience, the chart may be customized to associate sounds with colors, numbers, trends, or any other aspect of the chart. In this regard, a visual indicator of the audio file may be associated with the chart in any suitable location and/or the audio file may automatically play in response to opening chart 2234.

As should be appreciated, the various devices, components, etc., described with respect to FIG. 22C are not intended to limit the systems and methods to the particular components described. Accordingly, additional topology configurations may be used to practice the methods and systems herein and/or some components described may be excluded without departing from the methods and systems disclosed herein.

Figure 22D:
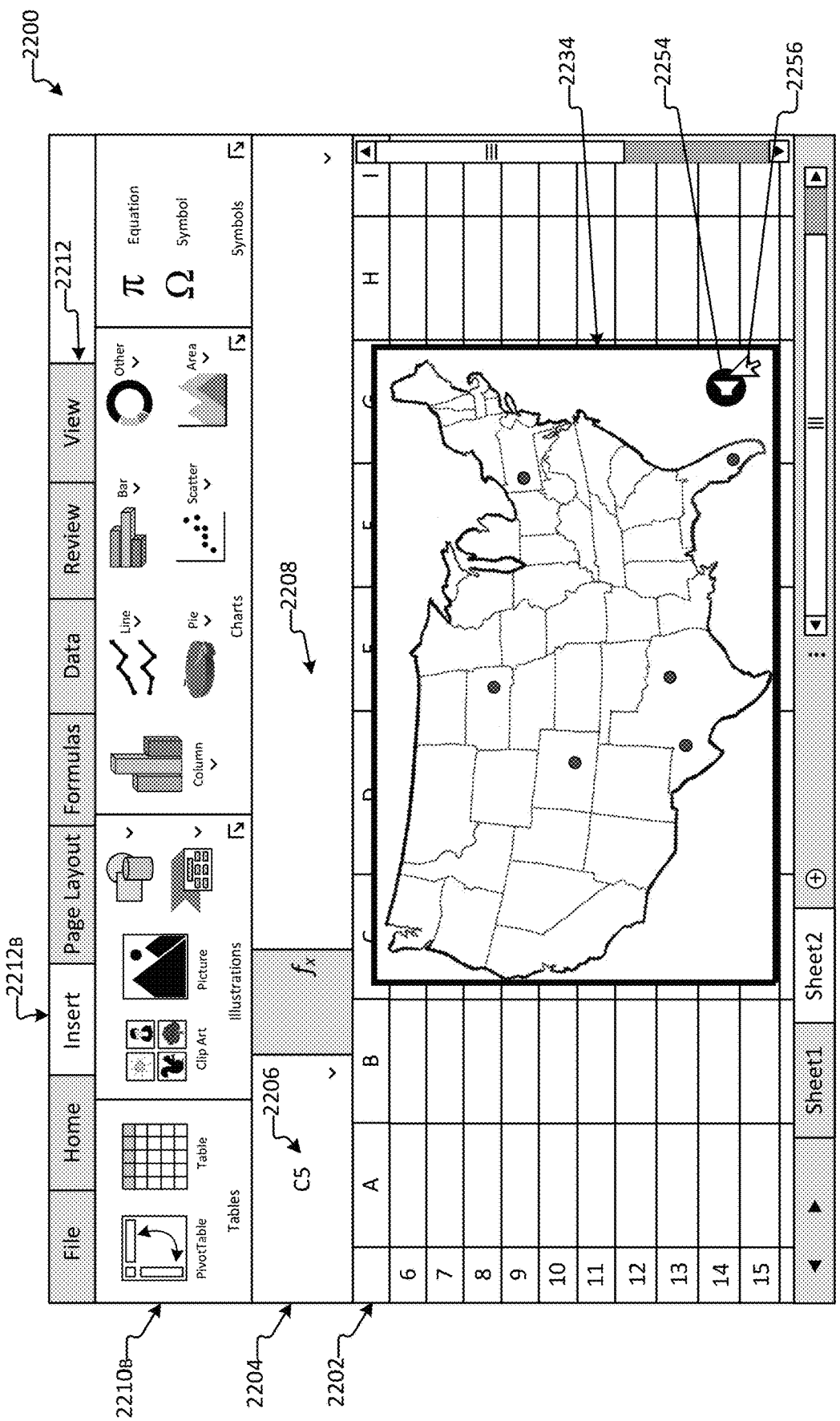
FIG. 22D illustrates a map chart including an audio transcription of the map chart, according to an example embodiment.

FIG. 22D illustrates a map chart including an audio transcription of the map chart, according to an example embodiment.

Similar to FIGS. 22A-22C, FIG. 22D shows interface 2200 of a spreadsheet application including spreadsheet 2202 and navigation ribbon 2204 (which includes cell identifier 2206 and formula bar 2208). As further illustrated by FIG. 22D, chart 2234 has been created and inserted in spreadsheet 2202. Chart 2234 is a map chart graphing GPS locations for the plurality of images associated with cell C5 (see FIG. 22A).

As further illustrated, a visual representation (e.g., a speaker icon) corresponding to an audio file 2254 has been created and inserted in chart 2234. In aspects, audio file 2254 is a transcription of the chart 2234 that was created by generating spoken words corresponding to alphanumeric text and data of chart 2234. As described above, particularly for low-vision users, a chart may be transcribed into speech so that the spreadsheet application can, in effect, read its own data to a reader, either automatically or upon selection of the visual representation. For instance, audio file 2254 may be set to play automatically for a low-vision user, either when the chart is created or opened. Alternatively, as illustrated, the visual representation of audio file 2254 may be selected by hovering (e.g., identified by cursor icon 2256 shown near or over the visual representation). In other aspects, the visual representation may be selected by right click, keyboard input, and the like. As should be appreciated, the above examples may be similarly applied to other objects associated with a spreadsheet (e.g., audio files, videos, streaming data, etc.) and should not be considered limiting.

As should be further appreciated, the various devices, components, etc., described with respect to FIG. 22D are not intended to limit the systems and methods to the particular components described. Accordingly, additional topology configurations may be used to practice the methods and systems herein and/or some components described may be excluded without departing from the methods and systems disclosed herein.

Figure 23A:
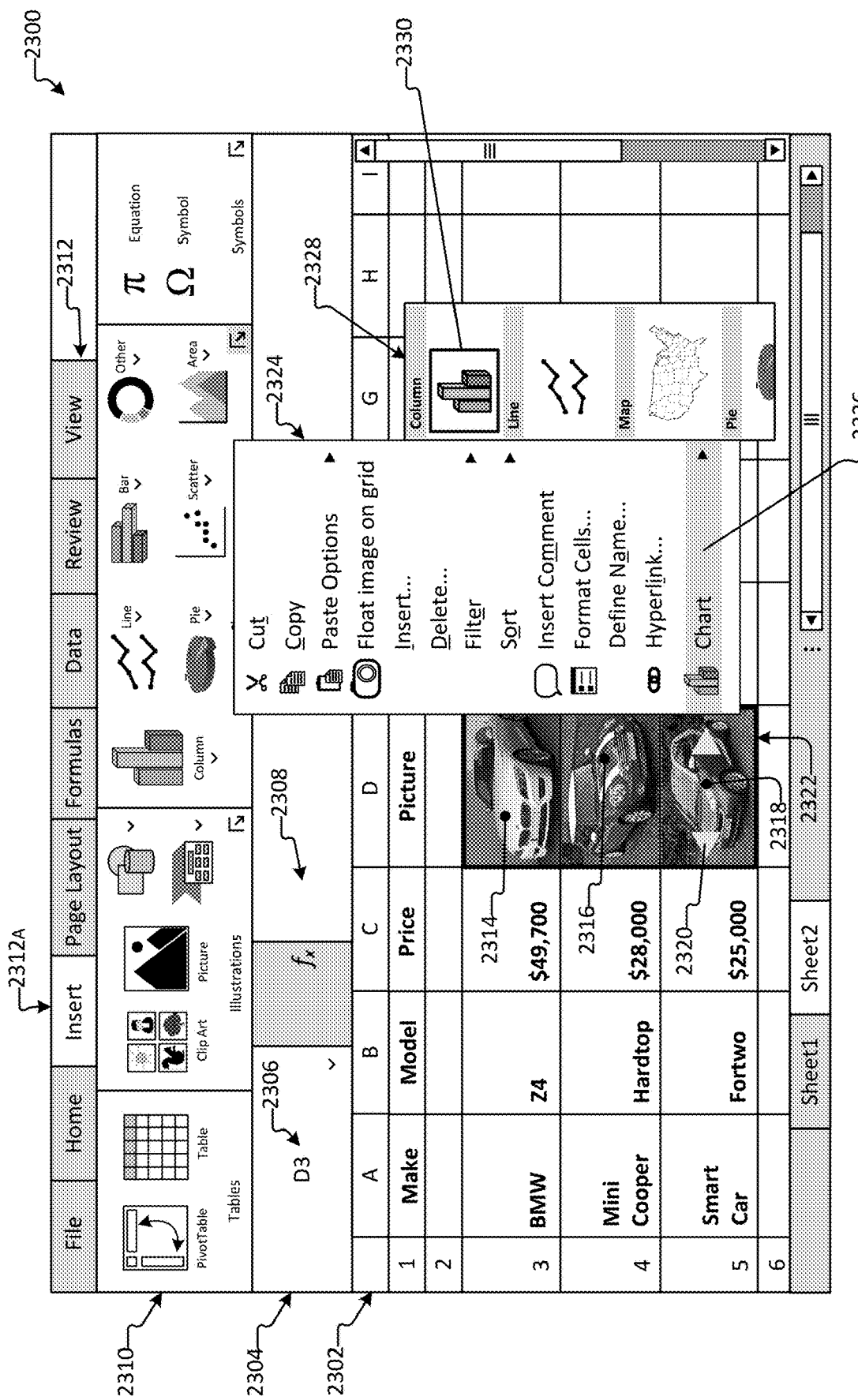
FIG. 23A illustrates a popup interface for selecting a charting function for images in a spreadsheet, according to an example embodiment.

FIG. 23A illustrates a popup interface for selecting a charting function for images in a spreadsheet, according to an example embodiment.

As illustrated, an interface 2300 of a spreadsheet application is provided. Interface 2300 includes a spreadsheet 2302, a navigation ribbon 2304 (including a cell identifier 2306 and a formula bar 2308), and an insert toolbar 2310. Interface 2300 further includes a plurality of tabs 2312 for accessing various aspects and operations of the spreadsheet application. As illustrated, an insert tab 2312A is selected, which is indicated as an unshaded tab. In this case, a range of cells 2322 (e.g., D3:D5) is identified as selected (e.g., by outlining) and the cell at the top of the range (i.e., cell D3) is identified by cell identifier 2306 (e.g., "D3") in the navigation pane 2304. The range of cells 2322 may be selected by highlighting the range of cells, touching (or swiping) the range of cells, entering "=D3:D5" into the formula bar, etc. In some cases, in response to a selection of a range of cells, formula bar 2308 may be blank (shown).

FIG. 23A illustrates an image 2318 with scroll control 2320, which indicates that a plurality of images is associated with cell C5. In some aspects, the scroll control 2320 may enable a user to scroll backward (e.g., by activating the back arrow) or forward (e.g., by activating the forward arrow) one at a time through the plurality of images within the cell. Alternatively, the scroll control 2320 or another UI control may be activated to launch a user interface for displaying and/or interacting with each of the plurality of images.

In aspects, in response to selecting the range of cells 2322, a first popup menu 2324 (or other interface) may be provided with any number of options for manipulating data or objects associated with the selected range of cells 2322. As illustrated, first popup menu 2324 provides options including "Cut," "Copy" and "Paste," "Float an image on grid," "Insert" and "Delete," "Filter" and "Sort," "Insert Comment," "Format Cells," "Define Name" and "Hyperlink," as described above with respect to FIG. 19B.

Additionally, a "Chart" option 2326 may be provided for selecting a charting function for application to the selected range of cells 2322. In response to selecting "Chart" option 2326, a second popup menu 2328 may be provided. The second popup menu 2328 may provide options for selecting different types of charts, such as bar charts, line graphs, map charts, pie charts, etc. As illustrated, bar chart option 2330 is identified as selected (e.g., by outlining).

As should be appreciated, the various devices, components, etc., described with respect to FIG. 23A are not intended to limit the systems and methods to the particular components described. Accordingly, additional topology configurations may be used to practice the methods and systems herein and/or some components described may be excluded without departing from the methods and systems disclosed herein.

Figure 23B:
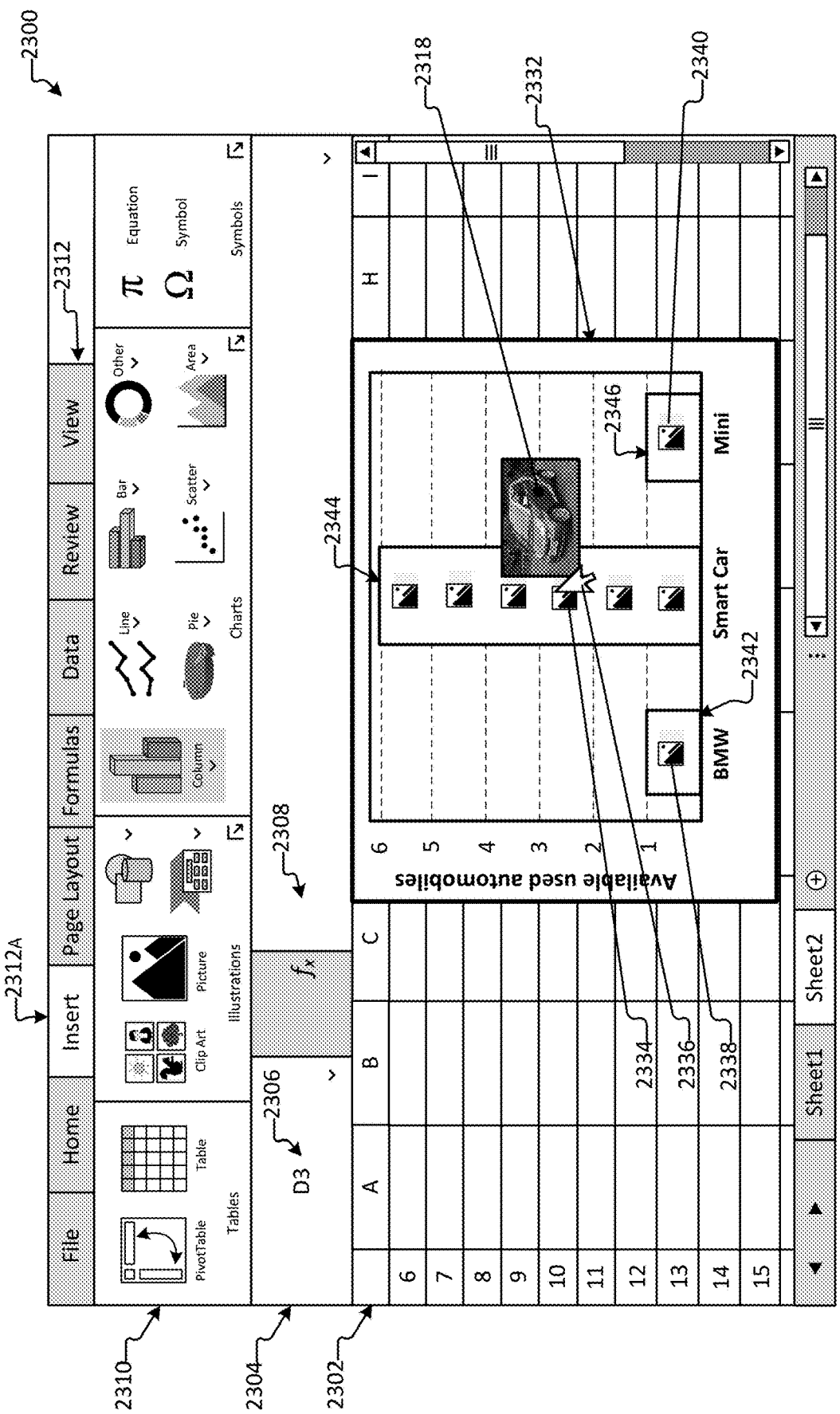
FIG. 23B illustrates a bar chart incorporating a plurality of images in a single bar, according to an example embodiment.

FIG. 23B illustrates a bar chart incorporating a plurality of images in a single bar, according to an example embodiment.

Similar to FIG. 23A, FIG. 23B shows interface 2300 of a spreadsheet application including spreadsheet 2302 and navigation ribbon 2304, which includes cell identifier 2306 and formula bar 2308. As further illustrated by FIG. 23B, chart 2332 has been created and inserted in spreadsheet 2302. In examples, chart 2332 may be inserted as an overlay (shown) on spreadsheet 2302 or may be launched in a separate window or interface (not shown).

Chart 2332 is a bar chart graphing a number of available used automobiles for different makes of automobiles associated with the selected range of cells 2322 (see FIG. 23A). Furthermore, an image of each available used automobile is incorporated into a bar corresponding to the make of automobile depicted by the image. As described above with respect to FIG. 23A, scroll control 2320 is displayed over image 2318, which indicates that a plurality of images is associated with cell D5. As illustrated, cell D5 is included in row 5 of the spreadsheet, which row includes data relating to "Smart Cars." In aspects, the plurality of images associated with cell D5 are images depicting different Smart Cars. As further illustrated, cell D3 includes a single image (e.g., image 2314) within row 3, which row includes data relating to "BMWs," and cell D4 includes a single image (e.g., image 2316) within row 4, which row includes data relating to "Mini Coopers."

Based on the above illustrated example, in response to charting the selected range of cells (i.e., D3:D5), image 2314 is incorporated into bar 2342 corresponding to BMWs, image 2316 is incorporated into bar 2346 corresponding to Mini Coopers, and the plurality of images associated with cell D5 are provided within a single bar (e.g., bar 2344) corresponding to Smart Cars. In particular, a visual representation for each image is provided within the corresponding bar. That is, in response to selection of visual representation 2338, image 2314 may be displayed; and in response to selection of visual representation 2340, image 2316 may be displayed. As further illustrated, bar 2344 includes a plurality of visual representations corresponding to the plurality of images associated with cell D5. For instance, in response to selection of visual representation 2334 (e.g., as indicated by cursor icon 2336 provided over or near visual representation 2334), image 2318 is displayed within chart 2332 as an overlay. Similarly, in response to selection of any of the plurality of visual representations incorporated into bar 2344, a corresponding image of the plurality of images may be displayed. As should be appreciated, the above examples may be similarly applied to other objects associated with a spreadsheet that may be provided in arrays of objects (e.g., audio files, videos, etc.) and should not be considered limiting.

As should be further appreciated, the various devices, components, etc., described with respect to FIG. 23B are not intended to limit the systems and methods to the particular components described. Accordingly, additional topology configurations may be used to practice the methods and systems herein and/or some components described may be excluded without departing from the methods and systems disclosed herein.

Figure 24A:
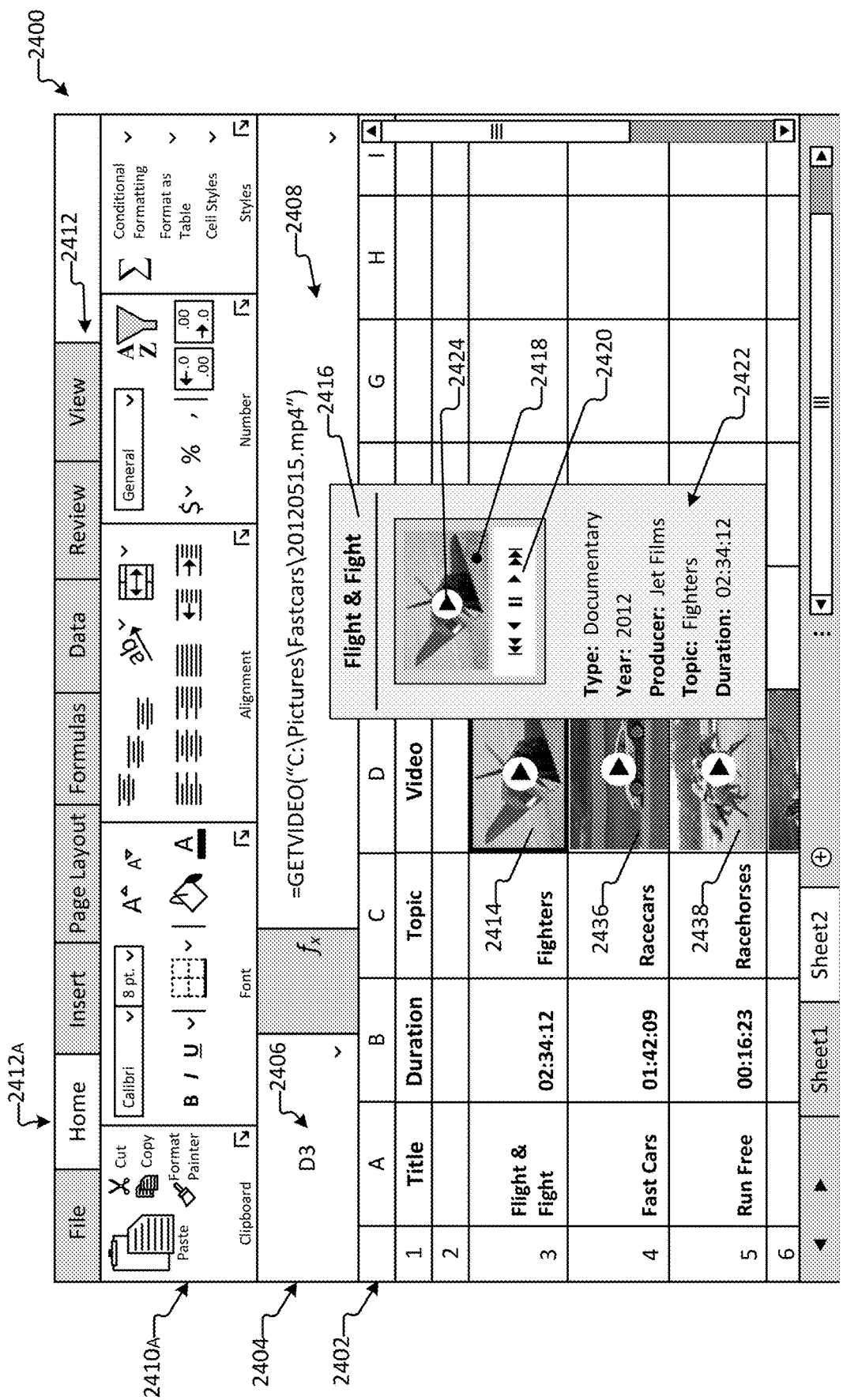
FIG. 24A illustrates an interface showing videos and additional data associated with one or more cells of a spreadsheet, according to an example embodiment

FIG. 24A illustrates an interface showing videos and additional data associated with one or more cells of a spreadsheet, according to an example embodiment.

As illustrated, an interface 2400 of a spreadsheet application is provided. Interface 2400 includes a spreadsheet 2402, a navigation ribbon 2404 (including a cell identifier 2406 and a formula bar 2408), and a home toolbar 2410A. Interface 2400 further includes a plurality of tabs 2412 for accessing various aspects and operations of the spreadsheet application. As illustrated, a home tab 2412A is selected, which is indicated as an unshaded tab. As further illustrated, cell D3 is selected, as indicated by thickened and/or colored outlining of the cell border of cell D3. As shown, a cell identifier 2406 (e.g., "D3") for the selected cell is displayed in navigation ribbon 2404. Additionally, formula bar 2408 displays a function calling a file locator, e.g., =GETVIDEO ("C:\Pictures\Flight&Fight\20120612.mp4") for video 2414 displayed within cell D3.

In some aspects, in response to selecting cell D3 and/or selecting video 2414 (e.g., by right click, cursor hover, keyboard input, etc.), a card view of image 2414 may be displayed. For instance, in response to a selection, card 2416 is displayed as an overlay on spreadsheet 2402. As illustrated, card 2416 displays a visual representation 2418 of video 2414, along with additional data 2422, in an organized and formatted layout. For instance, card 2416 includes a full title (e.g., "Flight & Fight") in a header portion. Visual representation 2418 of video 2414 includes a play control 2424 and an interactive play bar 2420, which provides controls for "fast rewind" (or "skip back"), "rewind," "pause," "play," and "fast forward" (or "skip forward"). Further, additional data 2422 includes formatted data descriptors (e.g., bolded) for each piece of information. In this regard, card 2416 provides a user-friendly interface (e.g., organized and stylized) for viewing additional data associated with video 2414, e.g., via a compound data type.

As should be appreciated, the various devices, components, etc., described with respect to FIG. 24A are not intended to limit the systems and methods to the particular components described. Accordingly, additional configurations may be used to practice the methods and systems herein and/or some components described may be excluded without departing from the methods and systems disclosed herein.

Figure 24B:
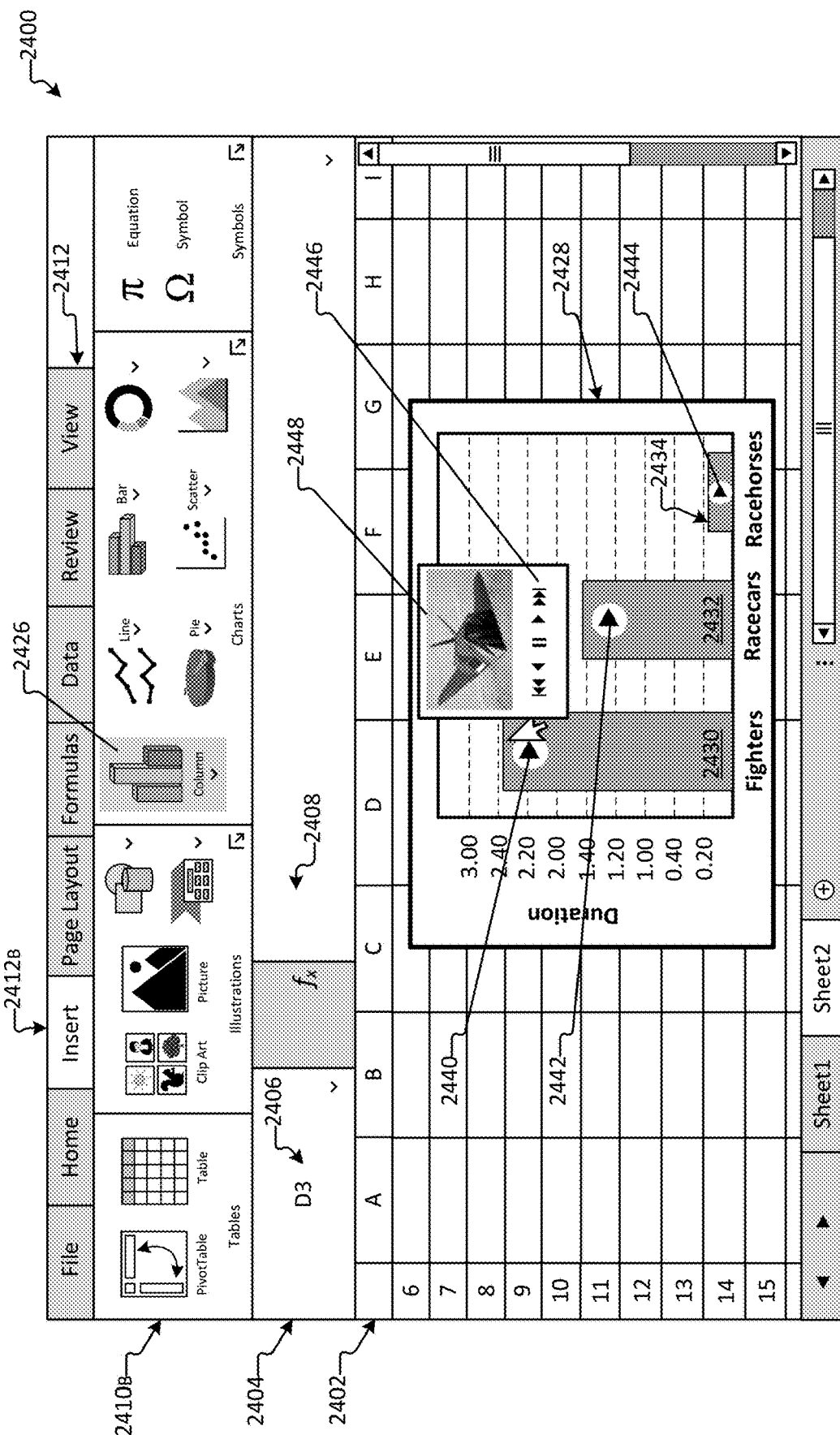
FIG. 24B illustrates a bar chart incorporating a video, according to an example embodiment.

FIG. 24B illustrates a bar chart incorporating a video, according to an example embodiment.

Similar to FIG. 24A, FIG. 24B shows interface 2400 of a spreadsheet application including spreadsheet 2402 and navigation ribbon 2404 (which includes cell identifier 2406 and formula bar 2408). As illustrated, insert tab 2412B is selected, which is identified as an unshaded tab. In response to selection of insert tab 2412B, insert toolbar 2410B is displayed and provides for selecting various charts, including bar charts, line graphs, pie charts, scatter plots, area graphs, etc., for insertion into spreadsheet 2402.

As further illustrated by FIG. 24B, bar chart icon 2426 has been selected (in particular, a column bar chart). In this regard, chart 2428 has been created and inserted in spreadsheet 2402. In examples, chart 2428 may be inserted as an overlay (shown) on spreadsheet 2402 or may be launched in a separate window or interface (not shown). Chart 2428 is a bar chart graphing duration in hours for each of three documentary videos. In this case, a first bar 2430 represents the duration for a first documentary video (e.g., first video 2414) entitled "Flight & Fight," a second bar 2432 represents the duration for a second documentary video (e.g., second video 2436) entitled "Fast Cars," and a third bar 2434 represents the duration for a third documentary video (e.g., third video 2438) entitled "Run Free."

As illustrated, a first visual representation 2440 corresponding to first video 2414 is incorporated into the first bar 2430, a second visual representation 2442 corresponding to second video 2436 is incorporated into the second bar 2432 and a third visual representation 2444 corresponding to third video 2438 is incorporated into the third bar 2434. In aspects, in response to selection of a visual representation, card 2416 may be displayed (not shown) or a miniaturized video card 2448 with play bar 2446 may be displayed (shown). As should be appreciated, any suitable interface for accessing a video may be provided in response to selection of a visual representation of the video within a chart. However, in some aspects, a miniaturized video card 2448 may not obscure chart data while still allowing access to the video. Moreover, the above examples may be similarly applied to other objects associated with a spreadsheet (e.g., images, audio files, streaming data, etc.) and should not be considered limiting.

As should be appreciated, the various devices, components, etc., described with respect to FIG. 24B are not intended to limit the systems and methods to the particular components described. Accordingly, additional topology configurations may be used to practice the methods and systems herein and/or some components described may be excluded without departing from the methods and systems disclosed herein.

Figure 25A:
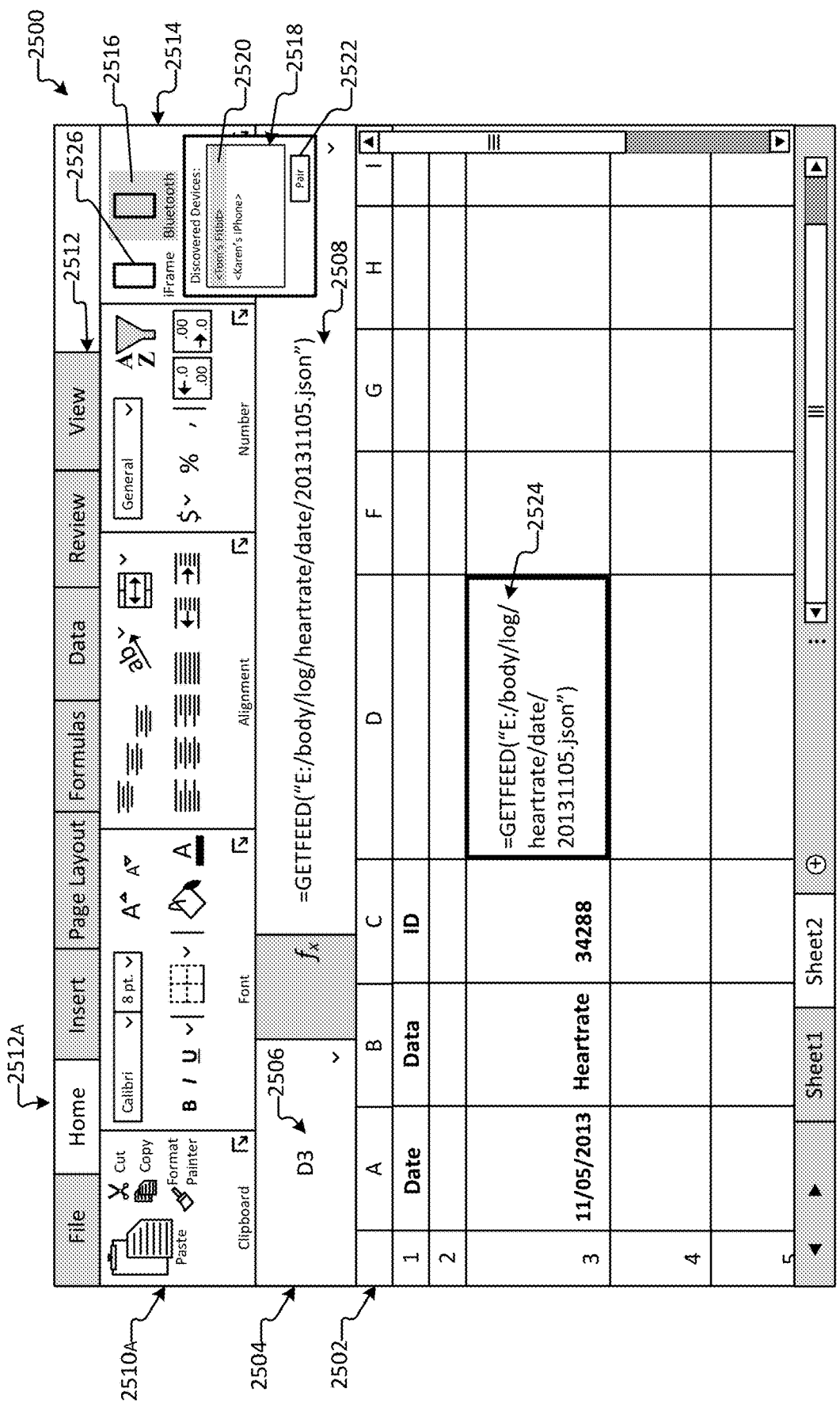
FIG. 25A illustrates an interface for associating streaming data within a cell, according to a first example embodiment.

FIG. 25A illustrates an interface for associating streaming data within a cell, according to a first example embodiment.

As illustrated, an interface 2500 of a spreadsheet application is provided. Interface 2500 includes a spreadsheet 2502 and a navigation ribbon 2504 (including a cell identifier 2506 and a formula bar 2508). Interface 2500 further includes a plurality of tabs 2512 for accessing various aspects and operations of the spreadsheet application. As illustrated, a home tab 2512A is selected, which is indicated as an unshaded tab, and a home toolbar 2510A is displayed. As further illustrated, cell D3 is selected, as indicated by thickened and/or colored outlining of the cell border of cell D3. As shown, a cell identifier 2506 (e.g., "D3") for the selected cell is displayed in navigation ribbon 2504. Additionally, formula bar 2508 displays a function calling streaming data to cell D3, e.g., =GETFEED("E:/body/log/heartrate/date/20131105.json").

In aspects, an interface 2514 may be provided in a toolbar (e.g., home toolbar 2510A) of the spreadsheet application and may enable association of streaming data with a selected cell 2524 (i.e., cell D3) or a range of cells. Interface 2514 may include a number of access points for associating different types of streaming data. For example, an iFrame interface 2526, a Bluetooth® interface 2516, etc., may be available from interface 2514. In some aspects, these interfaces may be provided in a mobile spreadsheet application and may enable association of streaming data with a selected cell or cells using a mobile device (not shown).

Bluetooth® interface 2516 may further display discovered devices in a window 2518. In the illustrated example, devices "Tom's Fitbit®" and "Karen's iPhone®" have been discovered and a selection of "Tom's Fitbit®" has been received, as indicated by shading. In aspects, in response to selecting a discovered device and activating "Pair" control 2522, the discovered device may be paired to the spreadsheet application. In further aspects, depending on the types of data that are available for streaming from the device, a get request for a specific type of data may be made. For instance, in the example of a wearable fitness device, the device may monitor and store heartrate data, blood pressure data, pedometer data, and the like. In this case, the spreadsheet may retrieve data directly from the device or may call an application program interface (API) associated with the device. In the illustrated example, "Tom's Fitbit®" is paired to the spreadsheet (e.g., via Bluetooth®) and streaming data for monitored heartrate values may be retrieved directly from the paired device using a get request such as: =GETFEED("E:/body/log/heartrate/date/20131105.json"). In particular, the get request specifies a date (e.g., Nov. 5, 2013) and a type of data (e.g., heartrate) for retrieval from the paired device. In at least some aspects, monitored data may be streamed from the device to the spreadsheet in near real time, e.g., as the monitored data is measured, stored and streamed by the device.

As should be appreciated, the various devices, components, etc., described with respect to FIG. 25A are not intended to limit the systems and methods to the particular components described. Accordingly, additional topology configurations may be used to practice the methods and systems herein and/or some components described may be excluded without departing from the methods and systems disclosed herein.

Figure 25B:
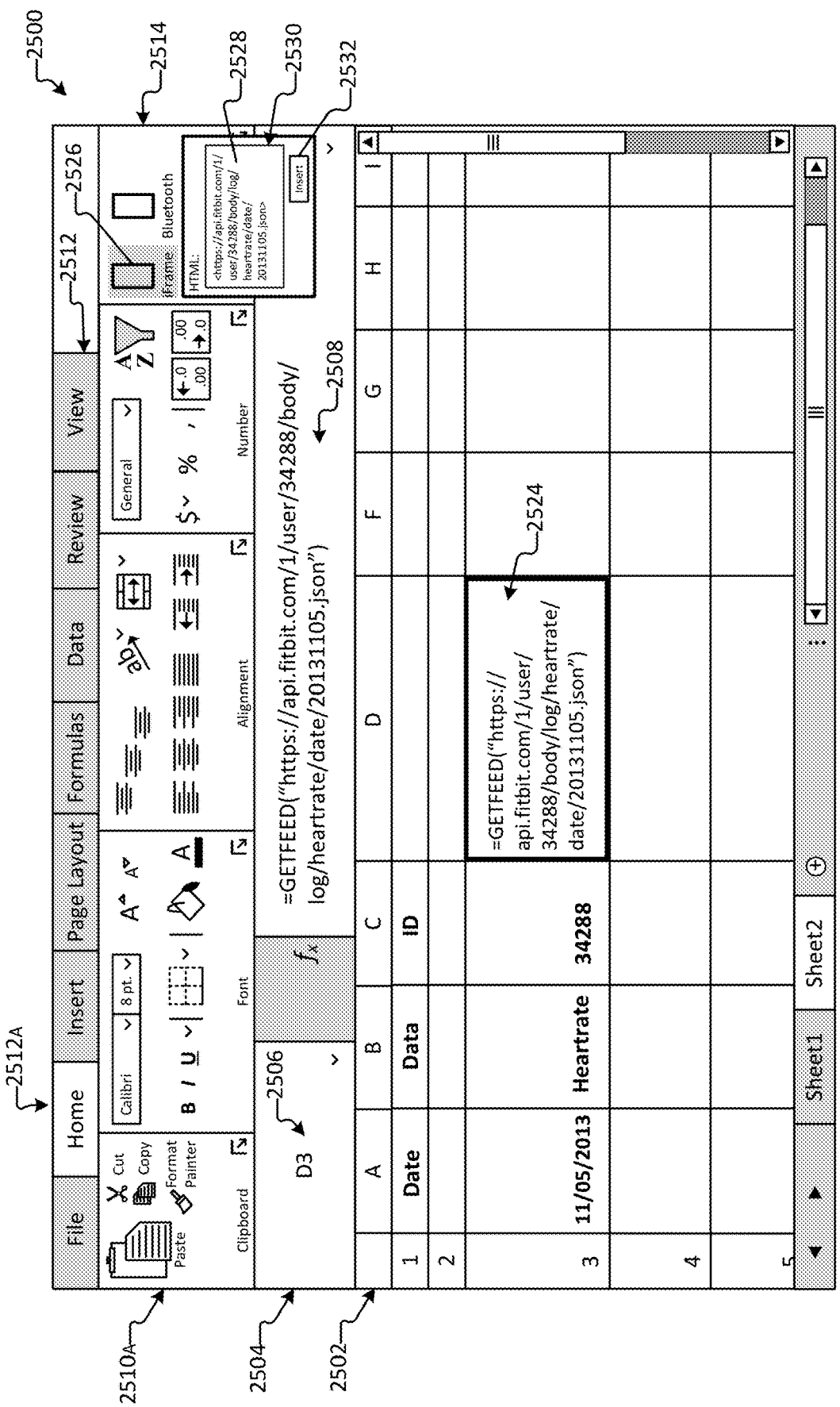
FIG. 25B illustrates an interface for associating streaming data within a cell, according to a second example embodiment.

FIG. 25B illustrates an interface for associating streaming data within a cell, according to a second example embodiment.

Similar to FIG. 25A, FIG. 25B shows interface 2500 of a spreadsheet application. Interface 2500 includes a spreadsheet 2502 and a navigation ribbon 2504 (including a cell identifier 2506 and a formula bar 2508). As illustrated, a home tab 2512A is selected, which is indicated as an unshaded tab, and a home toolbar 2510A is displayed. As further illustrated, cell D3 is selected, as indicated by thickened and/or colored outlining of the cell border of cell D3. In this case, formula bar 2508 displays a different function calling streaming data to cell D3, e.g., =GETFEED("https://api.fitbit.com/1/user/34288/body/log/heartrate/date/20131105.json").

As described above, interface 2514 may include an iFrame interface 2526, a Bluetooth® interface 2516, etc., for associating streaming data with a spreadsheet. In some aspects, these interfaces may be provided in a mobile spreadsheet application and may enable association of streaming data with a selected cell or cells using a mobile device (not shown). In the illustrated example, iFrame interface 2526 is selected, as indicated by shading, and provides an input field 2530 for referencing a URL for the streaming data. As illustrated, URL 2528 calls an API associated with a fitness device and has been entered into input field 2530, e.g., =GETFEED("https://api.fitbit.com/1/user/34288/body/log/heartrate/date/20131105.json"). In particular, URL 2528 specifies a user identifier (e.g., 34288), a date (e.g., Nov. 5, 2013) and a type of data (e.g., heartrate) for retrieval. As further illustrated, iFrame interface 2526 includes an "Insert" control 2532, for associating the streaming data retrieved by the URL 2528 into the selected cell 2524 (e.g., cell D3). In at least some aspects, monitored data may be streamed from the device to the spreadsheet in near real time, e.g., as the monitored data is measured, stored and streamed by the device. As should be appreciated, additional examples for associating streaming data with a cell are possible and the above examples are offered for purposes of explanation and should not be understood as limiting.

As should be further appreciated, the various devices, components, etc., described with respect to FIG. 25B are not intended to limit the systems and methods to the particular components described. Accordingly, additional topology configurations may be used to practice the methods and systems herein and/or some components described may be excluded without departing from the methods and systems disclosed herein.

Figure 25C:
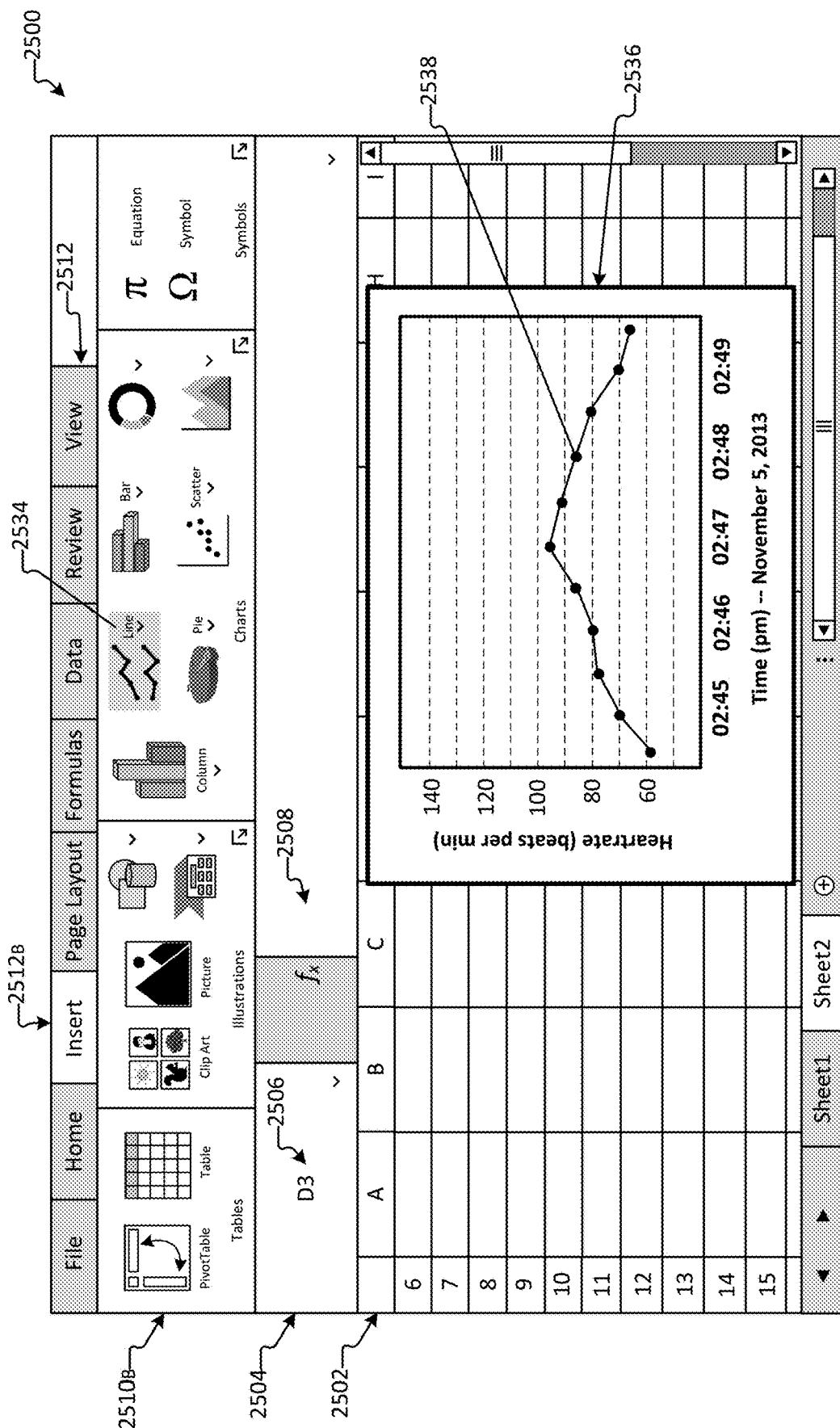
FIG. 25C illustrates a line graph of heartrate values streamed from a device, according to an example embodiment.

FIG. 25C illustrates a line graph of heartrate values streamed from a device, according to an example embodiment.

Similar to FIGS. 25A-25B, FIG. 25C shows interface 2500 of a spreadsheet application including spreadsheet 2502 and navigation ribbon 2504 (which includes cell identifier 2506 and formula bar 2508). As illustrated, insert tab 2512B is selected, which is identified as an unshaded tab. In response to selection of insert tab 2512B, insert toolbar 2510B is displayed and provides for selecting various charts, including bar charts, line graphs, pie charts, scatter plots, area graphs, etc., for insertion into spreadsheet 2502.

As further illustrated by FIG. 25C, line graph icon 2534 has been selected, as indicated by shading. In this regard, chart 2536 has been created and inserted in spreadsheet 2502. Chart 2536 is a line graph charting heartrate in beats per minute taken at various times on Nov. 5, 2013. In this case, each data point (e.g., data point 2538) represents a heartrate measurement taken at a particular time on Nov. 5, 2013. As should be appreciated, heartrate measurements may be streamed and charted in near real time by associating streaming data with a cell of a spreadsheet. In further aspects, the streamed data may be charted automatically in response to associating the streaming data with the spreadsheet. The above example is provided for purposes of explanation only and should not be understood to be limiting.

As should be appreciated, the various devices, components, etc., described with respect to FIG. 25C are not intended to limit the systems and methods to the particular components described. Accordingly, additional topology configurations may be used to practice the methods and systems herein and/or some components described may be excluded without departing from the methods and systems disclosed herein.

FIGS. 26-29 and the associated descriptions provide a discussion of a variety of operating environments in which aspects of the disclosure may be practiced. However, the devices and systems illustrated and discussed with respect to FIGS. 26-29 are for purposes of example and illustration and are not limiting of a vast number of computing device configurations that may be utilized for practicing aspects of the disclosure, as described herein.

Figure 26:
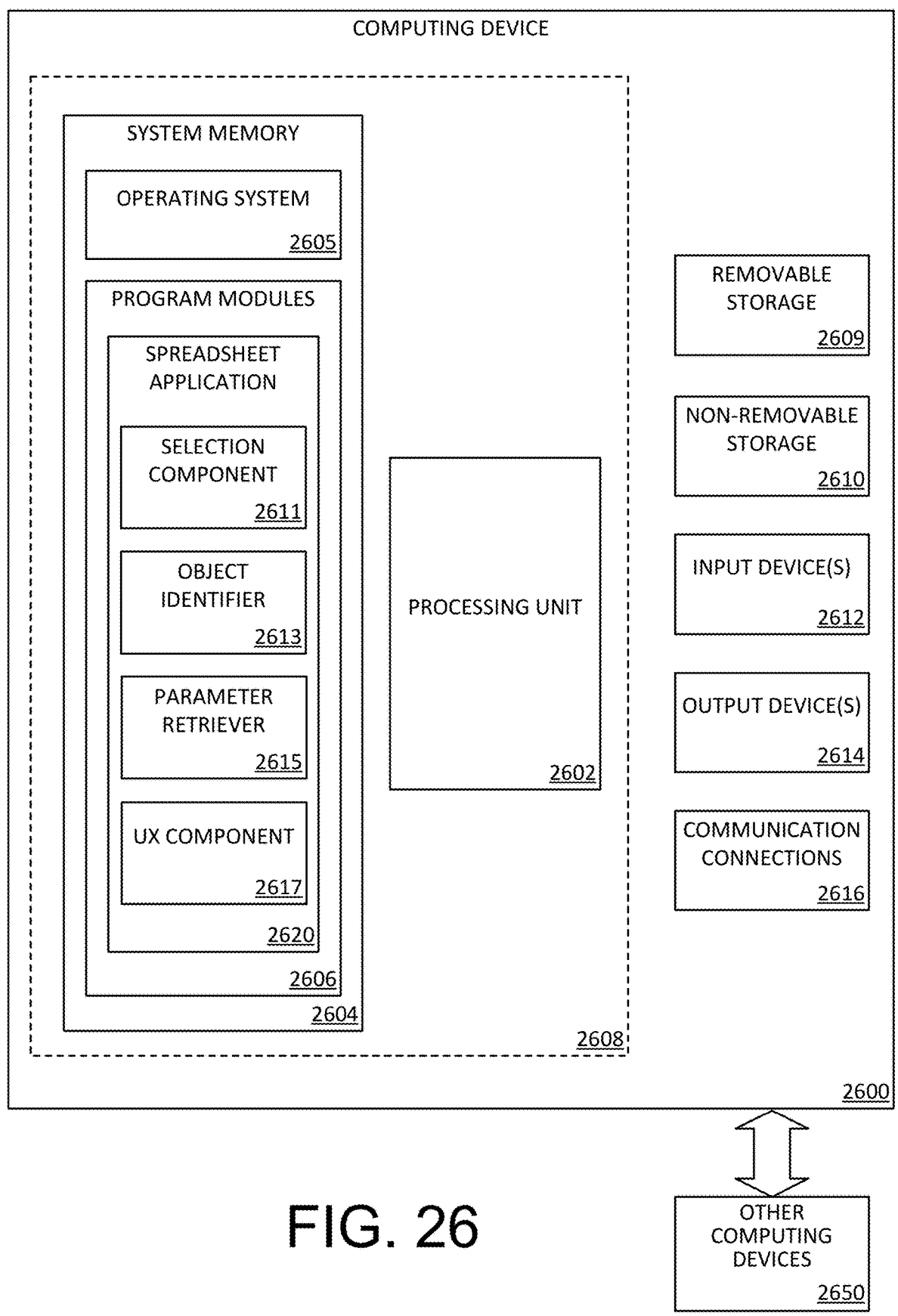
FIG. 26 is a block diagram illustrating example physical components of a computing device with which aspects of the disclosure may be practiced.

FIG. 26 is a block diagram illustrating physical components (e.g., hardware) of a computing device 2600 with which aspects of the disclosure may be practiced.

The computing device components described below may have computer executable instructions for implementing a spreadsheet application 2620 on a computing device (e.g., server computing device 108 and/or client computing device 104), including computer executable instructions for spreadsheet application 2620 that can be executed to implement the methods disclosed herein. In a basic configuration, the computing device 2600 may include at least one processing unit 2602 and a system memory 2604. Depending on the configuration and type of computing device, the system memory 2604 may comprise, but is not limited to, volatile storage (e.g., random access memory), non-volatile storage (e.g., read-only memory), flash memory, or any combination of such memories. The system memory 2604 may include an operating system 2605 and one or more program modules 2606 suitable for running spreadsheet application 2620, such as one or more components with regard to FIG. 1 and, in particular, selection component 2611 (e.g., corresponding to selection component 112), object identifier 2613 (e.g., including object identifier 114), parameter retriever 2615 (e.g., corresponding to parameter retriever 116), and/or UX component 2617 (e.g., including charting component 118 and UX component 120).

The operating system 2605, for example, may be suitable for controlling the operation of the computing device 2600. Furthermore, embodiments of the disclosure may be practiced in conjunction with a graphics library, other operating systems, or any other application program and is not limited to any particular application or system. This basic configuration is illustrated in FIG. 26 by those components within a dashed line 2608. The computing device 2600 may have additional features or functionality. For example, the computing device 2600 may also include additional data storage devices (removable and/or non-removable) such as, for example, magnetic disks, optical disks, or tape. Such additional storage is illustrated in FIG. 26 by a removable storage device 2609 and a non-removable storage device 2610.

As stated above, a number of program modules and data files may be stored in the system memory 2604. While executing on the processing unit 2602, the program modules 2606 (e.g., spreadsheet application 2620) may perform processes including, but not limited to, the aspects, as described herein. Other program modules that may be used in accordance with aspects of the present disclosure, and in particular for charting objects (e.g., images, audio files, videos, streaming data, etc.) associated with a spreadsheet, may include selection component 2611, object identifier 2613, parameter retriever 2615, and/or UX component 2617, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 26 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 2600 may also have one or more input device(s) 2612 such as a keyboard, a mouse, a pen, a sound or voice input device, a touch or swipe input device, etc. The output device(s) 2614 such as a display, speakers, a printer, etc. may also be included. The aforementioned devices are examples and others may be used. The computing device 2600 may include one or more communication connections 2616 allowing communications with other computing devices 2650. Examples of suitable communication connections 2616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include non-transitory, volatile and nonvolatile, removable and non-removable media implemented in any method or technology for storage of information, such as computer readable instructions, data structures, or program modules. The system memory 2604, the removable storage device 2609, and the non-removable storage device 2610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 2600. Any such computer storage media may be part of the computing device 2600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 27A:
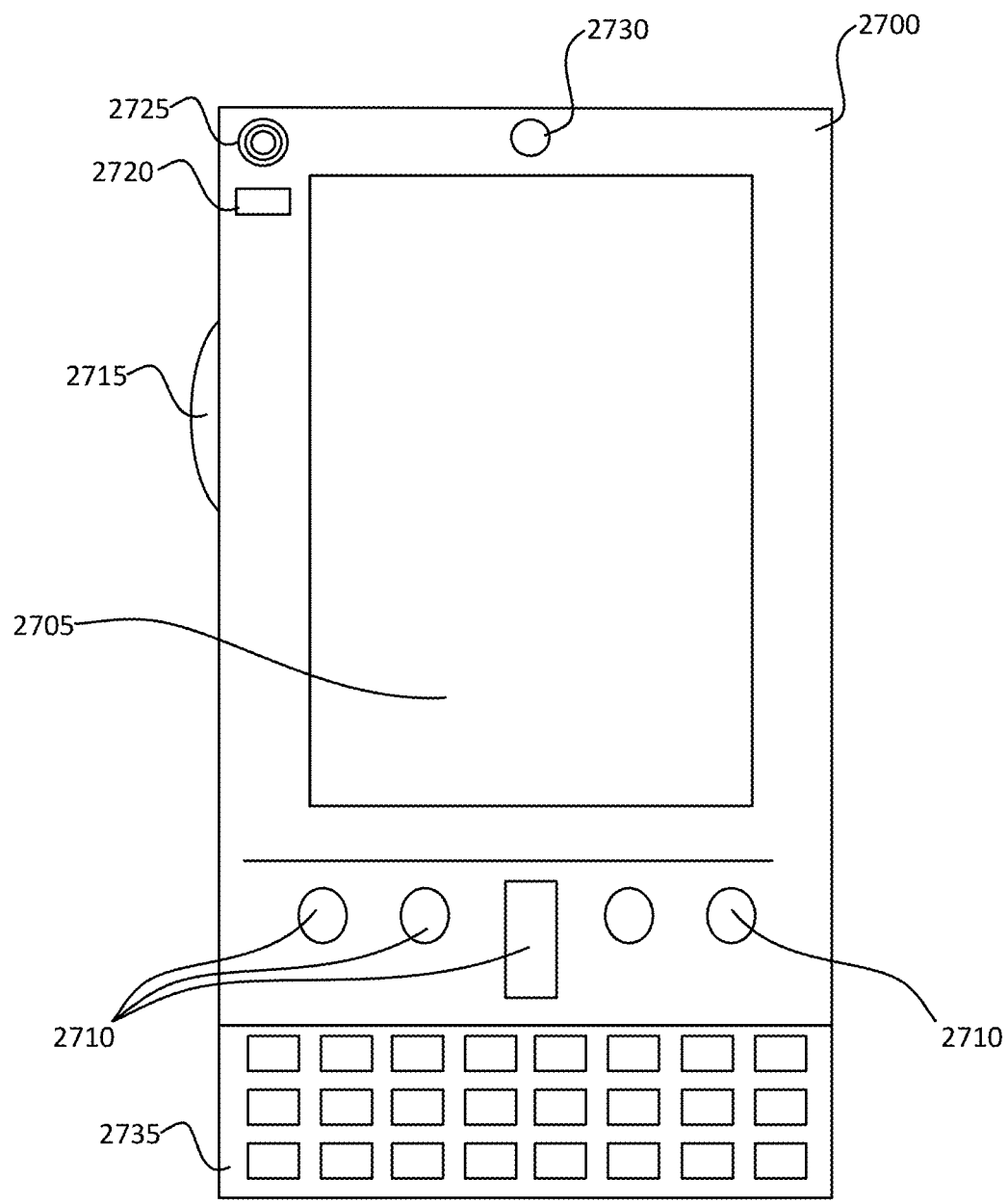
FIGS. 27A and 27B are simplified block diagrams of a mobile computing device with which aspects of the present disclosure may be practiced.
Figure 27B:
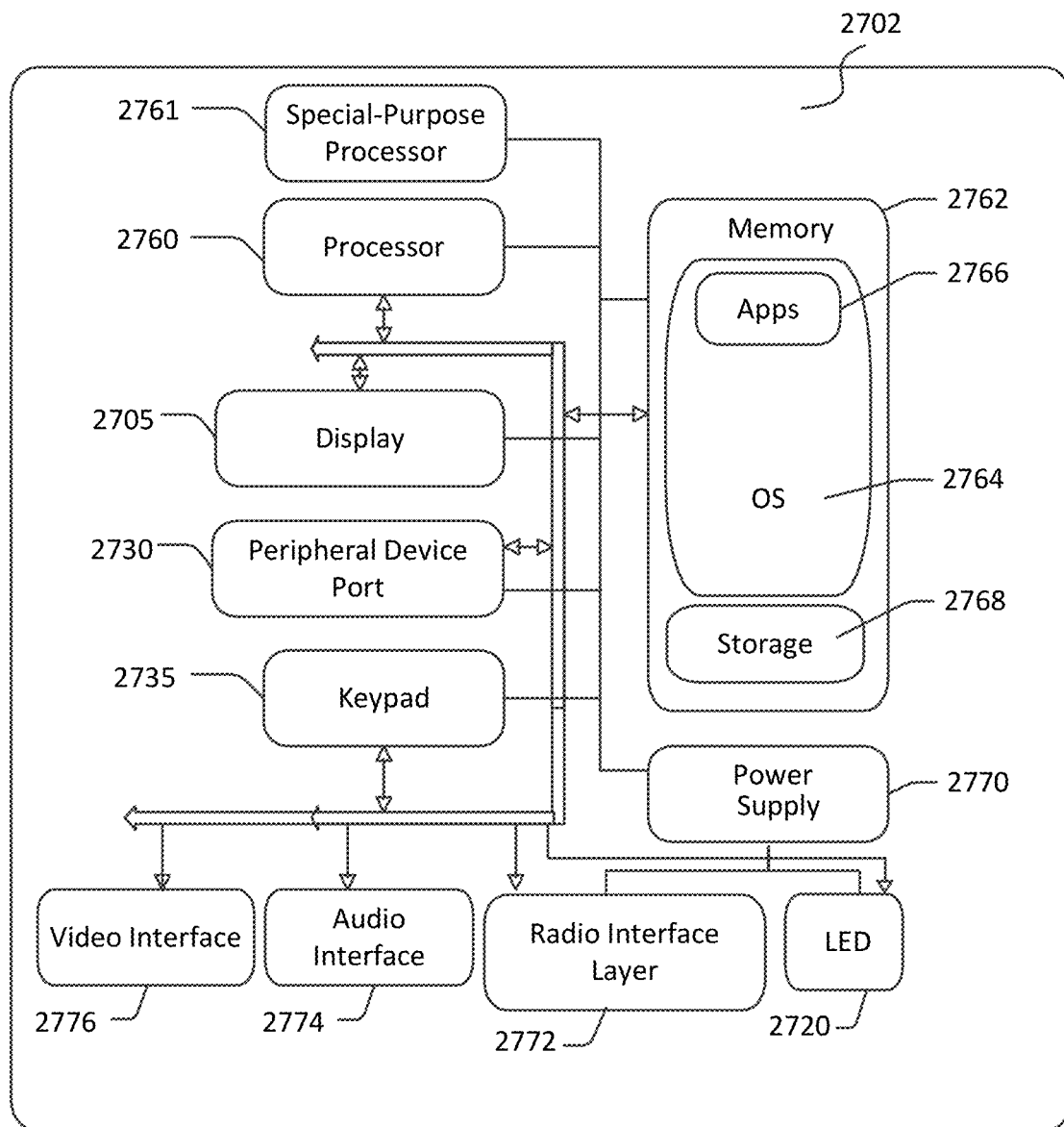

FIGS. 27A and 27B are simplified block diagrams of a mobile computing device with which aspects of the present disclosure may be practiced.

FIGS. 27A and 27B illustrate a mobile computing device 2700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 27A, one aspect of a mobile computing device 2700 for implementing the aspects is illustrated. In a basic configuration, the mobile computing device 2700 is a handheld computer having both input elements and output elements. The mobile computing device 2700 typically includes a display 2705 and one or more input buttons 2710 that allow the user to enter information into the mobile computing device 2700. The display 2705 of the mobile computing device 2700 may also function as an input device (e.g., a touch screen display). If included, an optional side input element 2715 allows further user input. The side input element 2715 may be a rotary switch, a button, or any other type of manual input element. In alternative aspects, mobile computing device 2700 may incorporate more or less input elements. For example, the display 2705 may not be a touch screen in some embodiments. In yet another alternative embodiment, the mobile computing device 2700 is a portable phone system, such as a cellular phone. The mobile computing device 2700 may also include an optional keypad 2735. Optional keypad 2735 may be a physical keypad or a "soft" keypad generated on the touch screen display. In various embodiments, the output elements include the display 2705 for showing a graphical user interface (GUI), a visual indicator 2720 (e.g., a light emitting diode), and/or an audio transducer 2725 (e.g., a speaker). In some aspects, the mobile computing device 2700 incorporates a vibration transducer for providing the user with tactile feedback. In yet another aspect, the mobile computing device 2700 incorporates input and/or output ports, such as an audio input (e.g., a microphone jack), an audio output (e.g., a headphone jack), and a video output (e.g., a HDMI port) for sending signals to or receiving signals from an external device.

FIG. 27B is a block diagram illustrating the architecture of one aspect of a mobile computing device. That is, the mobile computing device 2700 can incorporate a system (e.g., an architecture) 2702 to implement some aspects. In one embodiment, the system 2702 is implemented as a "smart phone" capable of running one or more applications (e.g., browser, e-mail, calendaring, contact managers, messaging clients, games, and media clients/players). In some aspects, the system 2702 is integrated as a computing device, such as an integrated personal digital assistant (PDA) and wireless phone.

One or more application programs 2766 may be loaded into the memory 2762 and run on or in association with the operating system 2764. Examples of the application programs include phone dialer programs, e-mail programs, personal information management (PIM) programs, word processing programs, spreadsheet programs, Internet browser programs, messaging programs, and so forth. The system 2702 also includes a non-volatile storage area 2768 within the memory 2762. The non-volatile storage area 2768 may be used to store persistent information that should not be lost if the system 2702 is powered down. The application programs 2766 may use and store information in the non-volatile storage area 2768, such as email or other messages used by an email application, and the like. A synchronization application (not shown) also resides on the system 2702 and is programmed to interact with a corresponding synchronization application resident on a host computer to keep the information stored in the non-volatile storage area 2768 synchronized with corresponding information stored at the host computer. As should be appreciated, other applications may be loaded into the memory 2762 and run on the mobile computing device 2700, including the instructions for charting objects associated with a spreadsheet as described herein (e.g., selection component, object identifier, parameter retriever, charting component, and/or UX component, etc.).

The system 2702 has a power supply 2770, which may be implemented as one or more batteries. The power supply 2770 may further include an external power source, such as an AC adapter or a powered docking cradle that supplements or recharges the batteries. The system 2702 may also include a radio interface layer 2772 that performs the function of transmitting and receiving radio frequency communications. The radio interface layer 2772 facilitates wireless connectivity between the system 2702 and the "outside world," via a communications carrier or service provider. Transmissions to and from the radio interface layer 2772 are conducted under control of the operating system 2764. In other words, communications received by the radio interface layer 2772 may be disseminated to the application programs 2766 via the operating system 2764, and vice versa.

The visual indicator 2720 may be used to provide visual notifications, and/or an audio interface 2774 may be used for producing audible notifications via an audio transducer 2725 (e.g., audio transducer 2725 illustrated in FIG. 27A). In the illustrated embodiment, the visual indicator 2720 is a light emitting diode (LED) and the audio transducer 2725 may be a speaker. These devices may be directly coupled to the power supply 2770 so that when activated, they remain on for a duration dictated by the notification mechanism even though the processor 2760 and other components might shut down for conserving battery power. The LED may be programmed to remain on indefinitely until the user takes action to indicate the powered-on status of the device. The audio interface 2774 is used to provide audible signals to and receive audible signals from the user. For example, in addition to being coupled to the audio transducer 2725, the audio interface 2774 may also be coupled to a microphone to receive audible input, such as to facilitate a telephone conversation. In accordance with embodiments of the present disclosure, the microphone may also serve as an audio sensor to facilitate control of notifications, as will be described below. The system 2702 may further include a video interface 2776 that enables an operation of peripheral device 2730 (e.g., on-board camera) to record still images, video stream, and the like.

A mobile computing device 2700 implementing the system 2702 may have additional features or functionality. For example, the mobile computing device 2700 may also include additional data storage devices (removable and/or non-removable) such as, magnetic disks, optical disks, or tape. Such additional storage is illustrated in FIG. 27B by the non-volatile storage area 2768.

Data/information generated or captured by the mobile computing device 2700 and stored via the system 2702 may be stored locally on the mobile computing device 2700, as described above, or the data may be stored on any number of storage media that may be accessed by the device via the radio interface layer 2772 or via a wired connection between the mobile computing device 2700 and a separate computing device associated with the mobile computing device 2700, for example, a server computer in a distributed computing network, such as the Internet. As should be appreciated such data/information may be accessed via the mobile computing device 2700 via the radio interface layer 2772 or via a distributed computing network. Similarly, such data/information may be readily transferred between computing devices for storage and use according to well-known data/information transfer and storage means, including electronic mail and collaborative data/information sharing systems.

As should be appreciated, FIGS. 27A and 27B are described for purposes of illustrating the present methods and systems and are not intended to limit the disclosure to a particular sequence of steps or a particular combination of hardware or software components.

Figure 28:
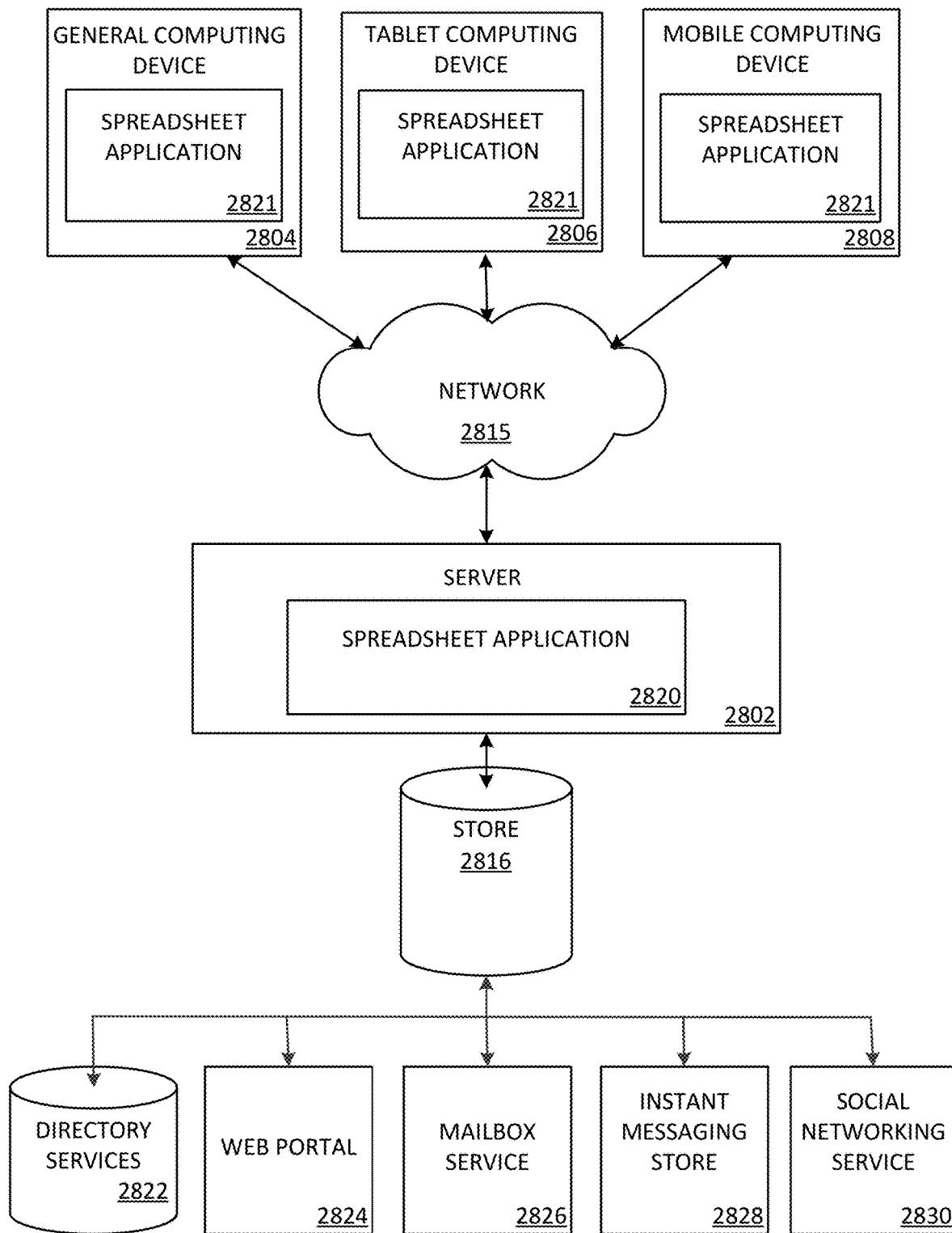
FIG. 28 is a simplified block diagram of a distributed computing system in which aspects of the present disclosure may be practiced.

FIG. 28 is a simplified block diagram of a distributed computing system in which aspects of the present disclosure may be practiced.

FIG. 28 illustrates one aspect of the architecture of a system for processing data received at a computing system from a remote source, such as a general computing device 2804 (e.g., personal computer), tablet computing device 2806, or mobile computing device 2808, as described above. Content displayed at server device 2802 may be stored in different communication channels or other storage types. For example, various documents may be stored using a directory service 2822, a web portal 2824, a mailbox service 2826, an instant messaging store 2828, or a social networking service 2830. The spreadsheet application 2821 may be employed by a client that communicates with server device 2802, and/or the spreadsheet application 2820 may be employed by server device 2802. The server device 2802 may provide data to and from a client computing device such as a general computing device 2804, a tablet computing device 2806 and/or a mobile computing device 2808 (e.g., a smart phone) through a network 2815. By way of example, the computer system described above with respect to FIGS. 1-25 may be embodied in a general computing device 2804 (e.g., personal computer), a tablet computing device 2806 and/or a mobile computing device 2808 (e.g., a smart phone). Any of these embodiments of the computing devices may obtain content from the store 2816, in addition to receiving graphical data useable to either be pre-processed at a graphic-originating system or post-processed at a receiving computing system.

As should be appreciated, FIG. 28 is described for purposes of illustrating the present methods and systems and is not intended to limit the disclosure to a particular sequence of steps or a particular combination of hardware or software components.

Figure 29:
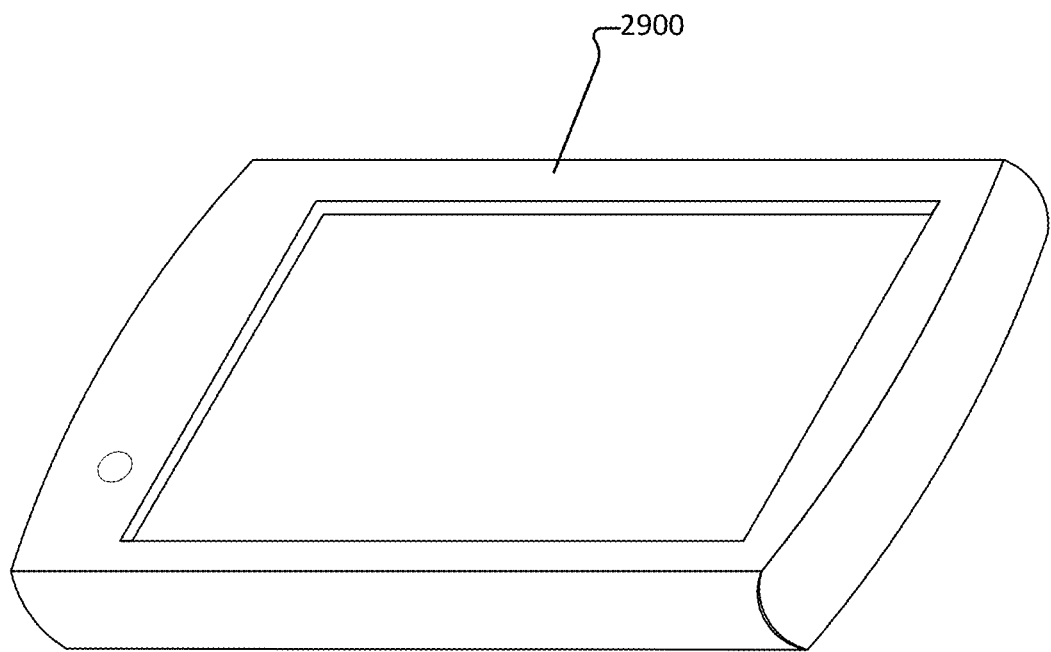
FIG. 29 illustrates a tablet computing device for executing one or more aspects of the present disclosure.

FIG. 29 illustrates an exemplary tablet computing device 2900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 29 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   a processing unit; and
   memory storing computer executable instructions that, when executed by the processing unit, cause the system to perform a method, the method comprising:
   receiving a selection of one or more cells within a spreadsheet;
   identifying a first audio file comprising a first audio attribute and a second audio file comprising a second attribute, the first audio file and the second audio file associated with the selected one or more cells;
   extracting the first audio attribute from the first audio file and the second audio attribute from the second audio file;
   charting the first audio attribute and the second audio attribute in a chart; and
   automatically incorporating a first icon representing the first audio file as a first data point within the chart and a second icon representing the second audio file as a second data point within the chart, wherein selection of the first icon plays the first audio file from within the chart and selection of the second icon plays the second audio file from within the chart.

2. The system of claim 1, wherein the first audio attribute is associated with a selected cell within the selected one or more cells.

3. The system of claim 1, wherein the first audio file is associated with a related cell that is related to the selected one or more cells.

4. The system of claim 3, wherein the related cell shares a row or a column with the selected one or more cells.

5. The system of claim 1, wherein the one or more audio attributes are one or more of: a frequency; an amplitude; a sampling rate; a codec; a bitrate; a volume; a pitch; a speed; a channel; an audio effect; an artist; a creation date; a creation time; a file size; and a duration.

6. The system of claim 1, further comprising: receiving a selection of the first icon; and in response to receiving a selection of the first icon, providing one or more play controls comprising one or more of: a control for playing the at least one audio file; a control for skipping back within the at least one audio file; a control for skipping forward within the at least one audio file; a control for pausing the at least one audio file; a control for rewinding the at least one audio file; a control for fast forwarding the at least one audio file; or a control for stopping the at least one audio file.

7. The system of claim 1, wherein the first audio file is a speech recording.

8. The system of claim 7, further comprising: transcribing the speech recording into text; and incorporating the text transcription into the chart.

9. The system of claim 8, wherein incorporating the text transcription into the chart comprises a comment bubble in the chart.

10. A computer storage medium storing computer executable instructions that, when executed by at least one processing unit, cause a computing device to:
    receive a selection of one or more cells within a spreadsheet;
    identify a first audio file and a second audio file associated with the selected one or more cells;
    extract a first parameter from the first audio file and a second parameter from the second audio file;
    chart the first parameter and second parameter in a chart; and
    automatically incorporate a first icon representing the first audio file as a data point within the chart and a second icon representing the second audio file as a data point within the chart, wherein selection of the first icon plays the first audio file from within the chart and a selection of the second icon plays the second audio file from within the chart.

11. The computer storage medium of claim 10, wherein the first parameter comprise one or more of: a frequency; an amplitude; a sampling rate; a codec; a bitrate; a volume; a pitch; a speed; a channel; an audio effect; an artist; a creation date; a creation time; a file size; and a duration.

12. The computer storage medium of claim 10, wherein the chart comprises a first axis associated with the first audio attribute and a second axis associated with the second audio attribute.

13. The computer storage medium of claim 10, wherein the first parameter is extracted from metadata associated with the first audio file.

14. The computer storage medium of claim 10, wherein the first parameter is extracted from a compound data type associated with the first audio file.

15. The computer storage medium of claim 14, wherein the compound data type comprises the first audio file and the first parameter in a structured format.

16. The computer storage medium of claim 10, wherein the first parameter and the second parameter are not displayed within the spreadsheet.

17. A method comprising:
    receiving a selection of one or more cells within a spreadsheet;
    identifying a first audio file comprising:
    a first audio attribute and a second audio file comprising a second audio attribute, the first audio file and the second audio file associated with the selected one or more cells;

extracting the first audio attribute from the first audio file and the second audio attribute from the second audio file;

charting the first audio attribute and the second audio attribute in a chart; and automatically incorporating a first icon representing the first audio file as a first data point within the chart and a second icon representing the second audio file as a second data point within the chart, wherein selection of the first icon plays the first audio file from within the chart and selection of the second icon plays the second audio file from within the chart.

18. The method of claim 17, wherein the first audio file is a speech recording.

19. The method of claim 18, further comprising: transcribing the speech recording into text; and incorporating the text transcription into the chart.

20. The method of claim 19, wherein incorporating the text transcription into the chart comprises a comment bubble in the chart.

21. The method of claim 17, wherein the first audio attribute is associated with a selected cell within the selected one or more cells.

22. The method of claim 17, wherein the first audio file is associated with a related cell that is related to the selected one or more cells.

23. The method of claim 22, wherein the related cell shares a row or a column with the selected one or more cells.

24. The method of claim 17, wherein the one or more audio attributes are one or more of: a frequency; an amplitude; a sampling rate; a codec; a bitrate; a volume; a pitch; a speed; a channel; an audio effect; an artist; a creation date; a creation time; a file size; and a duration.

25. The method of claim 17, further comprising: receiving a selection of the first icon; and in response to receiving a selection of the first icon, providing one or more play controls comprising one or more of; a control for playing the at least one audio file; a control for skipping back within the at least one audio file; a control for skipping forward within the at least one audio file; a control for pausing the at least one audio file; a control for rewinding the at least one audio file; a control for fast forwarding the at least one audio file; or a control for stopping the at least one audio file.

26. The method of claim 17, wherein the first audio attribute is extracted from metadata associated with the first audio file.

27. The method of claim 17, wherein the chart comprises a first axis associated with the first audio attribute and a second axis associated with the second audio attribute.

* * * * *